(12) United States Patent
Miyazawa et al.

(10) Patent No.: US 9,995,606 B2
(45) Date of Patent: Jun. 12, 2018

(54) INDICATOR MEMBER, INDICATOR UNIT AND INDICATOR INSTRUMENT

(71) Applicant: Yazaki Corporation, Tokyo (JP)

(72) Inventors: Tomohiro Miyazawa, Susono (JP); Masayuki Ogawa, Susono (JP)

(73) Assignee: Yazaki Corporation, Tokyo (JP)

( * ) Notice: Subject to any disclaimer, the term of this patent is extended or adjusted under 35 U.S.C. 154(b) by 84 days.

(21) Appl. No.: 15/349,366

(22) Filed: Nov. 11, 2016

(65) Prior Publication Data

US 2017/0059371 A1    Mar. 2, 2017

Related U.S. Application Data

(62) Division of application No. 13/980,945, filed as application No. PCT/JP2012/051324 on Jan. 23, 2012.

(30) Foreign Application Priority Data

Jan. 26, 2011 (JP) ................. 2011-014244
Jan. 26, 2011 (JP) ................. 2011-014245

(Continued)

(51) Int. Cl.
*G01D 13/26* (2006.01)
*B60K 35/00* (2006.01)
(Continued)

(52) U.S. Cl.
CPC ........... *G01D 13/265* (2013.01); *B60K 35/00* (2013.01); *B60Q 3/62* (2017.02); *F21V 7/00* (2013.01);
(Continued)

(58) Field of Classification Search
None
See application file for complete search history.

(56) References Cited

U.S. PATENT DOCUMENTS 4,625,262 A * 11/1986 Sakakibara ............ G01R 1/08
362/23.15
5,211,128 A    5/1993 Katoh et al.
(Continued)

FOREIGN PATENT DOCUMENTS

DE    3425029 A1    1/1985
EP    1610098 A1    12/2005
(Continued)

OTHER PUBLICATIONS

International Search Report dated Apr. 17, 2012, issued for PCT/JP2012/051324.
(Continued)

*Primary Examiner* — Britt D Hanley
(74) *Attorney, Agent, or Firm* — Locke Lord LLP

(57) ABSTRACT

To provide an inexpensive indicator member which can prevent a dark area from being formed at a location above a reflection part, an indicator unit having the indicator member and an indicator instrument having the indicator unit. A hollow reflection part provided to an indicator part of an indicator main body of a light-emitting indicator includes a plurality of partial reflection parts having at least an pointing direction reflection face, a rear end direction reflection face and a corner formed at an intersection of the pointing direction reflection face and the rear end direction reflection face and arranged at a location opposed to the base part. The corners of the respective partial reflection parts adjacent to each other are displaced in a pointing direction or in a rear end direction.

3 Claims, 26 Drawing Sheets

(30) Foreign Application Priority Data

Jan. 26, 2011 (JP) ................................ 2011-014246
Jan. 27, 2011 (JP) ................................ 2011-015017

(51) Int. Cl.

| | | |
|---|---|---|
| *G01D 13/22* | (2006.01) | |
| *F21V 8/00* | (2006.01) | |
| *F21V 7/00* | (2006.01) | |
| *B60Q 3/62* | (2017.01) | |
| *F21W 111/00* | (2006.01) | |

(52) U.S. Cl.
CPC ........... *G01D 13/22* (2013.01); *G02B 6/0055* (2013.01); *B60K 2350/203* (2013.01); *B60K 2350/206* (2013.01); *B60K 2350/2095* (2013.01); *F21W 2111/00* (2013.01)

(56) References Cited

U.S. PATENT DOCUMENTS 6,600,427 B2 7/2003 Simon et al.
2006/0039130 A1 2/2006 Takatsuka et al.

FOREIGN PATENT DOCUMENTS

| FR | 2787879 A1 | 6/2000 |
|---|---|---|
| JP | 6-12995 U | 2/1994 |
| JP | 08-219820 A | 8/1996 |
| JP | 09-089599 A | 4/1997 |
| JP | 09-105650 A | 4/1997 |
| JP | 2991328 B2 | 12/1999 |
| JP | 2002-098556 A | 4/2002 |
| JP | 2002-296081 A | 10/2002 |
| JP | 2005-049104 A | 2/2005 |
| WO | WO-00/39534 A1 | 7/2000 |

OTHER PUBLICATIONS

Supplementary European Search Report dated Jun. 6, 2014, issued for the European patent application No. 12739587.9.
Notification of Reason(s) for Refusal dated Sep. 16, 2014, issued for the Japanese patent application No. 2011-014246.
Notification of Reason(s) for Refusal dated Sep. 16, 2014, issued for the Japanese patent application No. 2011-014245 and English translation thereof.
European Search Report dated Apr. 22, 2015, issued for the European patent application No. 14004331.6.
Partial European Search Report dated Jul. 1, 2015, issued for the European patent application No. 14004330.8.
Machine translation of JP H06-12995 U, published 1996.

\* cited by examiner

INDICATOR MEMBER, INDICATOR UNIT AND INDICATOR INSTRUMENT

This application is a divisional application of U.S. application Ser. No. 13/980,945 filed Jul. 22, 2013 which claims the right of priority under 35 U.S.C. § 119 based on Japanese Patent Application Nos. 2011-015017 filed Jan. 27, 2011; 2011-014246 filed Jan. 26, 2011; JAPAN 2011-014245 filed Jan. 26, 2011 and JAPAN 2011-014244 filed Jan. 26, 2011.

TECHNICAL FIELD (1.1), (2.1), (3.1)

The present invention relates to an indicator member made of translucent material which becomes luminous by receiving the light from a light source, an indicator unit having said indicator member and an indicator instrument having said indicator unit.

(4.1)

The present invention relates to an indicator member arranged to guide the light from a translucent indicator shaft to be luminous, an indicator unit having said indicator member and an indicator instrument having said indicator unit.

BACKGROUND ART (1.2)

In general, a vehicle is mounted with a vehicle display device arranged to display a measured value such as vehicle speed and engine revolution number, and in many vehicles said vehicle display device is constituted of an indicator instrument. The indicator instrument includes a meter case which houses a dial plate having a surface provided with indexes such as scale marks and numbers, letters or symbols, an indicator unit positioned in front of said dial plate to point to the indexes on the dial plate, a drive device which rotates the indicator shaft at which said indicator unit is attached in accordance with measured quantity, and a circuit board on which a circuit pattern and an electronic component and such are provided and on which said drive device is fixed.

To allow the indicator unit provided at such indicator instrument to be easily visible in the dark place as well, various technologies are disclosed in which the indicator member constituting the indicator unit is made of translucent synthetic resin which is translucent material, and in which light is guided from a light source into the indicator member to make the indicator member to be luminous. For example, a light-emitting indicator disclosed in Patent Literature 1 is provided with a hollow reflection part having a reflection face which reflects a part of light from a light source toward a distal end of the indicator.

For example, an indicator instrument 901 which is partially shown in FIG. 6 includes a dial plate 902, a light-emitting indicator 903 as an indicator unit, a drive device 904 having an indicator shaft 914 arranged to rotate in accordance with measured quantity, a circuit board 905 and a light source 906. The light-emitting indicator 903 includes an indicator main body 931 as an indicator member having a base part 940 and an indicator part 950 which are integrally molded from translucent synthetic resin, and a cover member 932 arranged to cover the indicator main body 931 and having a slit from which an upper face 953 of the indicator part 950 is exposed toward a viewer. This indicator main body 931 is arranged to guide the light received at the base part 940 to the indicator part 950 and direct the light to exit from the upper face 953 of the indicator part 950 toward the viewer, by which the upper face 953 of the indicator part 950 becomes luminous and visible through the slit of the cover member 932.

The base part 940 of the indicator main body 931 includes a circular cylindrical base part main body 941 to be attached to a distal end of the indicator shaft 914 which also functions as a light guide member, and a light receiving part 942 arranged to receive light L from the light source 906 which is guided by the indicator shaft 914. The indicator part 950 of the indicator main body 931 is provided with a pointing part 951 and a rearward part 952 extending from the base part 940 toward a pointing direction S1 intersecting a shaft center P of the indicator shaft 914 and toward a rear end direction S2 which is opposite of the pointing direction S1, respectively. A hollow reflection part 960 is provided inside of the indicator part 950 near an upper end 941a of the base part main body 941 so as to penetrate through the indicator part 950 in a widthwise direction (i.e. a direction perpendicular to a plane of paper in FIG. 6).

This hollow reflection part 960 is formed into a substantially triangular shape with a pointing direction reflection face 961, a rear end direction reflection face 962 and a transmission face 963. Furthermore, a corner 960a is formed at an intersection of the pointing direction reflection face 961 and the rear end direction reflection face 962 and is arranged at a location opposed to the light receiving part 942 of the base part 940. As shown in FIG. 7A, the indicator direction reflection face 961 reflects a part L1 of the light L received at the light receiving part 942 to the pointing direction S1 (i.e. the left direction in FIG. 7A) and allows other part L3 of the light L to transmit toward the transmission face 963. The rear end direction reflection face 962 reflects a part L2 of the light L received at the light receiving part 942 to the rear end direction S2 (i.e. the right direction in FIG. 7A) and allows other part L3 of the light L to transmit toward the transmission face 963.

The light L1 travels inside of the indicator part 951 toward the pointing direction S1 and exits from the upper face 953 adjacent to the pointing part 951, and the light L2 travels inside of the rearward part 952 toward the rear end direction S2 and exits from the upper face 953 adjacent to the rearward part 952, and the light L3 enters the transmission face 963 and then exits from the upper face 953 located above the hollow reflection part 960, by which the entire portion of the upper face 953 of the indicator part 950 becomes luminous. In FIG. 7A, the thickness of the arrow indicative of the light L3 represents the brightness of light, thus the thicker the arrow the higher the brightness, and the thinner the arrow the lower the brightness.

As shown in FIG. 7B, the light L3 entering the transmission face 963 has highest brightness at a section 963c of the transmission face 963 located right above the corner 960a, and the brightness becomes gradually lower as distant from the section 963c toward the a transmission face end 963a on the pointing direction S1 or toward a transmission face end 963b on the rear end direction S2. In the indicator part 950, the pointing part 951 is longer than the rearward part 952, thus needs more light reflected toward the pointing direction S1. Therefore, the pointing direction reflection face 961 is formed larger than the rear end direction reflection face 962, and the corner 960a is located to the rear end direction S2 with respect to the shaft center P of the indicator shaft 914.

Therefore, the section 963c with the highest brightness is also located to the rear end direction S2, thus the light entering near the transmission face end 963b located relatively near the section 963c can ensure the necessary brightness. However, the light entering near the transmission face end 963*a* located relatively distant from the section 963*c* is deficient in the brightness, causing a dark area D formed near an end on the pointing direction S1 side in a section R of the upper face 953 located above the hollow reflection part 960. Thus, as shown in FIG. 8, conventionally, the formation of the dark area D described above is prevented by inserting into the hollow reflection part 960 a light diffusing component 970 made of synthetic resin and such containing diffusing agent for transmitting and scattering the light and formed into a substantially same shape as the hollow reflection part 960, or by providing a filter member to the transmission face 963 as the light-emitting indicator disclosed in Patent Literature 1.

(2.2)

In general, a vehicle is mounted with a vehicle display device arranged to display measured value such as vehicle speed and engine revolution number, and in many vehicles said vehicle display device is constituted of an indicator instrument. The indicator instrument includes a meter case which houses a dial plate having a surface provided with indexes such as scale marks and numbers, letters or symbols, an indicator unit positioned in front of said dial plate to point to the indexes on the dial plate, a drive device which rotates the indicator shaft at which said indicator unit is attached in accordance with the measured quantity, and a circuit board on which a circuit pattern and an electronic component and such are provided and on which said drive device is fixed.

To allow the indicator unit provided at such indicator instrument to be easily visible in the dark place as well, various technologies are disclosed in which the indicator member constituting the indicator unit is made of translucent synthetic resin which is translucent material, and in which light is guided from a light source into the indicator member to make the indicator member to become luminous. For example, a light-emitting indicator disclosed in Patent Literature 1 is provided with a hollow reflection part having a reflection face which reflects a part of light from a light source toward a distal end of the indicator.

For example, an indicator instrument 901 which is partially shown in FIG. 17 includes a dial plate 902, a light-emitting indicator 903 as an indicator unit, a drive device 904 having an indicator shaft 914 arranged to rotate in accordance with measured quantity, a circuit board 905 and a light source 906. The light-emitting indicator 903 includes an indicator main body 931 as an indicator member having a base part 940 and an indicator part 950 which are integrally molded from translucent synthetic resin, and a cover member 932 arranged to cover the indicator main body 931 and having a slit from which an upper face 953 of the indicator part 950 is exposed toward a viewer. This indicator main body 931 is arranged to guide the light received at the base part 940 to the indicator part 950 and direct the light to exit from the upper face 953 of the indicator part 950 toward the viewer, by which the upper face 953 of the indicator part 950 becomes luminous and visible through the slit of the cover member 932.

The base part 940 of the indicator main body 931 includes a circular cylindrical base part main body 941 to be attached to a distal end of the indicator shaft 914 which also functions as a light guide member, and a light receiving part 942 arranged to receive light L from the light source 906 which is guided by the indicator shaft 914. The indicator part 950 of the indicator main body 931 is provided with a pointing part 951 and a rearward part 952 extending from the base part 940 toward a pointing direction S1 intersecting a shaft center P of the indicator shaft 914 and toward a rear end direction S2 which is opposite of the pointing direction S1, respectively. A hollow reflection part 960 is provided inside of the indicator part 950 near an upper end 941*a* of the base part main body 941 so as to penetrate through the indicator part 950 in a widthwise direction (i.e. a direction perpendicular to a plane of paper in FIG. 17).

This hollow reflection part 960 is formed into a substantially isosceles triangular shape with a pointing direction reflection face 961, a rear end direction reflection face 962 and a transmission face 963, each formed into a flat surface. Furthermore, a corner 960*a* is formed at an intersection of the pointing direction reflection face 961 and the rear end direction reflection face 962 and is arranged at a location opposed to the light receiving part 942 of the base part 940. As shown in FIG. 18, the indicator direction reflection face 961 reflects a part L1 of the light L received at the light receiving part 942 to the pointing direction S1 (i.e. the left direction in FIG. 18) and allows other part L3 of the light L to transmit toward the transmission face 963. The rear end direction reflection face 962 reflects a part L2 of the light L received at the light receiving part 942 to the rear end direction S2 (i.e. the right direction in FIG. 18) and allows other part L3 of the light L to transmit toward the transmission face 963.

The light L1 travels inside of the indicator part 951 toward the pointing direction S1 and exits from a section R1 of the upper face 953 located adjacent to the pointing part 951, and the light L2 travels inside of the rearward part 952 toward the rear end direction S2 and exits from a section R2 of the upper face 953 located adjacent to the rearward part 952, and the light L3 enters the transmission face 963 and then exits from a section R3 of the upper face 953 located above the hollow reflection part 960, by which the entire portion of the upper face 953 of the indicator part 950 becomes luminous.

(3.2)

In general, a vehicle is mounted with a vehicle display device arranged to display measured value such as vehicle speed and engine revolution number, and in many vehicles said vehicle display device is constituted of an indicator instrument. The indicator instrument includes a meter case which houses a dial plate having a surface provided with indexes such as scale marks and numbers, letters or symbols, an indicator unit positioned in front of said dial plate to point to the indexes on the dial plate, a drive device which rotates the indicator shaft at which said indicator unit is attached in accordance with measured quantity, and a circuit board on which a circuit pattern and an electronic component and such are provided and on which said drive device is fixed.

To allow the indicator unit provided at such indicator instrument to be easily visible in the dark place as well, various technologies are disclosed in which the indicator member constituting the indicator unit is made of translucent synthetic resin which is translucent material, and in which light is guided from a light source into the indicator member to make the indicator member to be luminous. For example, a light-emitting indicator disclosed in Patent Literature 1 is provided with a hollow reflection part having a reflection face which reflects a part of light from a light source toward a distal end of the indicator.

For example, an indicator instrument 901 which is partially shown in FIG. 28 includes a dial plate 902, a light-emitting indicator 903 as an indicator unit, a drive device 904 having an indicator shaft 914 arranged to rotate in accordance with measured quantity, a circuit board 905 and a light source 906. The light-emitting indicator 903 includes an indicator main body 931 as an indicator member having a base part 940 and an indicator part 950 which are integrally molded from translucent synthetic resin, and a cover member 932 arranged to cover the indicator main body 931 and having a slit from which an upper face 953 of the indicator part 950 is exposed toward a viewer. This indicator main body 931 is arranged to guide the light received at the base part 940 to the indicator part 950 and direct the light to exit from the upper face 953 of the indicator part 950 toward the viewer, by which the upper face 953 of the indicator part 950 becomes luminous and visible through the slit of the cover member 932.

The base part 940 of the indicator main body 931 includes a circular cylindrical base part main body 941 to be attached to a distal end of the indicator shaft 914 which also functions as a light guide member, and a light receiving part 942 arranged to receive light L from the light source 906 which is guided by the indicator shaft 914. The indicator part 950 of the indicator main body 931 is provided with a pointing part 951 and a rearward part 952 extending from the base part 940 toward a pointing direction S1 intersecting a shaft center P of the indicator shaft 914 and toward a rear end direction S2 which is opposite of the pointing direction S1, respectively. A hollow reflection part 960 is provided inside of the indicator part 950 near an upper end 941a of the base part main body 941 so as to penetrate through the indicator part 950 in a widthwise direction (i.e. a direction perpendicular to a plane of paper in FIG. 28).

This hollow reflection part 960 is formed into a substantially isosceles triangular shape with a pointing direction reflection face 961, a rear end direction reflection face 962 and a transmission face 963. Furthermore, a corner 960a is formed at an intersection of the pointing direction reflection face 961 and the rear end direction reflection face 962 and is arranged at a location opposed to the light receiving part 942 of the base part 940. As shown in FIG. 29, the indicator direction reflection face 961 reflects a part L1 of the light L received at the light receiving part 942 to the pointing direction S1 (i.e. the left direction in FIG. 29) and allows other part L3 of the light L to transmit toward the transmission face 963. The rear end direction reflection face 962 reflects a part L2 of the light L received at the light receiving part 942 to the rear end direction S2 (i.e. the right direction in FIG. 29) and allows other part L3 of the light L to transmit toward the transmission face 963.

The light L1 travels inside of the indicator part 951 toward the pointing direction S1 and exits from an upper face 953a of the pointing part 951, and the light L2 travels inside of the rearward part 952 toward the rear end direction S2 and exits from an upper face 953b of the rearward part 952.

However, the light L1 reflected by the pointing direction reflection face 961 travels at an angle with respect to the pointing direction reflection face 961, thus less light travels along the pointing direction reflection face 961. Thus, there is a problem that amount of light exiting from the section R of the upper face 953a of the pointing part 951 near the hollow reflection part 960 becomes less, causing a dark area formed at this section R and thus causing non-uniformity in the brightness at the upper face 953.

A indicator member 811 disclosed in Patent Literature 2 shown in FIG. 30 includes a base part 811a and an indicator part 811b having a pointing part 811b1 extending to one direction from the base part 811a and a balance part 811b2 as a rearward part extending to the other direction which is opposite of said one direction. A hollow reflection part 811c is provided at a connection section of the pointing part 811b1 and the balance part 811b2, the hollow reflection part 811c being arranged to reflect the light from the base part 811a toward a distal end direction of the pointing part 811b1 and toward a rear end direction of the balance part 811b2.

A rearward diffuse reflection face 811b3 is provided at a proximal portion of the base part 811a and the balance part 811b2. This rearward diffuse reflection face 811b3 is arranged to face to and substantially parallel to a rearward reflection face 811c2 of the hollow reflection part 811c such that the light reflected on the rearward reflection face 811c2 is reflected toward an upper face of the balance part 811b2. Thus, the above-mentioned problem can be solved by adjusting the rearward diffuse reflection face 811b3 to reflect the light toward a section of the upper face of the balance part 811b2 near the hollow reflection part 811c.

(4.2)

In general, a vehicle is mounted with a vehicle display device arranged to display measured value such as vehicle speed and engine revolution number, and in many vehicles said vehicle display device is constituted of an indicator instrument. The indicator instrument includes a meter case which houses a dial plate having a surface provided with indexes such as scale marks and numbers, letters or symbols, an indicator unit positioned in front of said dial plate to point to the indexes on the dial plate, a drive device which rotates the indicator shaft at which said indicator unit is attached in accordance with measured quantity, and a circuit board on which a circuit pattern and an electronic component and such are provided and on which said drive device is fixed.

To allow the indicator unit provided at such indicator instrument to be easily visible in the dark place as well, various technologies are disclosed in which the indicator member constituting the indicator unit is made of translucent synthetic resin which is translucent material, and in which light is guided from a light source into the indicator member to make the indicator member to be luminous. For example, a light-emitting indicator disclosed in Patent Literature 1 is provided with a hollow reflection part having a reflection face which reflects a part of light from a light source toward a distal end of the indicator. Furthermore, an instrument disclosed in Patent Literature 3 includes a translucent indicator shaft, and an indicator receives the light from the light source guided in the indicator shaft, and the indicator emits light by the received light.

For example, an indicator instrument 901 which is partially shown in FIG. 41 includes a dial plate 902, a light-emitting indicator 903 as an indicator unit, a drive device 904 having an indicator shaft 914 arranged to rotate in accordance with measured value, a circuit board 905 and a light source 906. The light-emitting indicator 903 includes an indicator main body 931 as an indicator member having a base part 940 and an indicator part 950 which are integrally molded from translucent synthetic resin, and a cover member 932 arranged to cover the indicator main body 931 and having a slit from which an upper face 953 of the indicator part 950 is exposed toward a viewer. This indicator main body 931 guides the light received at the base part 940 to the indicator part 950 and directs the light to exit from the upper face 953 of the indicator part 950 toward the viewer, thereby being luminous and visible through the slit of the cover member 932.

The base part 940 of the indicator main body 931 includes a shaft receiving part 941 arranged to guide the light from the light source 906 and arranged to be attached to a distal end of the indicator shaft 914, and a light receiving part 942 arranged to receive light L guided from the light source 906 by the indicator shaft 914 and exited from the distal end of the indicator shaft 914. The indicator part 950 of the indicator main body 931 is provided with a pointing part 951 and a rearward part 952 extending from the base part 940 toward a pointing direction S1 intersecting a shaft center P of the indicator shaft 914 and toward a rear end direction S2 which is opposite of the pointing direction S1, respectively. A hollow reflection part 960 is provided inside of the indicator part 950 near the light receiving part 942 of the base part main body 941 so as to penetrate through the indicator part 950 in a widthwise direction (i.e. a direction perpendicular to a plane of paper in FIG. 41).

This hollow reflection part 960 is formed into a substantially triangular shape with a pointing direction reflection face 961, a rear end direction reflection face 962 and a transmission face 963. Furthermore, a corner 960a is formed at an intersection of the pointing direction reflection face 961 and the rear end direction reflection face 962 and is arranged at a location opposed to the base part 940. As shown in FIG. 42, the indicator direction reflection face 961 reflects a part L1 of the light L received at the light receiving part 942 to the pointing direction S1 (i.e. the left direction in FIG. 42) and allows other part L3 of the light L to transmit toward the transmission face 963. The rear end direction reflection face 962 reflects a part L2 of the light L received at the light receiving part 942 to the rear end direction S2 (i.e. the right direction in FIG. 42) and allows other part L3 of the light L to transmit toward the transmission face 963. The light L1 is reflected in the pointing part 951 and travels toward the pointing direction S1 and exits from the upper face 953 located adjacent to the pointing part 951, and the light L2 is reflected in the rearward part 952 and travels toward the rear end direction S2 and exits from the upper face 953 located adjacent to the rearward part 952, and the light L3 enters the transmission face 963 and then exits from the upper face 953 located above the hollow reflection part 960, by which the entire portion of the upper face 953 of the indicator part 950 becomes luminous.

CITATION LIST

Patent Literatures

Patent Literature 1: Japan Utility Model Application Publication No. H6-12995
Patent Literature 2: Japan Patent Application Publication No. H8-219820
Patent Literature 3: Japan Patent Application Publication No. 2002-98556

SUMMARY OF INVENTION

Problem to be Solved (1.3)
However, there is a problem that, when the light diffusing component and the filter member and such are provided to prevent the formation of the dark area D at the section R of the upper face 953 of the indicator part 950 located above the hollow reflection part 960 as described above, the number of components is increased and the man-hour for assembling is increased as well, causing an increase in the manufacturing cost of the indicator member.

The present invention aims to solve the problem mentioned above. That is, an object of the present invention is to provide an inexpensive indicator member which can prevent the formation of a dark area at a location above a reflection part, an indicator unit having said indicator member and an indicator instrument having said indicator unit.

(2.3)
Furthermore, as shown in FIG. 19, at a location near the hollow reflection part 960, the part L1', L2' of the light L travels inside of the indicator part 950 directly from the light receiving part 942 toward the upper face 953, or, is firstly reflected on the pointing direction reflection face 961 or on the rear end direction reflection face 962 and then travels toward the upper face 953. The light component L3' near the pointing direction reflection face 961 and the light component L3" near the pointing direction reflection face 961 contained in the above-described light L3 pass inside of the hollow reflection part 960 and enter the transmission face 963 and then travel toward the upper face 953.

However, since the transmission face 963 is formed into a flat surface, when the light components L3', L3" enter the transmission face 963, the refraction angles $\theta 2$, $\theta 4$ become smaller than the incident angles $\theta 1$, $\theta 3$ as shown in FIG. 19 due to the refraction index of the synthetic resin being higher than the refraction index of air. Thus, the light component L3', L3" changes its direction of travel toward an inner side (i.e. toward each other). This is the same for the light component contained in the light L3 other than the light components L3', L3".

In other words, there is a problem that the spread angle ($\theta 2+\theta 4$) of the above-mentioned light L3 after entering the transmission face 963 becomes smaller than the spread angle ($\theta 1+\theta 3$) of the above-mentioned light L3 before entering the transmission face 963. Thus, the section R of the upper face 953 of the indicator part 950 becomes narrower, causing a decrease in amount of light exiting from a section R4 located at the upper face 953 and located at an extension of the pointing direction reflection face 961 (i.e. located between the section R1 and the section R3) and thus forming the dark area. Similarly, the dark area is formed at a section R5 located at the upper face 953 of the indicator part 950 and located at an extension of the rear end direction reflection face 962 (i.e. located between the section R2 and the section R3). Such problem can be prevented by inserting a light diffusing component 970 which is made of synthetic resin and such containing diffusing agent for transmitting and scattering the light and which is formed into a substantially same shape as the hollow reflection part 960, as shown in FIG. 20, or by providing a filter member to the transmission face 963 as the light-emitting indicator disclosed in Patent Literature 1. However, that will induce another problem that the number of components is increased and the man-hour for assembling is increased as well, causing an increase in the manufacturing cost of the indicator member.

The present invention aims to solve the problem mentioned above. That is, an object of the present invention is to provide an inexpensive indicator member which can prevent non-uniformity in brightness at an upper face of an indicator part, an indicator unit having said indicator member and an indicator instrument having said indicator unit.

(3.3)
However, if the indicator main body 931 mentioned above is provided with a diffuse reflection face which is similar to the rearward diffuse reflection face 811b3 shown in FIG. 30 at the pointing part 951 in order to reflect the light toward the section R of the upper face 953a located adjacent to the hollow reflection part 960, then the pointing part 951 becomes thinner as the balance part 811b2 shown in FIG. 30. Thus, there is a problem that the sufficient light cannot be guided toward a distal end 951a of the pointing part 951, causing a decrease in brightness of the entire upper face 953a of the pointing part 951.

The present invention aims to solve the problem mentioned above. That is, an object of the present invention is to provide an inexpensive indicator member which can prevent non-uniformity in brightness at an upper face of an indicator part without decreasing the brightness of the upper face of the indicator part, an indicator unit having said indicator member, and an indicator instrument having said indicator unit.

(4.3)

In FIG. 42, the thickness of the arrow indicative of the light L3 represents the brightness of light, and the thicker the arrow the higher the brightness, and the thinner the arrow the lower the brightness. Thus, the light L3 entering the transmission face 963 has the highest brightness at a section of the transmission face 963 located right above the corner 960a, and the brightness becomes gradually lower as distant from this section toward the transmission face end 963b in the pointing direction S1 or the rear end direction S2.

Furthermore, as shown in FIG. 43, the indicator part 950 includes a light exit region E1 at which the light L3 exits from the upper face 953 located above the hollow reflection part 960, and light exit regions E2 at which the light L1, L2 exit from the upper surface 953 of the pointing part 951 and of the rearward part 952, respectively. Dark areas D, at which the amount of the exiting light is small due to the refraction at the hollow reflection part 960 and such, are formed between the light exit region E1 and the light exit region E2, thereby causing a problem that a driver and such visibly recognizes these dark areas D at the upper face 953 of the indicator part 950. In order to prevent the formation of such dark area D, it is possible to provide a light diffusing component or a filter member at the hollow reflection part 960; however, in this case, there will be another problem that the number of components is increased and the man-hour for assembling is increased as well, causing an increase in the manufacturing cost of the indicator member Furthermore, there is another problem that, as shown in FIG. 43, when the light receiving part 942 of the base part 940 receives the light L exited from the distal end of the indicator shaft 914, a part L10 of the exited light does not travel toward the indicator part 950 but is leaked outside of the indicator part 950, causing a decrease in the amount of light entering the indicator part 950. Such problem related to the indicator shaft 914 is also caused in the indicator main body 931 (i.e. the indicator member) having the pointing part 951 extending only to the pointing direction S1 from the base part 940.

Thus, in view of the above-described problem, an object of the present invention is to provide an indicator member, an indicator unit and an indicator instrument which can prevent formation of a dark area at an upper face near a reflection part of an indicator part of an indicator member fixed to a translucent indicator shaft.

Solution to Problem (1.4)

In order to achieve the above-described object, the present invention provides, in a first aspect, an indicator member made of translucent material and having a base part arranged to receive light from a light source, an indicator part extending from one end of the base part to each of a pointing direction and a rear end direction opposite of the pointing direction, and a reflection part provided at the indicator part and arranged at a location opposed to the base part so as to reflect the light received at the base part toward the pointing direction and the rear end direction, wherein the reflection part includes a plurality of partial reflection parts arranged in parallel in a widthwise direction of the indicator part, wherein each of the plurality of partial reflection parts includes at least a pointing direction reflection face arranged to reflect a part of the light received at the base part toward the pointing direction and transmit another part of the light, a rear end direction reflection face connected to the pointing direction reflection face in an intersecting fashion and arranged to reflect a part of the light received at the base part toward the rear end direction and transmit another part of the light, and a corner formed at an intersection of the pointing direction reflection face and the rear end direction reflection face and arranged at a location opposed to the base part, and wherein the corners of the respective partial reflection parts located adjacent to each other are displaced in the pointing direction or the rear end direction.

In order to achieve the above-described object, the present invention provides, in a second aspect, the indicator member according to the first aspect wherein the reflection part is formed symmetric about a widthwise center of the indicator part.

In order to achieve the above-described object, the present invention provides, in a third aspect, the indicator member according to the first or second aspect wherein the reflection part includes a first partial reflection part, a second partial reflection part and a third partial reflection part, wherein the corner of the first partial reflection part and the corner of the third partial reflection part are displaced in the same fashion toward the rear end direction with respect to a center of the base part, and wherein the corner of the second partial reflection part is relatively displaced toward the pointing direction with respect to the corner of the first partial reflection part and the corner of the third partial reflection part.

In order to achieve the above-described object, the present invention provides, in a fourth aspect, an indicator unit including the indicator member described in any one of the first to third aspects, and a cover member arranged to cover the indicator part of the indicator member and having a slit though which the light from an upper face of the indicator part facing an opposite direction of the base part is passed.

In order to achieve the above-described object, the present invention provides, in a fifth aspect, an indicator instrument including the indicator unit described in the fourth aspect, a drive device arranged to rotate an indicator shaft to which the indicator unit is attached in accordance with measured quantity, and a light source which emits light to be received at the indicator member of the indicator unit.

(2.4)

In order to achieve the above-described object, the present invention provides, in a sixth aspect, an indicator member made of translucent material and having a base part arranged to receive light from a light source, an indicator part extending from one end of the base part to each of a pointing direction and a rear end direction opposite of the pointing direction, and a hollow reflection part provided in the indicator part and arranged at a location opposed to the base part so as to reflect the light received at the base part toward the pointing direction and the rear end direction, wherein the hollow reflection part includes a pointing direction reflection face arranged to reflect a part of the light received at the base part toward the pointing direction and transmit another part of the light, a rear end direction reflection face connected to the pointing direction reflection face in an intersecting fashion and arranged to reflect a part of the light received at the base part toward the rear end direction and transmit another part of the light, and a transmission face connected to each of the pointing direction reflection face and the rear end direction reflection face in an intersecting fashion and arranged to face an upper face of the indicator part, and wherein the transmission face is formed into a convexly curved surface which is convex toward the upper face of the indicator part from one end connected to the pointing direction reflection face to another end connected to the rear end direction reflection face.

In order to achieve the above-described object, the present invention provides, in a seventh aspect, an indicator unit including the indicator member described in the sixth aspect, and a cover member arranged to cover the indicator part of the indicator member and having a slit through which the light from an upper face of the indicator part facing an opposite direction of the base part is passed.

In order to achieve the above-described object, the present invention provides, in an eighth aspect, an indicator instrument including the indicator unit described in the seventh aspect, a drive device arranged to rotate an indicator shaft to which the indicator unit is attached in accordance with measured quantity, and a light source which emits light to be received at an indicator member of the indicator unit.

(3.4)

In order to achieve the above-described object, the present invention provides, in a ninth aspect, an indicator member made of translucent material and having a base part arranged to receive light from a light source, an indicator part having a pointing part extending from one end of the base part to a pointing direction and a rearward part extending to a rear end direction opposite of the pointing direction, and a hollow reflection part provided in the indicator part and arranged at a location opposed to the base part so as to reflect the light received at the base part toward the pointing direction and the rear end direction, wherein the hollow reflection part includes a pointing direction reflection face arranged to reflect a part of the light received at the base part toward the pointing direction and transmit another part of the light, a rear end direction reflection face connected to the pointing direction reflection face in an intersecting fashion and arranged to reflect a part of the light received at the base part toward the rear end direction and transmit another part of the light, and a transmission face connected to each of the pointing direction reflection face and the rear end direction reflection face in an intersecting fashion, wherein a notch is provided at a bottom face of the pointing part facing the base part, and wherein the notch includes an upward reflection face arranged to reflect light reflected by the pointing direction reflection face toward a section of the upper face of the pointing part at opposite side of the bottom face, the section being adjacent to the hollow reflection part.

In order to achieve the above-described object, the present invention provides, in a tenth aspect, an indicator unit including the indicator member described in the ninth aspect, and a cover member arranged to cover the indicator part of the indicator member and having a slit through which the light from the upper face of the indicator part is passed, the upper face of the indicator part including an upper face of the pointing part.

In order to achieve the above-described object, the present invention provides, in a eleventh aspect, an indicator instrument including the indicator unit described in the tenth aspect, a drive device arranged to rotate an indicator shaft to which the indicator unit is attached in accordance with measured quantity, and a light source which emits light to be received at the indicator member of the indicator unit.

(4.4)

In order to achieve the above-described object, the present invention provides, in a twelfth aspect, an indicator member made of translucent material and having a base part including a shaft receiving part attached to an end of an indicator shaft arranged to guide light from a light source, the base part being arranged to receive the light guided in the indicator shaft, a pointing part extending from one end of the base part to a pointing direction, and a pointing direction reflection face arranged at the pointing part adjacent to the base part so as to reflect the light received at the base part toward a distal end of the pointing part, wherein a reflection part for indicator shaft is formed continuously from the base part to the pointing part so as to reflect light heading from the indicator shaft to outside of the base part toward an upper face of the pointing part adjacent to the pointing direction reflection face.

In order to achieve the above-described object, the present invention provides, in a thirteenth aspect, the indicator member according to the twelfth aspect wherein the reflection part for indicator shaft includes a light guide part formed continuously from the base part to the pointing part and arranged to guide the light heading from the indicator shaft to outside of the base part, and a reflection face for indicator shaft arranged to reflect the light guided in the light guide part toward the upper face of the pointing part adjacent to the pointing direction reflection face.

In order to achieve the above-described object, the present invention provides, in a fourteenth aspect, the indicator member according to the twelfth or thirteenth aspect including a rearward part extending from one end of the base part to a rear end direction opposite of the pointing direction, and a rear end direction reflection face provided at the rearward part adjacent to the base part so as to reflect the light received at the base part toward the rearward part, wherein the reflection part for indicator shaft is formed continuously from the base part to the rearward part so as to reflect light heading from the indicator shaft to outside of the base part toward an upper face of the rearward part adjacent to the rear end direction reflection face.

In order to achieve the above-described object, the present invention provides, in a fifteenth aspect, an indicator member made of translucent material and having a base part including a shaft receiving part attached to an end of an indicator shaft arranged to guide light from a light source, the base part being arranged to receive the light guided in the indicator shaft, a pointing part extending from one end of the base part to a pointing direction, a rearward part extending from the one end of the base part to a rear end direction opposite of the pointing direction, a pointing direction reflection face arranged at the pointing part adjacent to the base part so as to reflect the light received at the base part toward a distal end of the pointing part, and a rear end direction reflection face provided at the rearward part adjacent to the base part so as to reflect the light received at the base part toward the rearward part, wherein a reflection part for indicator shaft is formed continuously from the base part to the rearward part so as to reflect light heading from the indicator shaft to outside of the base part toward an upper face of the rearward part adjacent to the rear end direction reflection face.

In order to achieve the above-described object, the present invention provides, in a sixteenth aspect, the indicator member according to any one of the twelfth to fifteenth aspects wherein the reflection part for indicator shaft includes a plurality of partial reflection faces aligned in a widthwise direction of the indicator member.

In order to achieve the above-described object, the present invention provides, in a seventeenth aspect, an indicator unit including the indicator member described in any one of the twelfth to sixteenth aspects, and a cover member arranged to cover the indicator member and having a slit through which the light from an upper face of the indicator member is passed.

In order to achieve the above-described object, the present invention provides, in an eighteenth aspect, the indicator unit according to the seventeenth aspect wherein the reflection part for indicator shaft of the indicator member includes a reflection face for slit projecting from the base part to the widthwise direction of the indicator member so as to reflect light heading from the indicator shaft to an inner face of the cover member toward a slit of the cover member adjacent to the pointing direction reflection face.

In order to achieve the above-described object, the present invention provides, in a nineteenth aspect, an indicator unit including an indicator member made of translucent material and a cover member, wherein the indicator member includes a base part including a shaft receiving part attached to an end of an indicator shaft arranged to guide light from a light source, the base part being arranged to receive the light guided in the indicator shaft, a pointing part extending from one end of the base part to a pointing direction, and a pointing direction reflection face arranged at the pointing part adjacent to the base part so as to reflect the light received at the base part toward a distal end of the pointing part, wherein the cover member is arranged to cover the indicator member and having a slit through which the light from an upper face of the indicator member is passed, and wherein the indicator unit further includes a reflection face for slit projecting from the base part to a widthwise direction of the indicator member so as to reflect light heading from the indicator shaft to an inner face of the cover member toward a slit of the cover member adjacent to the pointing direction reflection face.

In order to achieve the above-described object, the present invention provides, in a twentieth aspect, the indicator unit according to the nineteenth aspect wherein the indicator member includes a rearward part extending from one end of the base part to a rear end direction opposite of the pointing direction, and a rear end direction reflection face provided at the rearward part adjacent to the base part so as to reflect the light received at the base part toward the rearward part, wherein the reflection face for slit is arranged to reflect light heading from the indicator shaft to the inner face of the cover member toward a slit of the cover member adjacent to the rear end direction reflection face.

In order to achieve the above-described object, the present invention provides, in a twenty-first aspect, an indicator instrument including the indicator unit described in any one of the seventeenth to twentieth aspects, a drive device having the indicator shaft to which the indicator unit is attached, the drive device being arranged to rotate the indicator shaft in accordance with measured quantity, and a light source which emits light to be guided in the indicator shaft of the drive device.

Advantageous Effects of Invention (1.5)

According to the invention described in the first to fifth aspects, the reflection part provided at the indicator part of the indicator member includes the plurality of partial reflection parts including at least the pointing direction reflection face, the rear end direction reflection face and the corner formed at the intersection of the pointing direction reflection face and the rear end direction reflection face and arranged at the location opposed to the base part, wherein the corners of the respective partial reflection parts located adjacent to each other are displaced in the pointing direction or the rear end direction. Thus, the corners at which the brightness of the light transmitted through the pointing direction reflection face or the rear end direction reflection face are not concentrated at one location but are dispersed in the pointing direction and in the rear end direction. Therefore, even if the corner of one of the partial reflection parts is arranged toward the rear end direction to reflect more light toward the pointing direction, the corners of the other ones of the partial reflection parts are displaced toward the pointing direction so as to be placed near the end at the pointing direction side and the end at the rear end direction side of an upper region of the reflection part. Therefore, the brightness near the both ends of this region can be maintained, thereby preventing a dark area from being formed at a location above the reflection part at a low cost without providing a light diffusing member or the like.

According to the invention described in the second aspect, the reflection part is formed symmetric about the widthwise center of the indicator part, thereby preventing non-uniformity in the brightness in the widthwise direction.

(2.5)

According to the invention described in the sixth to eighth aspects, the hollow reflection part provided at the indicator part of the indicator member includes the pointing direction reflection face, the rear end direction reflection face and the transmission face, and this transmission face is formed into the convexly curved surface which is convex toward the upper face of the indicator part from one end connected to the pointing direction reflection face to another end connected to the rear end direction reflection face. Thus, for the light which has transmitted through each of the pointing direction reflection face and the rear end direction reflection face, the incidence angle of this light with respect to the transmission face is adjusted such that the light is refracted so that the spread angle of the light which has entered the transmission face is increased compared to said spread angle in the case of the transmission face formed into the flat surface. Therefore, by adjusting the shape of the transmission face and optimizing the spread angle of the light can prevent the dark area from being formed near the location at the upper face of the indicator part and at the extension of the pointing direction reflection face and the rear end direction reflection face, thereby preventing non-uniformity in the brightness at the upper face of the indicator part at a low cost without providing a light diffusing member or the like.

(3.5)

According to the invention described in the ninth to eleventh aspects, the indicator member includes the notch provided at the bottom face of the pointing part facing the base part, and the notch includes the upward reflection face which reflects the light reflected by the pointing direction reflection face toward the section of the upper face of the pointing part at opposite side of the bottom face, the section being adjacent to the hollow reflection part. Thus, without making the pointing part to be thin since the notch is formed into the notched shape, the light reflected by the pointing direction reflection face can be reflected toward the upper face of the pointing part by the upward reflection face of the notch. Thus, the amount of light exiting from said section can be increased, thereby preventing the dark area from being formed at said section and preventing the non-uniformity in the brightness at the upper face of the indicator part.

(4.5)

According to the invention described in the twelfth aspect, the reflection part for indicator shaft is formed continuously from the base part to the pointing part so as to reflect the light heading from the indicator shaft fixed to the shaft receiving part of the base part to the outside of the base part toward the upper face of the pointing part adjacent to the pointing direction reflection face. Thus, the light leaking from the base part to the outside of the indicator member can be reduced, and this light can be guided toward the upper face of the pointing part near the end of the pointing direction reflection face, thereby preventing the dark area from being formed at the upper face of the pointing part. Therefore, the non-uniformity in the brightness at the upper face (i.e. the light-emitting face) of the indicator member can be prevented, and the lighting quality can be improved. Furthermore, since there is no need to provide the light diffusing component for preventing the dark area from being formed at the upper face of the pointing part at the pointing direction reflection face, the number of components can be reduced, thereby reducing the cost of the indicator member.

In addition to the effect of the invention of the twelfth aspect, according to the invention described in the thirteenth aspect, the reflection part for indicator shaft includes the light guide part and the reflection face for indicator shaft, thus the light heading from the indicator shaft to the outside of the pointing part can be guided by the light guide part toward the pointing part and the reflection face for indicator shaft. Thus, the light leaking from the base part to the outside of the indicator member can be reduced even more.

In addition to the effect of the invention of the twelfth or thirteenth aspect, according to the invention described in the fourteenth aspect, the reflection part for indicator shaft is formed continuously from the base part to the rearward part so as to reflect light heading from the indicator shaft fixed to the shaft receiving part of the base part to the outside of the base part toward the upper face of the rearward part adjacent to the rear end direction reflection face. Thus, the light leaking from the base part to the outside of the indicator member can be reduced, and this light can be guided toward the upper face of the rearward part near the end of the rear end direction reflection face, thereby preventing the dark area from being formed at the upper face of the rearward part. Therefore, the non-uniformity in the brightness can be prevented from being produced at the upper face of the indicator member from the distal end of the pointing part to the rear end of the rearward part, thereby allowing the upper face of the indicator member to emit light with uniform brightness.

According to the invention described in the fifteenth aspect, the reflection part for indicator shaft is formed continuously from the base part to the rearward part so as to reflect the light heading from the indicator shaft fixed to the shaft receiving part of the base part to the outside of the base part toward the upper face of the rearward part adjacent to the rear end direction reflection face. Thus, the light leaking from the base part to the outside of the indicator member can be reduced, and this light can be guided toward the upper face of the rearward part near the end of the rear end direction reflection face, thereby preventing the dark area from being formed at the upper face of the rearward part. Therefore, the non-uniformity in the brightness at the upper face (i.e. the light-emitting face) of the indicator member can be prevented, and the lighting quality can be improved. Furthermore, since there is no need to provide the light diffusing component for preventing the dark area from being formed at the upper face of the pointing part at the pointing direction reflection face, the number of components can be reduced, thereby reducing the cost of the indicator member.

In addition to the effect of the invention described in any one of the twelfth to fifteenth aspects, according to the invention described in the sixteenth aspect, the reflection part for indicator shaft includes the plurality of partial reflection faces aligned in the widthwise direction of the indicator member. Therefore, various reflection faces having the different shapes can be combined, thus the light from the indicator shaft toward the outside of the base part can be reflected toward the upper face of the indicator member adjacent to the pointing direction reflection face and the rear end direction reflection face even more reliably.

According to the invention described in the seventeenth aspect, the indicator member which prevents the dark area from being formed at the upper face of the pointing part is covered by the cover member, and the upper face of the pointing part is exposed from the slit of the cover member. Thus, the entire slit can emit light with the uniform brightness, thereby improving the lighting quality. Furthermore, since there is no need to provide the diffusing component for preventing the dark area from being formed at the pointing direction reflection face, the number of components can be reduced, thereby reducing the cost of the indicator unit.

In addition to the effect of the invention described in the seventeenth aspect, according to the invention described in the eighteenth aspect, the reflection face for slit is formed to project from the base part to the widthwise direction of the indicator member so as to reflect the light heading from the indicator shaft fixed to the shaft receiving part of the base part to the inner face of the cover member toward the slit of the cover member adjacent to the pointing direction reflection face. Thus, the brightness of the slit adjacent to the pointing direction reflection face can be prevented from being low, thereby allowing the entire slit to emit light with the uniform brightness even more reliably.

According to the invention described in the nineteenth aspect, the light heading from the indicator shaft fixed to the shaft receiving part of the base part to the inner face of the cover member is reflected by the reflection face for slit toward the slit of the cover member adjacent to the pointing direction reflection face. Thus, even if the dark area is formed at the upper face of the pointing part, the light from the reflection face for slit can be directed to exit from the slit located adjacent to this dark area to the outside. Thus, the entire slit from the distal end of the pointing part to the rear end of the rearward part can emit light with the uniform brightness, thereby improving the lighting quality. Furthermore, since there is no need to provide the diffusing component for preventing the dark area from being formed at the pointing direction reflection face, the number of components can be reduced, thereby reducing the cost of the indicator unit.

In addition to the effect of the invention described in the nineteenth aspect, according to the invention described in the twentieth aspect, the light heading from the indicator shaft fixed to the shaft receiving part of the base part to the inner face of the cover member is reflected by the reflection face for slit toward the slit of the cover member adjacent to the rear end direction reflection face. Thus, even if the dark area is formed at the upper face of the rearward part, the light from the reflection face for slit can be directed to exit from the slit located adjacent to this dark area to the outside. Thus, the entire slit from the distal end of the pointing part to the rear end of the rearward part can emit light with the uniform brightness, thereby improving the lighting quality. Furthermore, since there is no need to provide the diffusing component for preventing the formation of the dark area at the rear end direction reflection face, the number of components can be reduced, thereby reducing the cost of the indicator unit.

According to the invention described in the twenty-first aspect, the indicator unit described in any one of the seventeenth to twentieth aspects, the indicator unit which prevents the dark area from being formed at the upper face of the pointing part of the indicator member is rotated by the drive device, and the indicator unit is made luminous by the light from the light source guided in the indicator shaft of the drive device. Thus, the entire slit of the indicator unit can emit light with the uniform brightness, thereby improving the lighting quality. Furthermore, since there is no need to provide the diffusing component for preventing the formation of the dark area at the pointing direction reflection face, the number of components can be reduced, thereby reducing the cost of the indicator unit.

BRIEF DESCRIPTION OF DRAWINGS (1.6)

(2.6)

Figure 9:
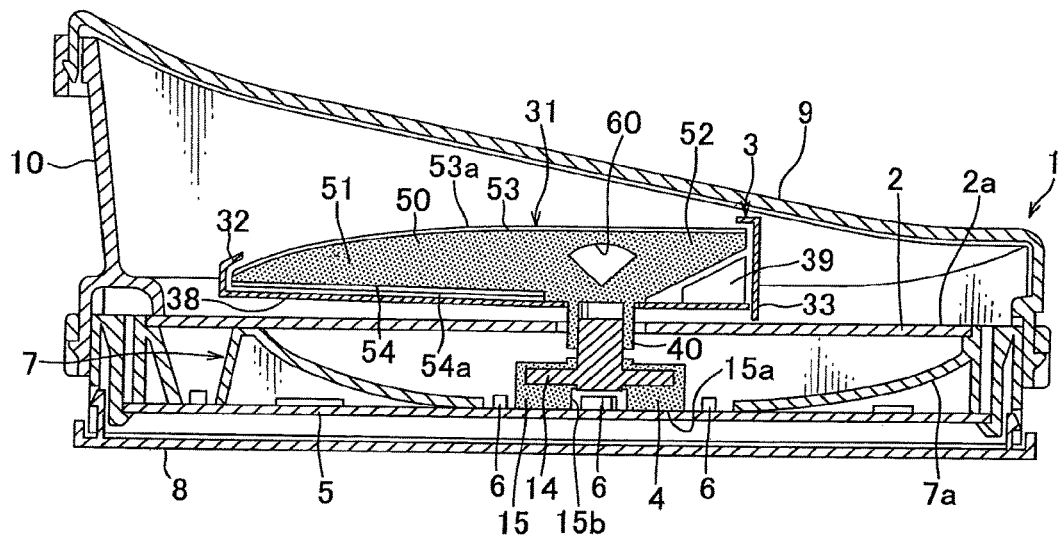
Figure 10:
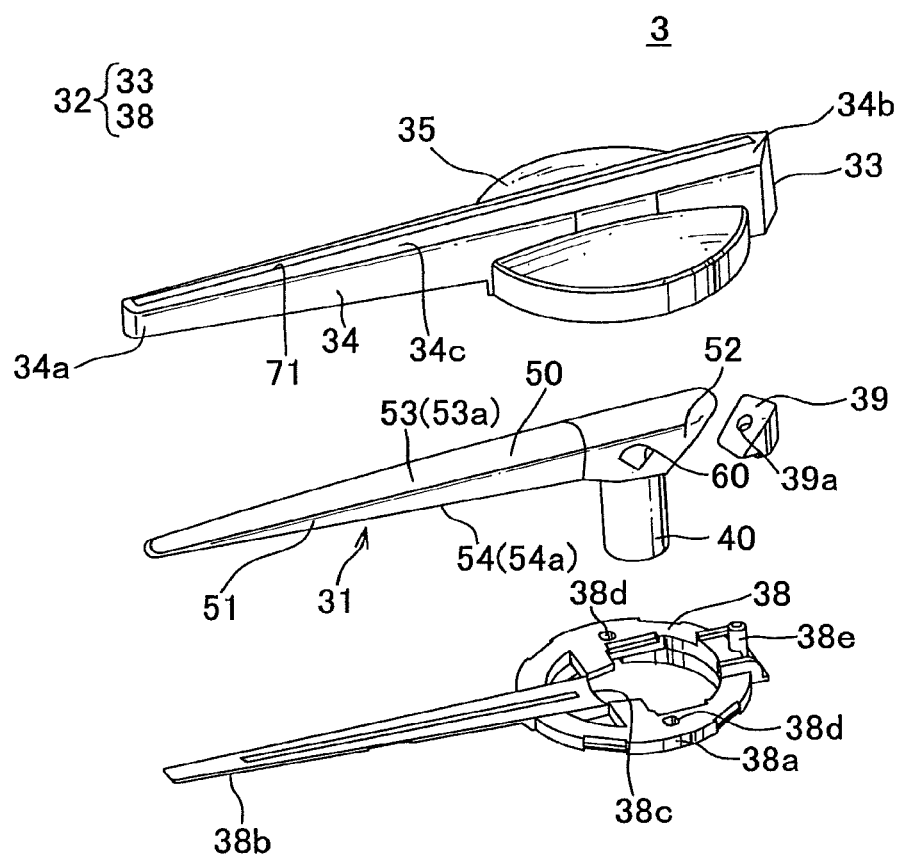
Figure 11A:
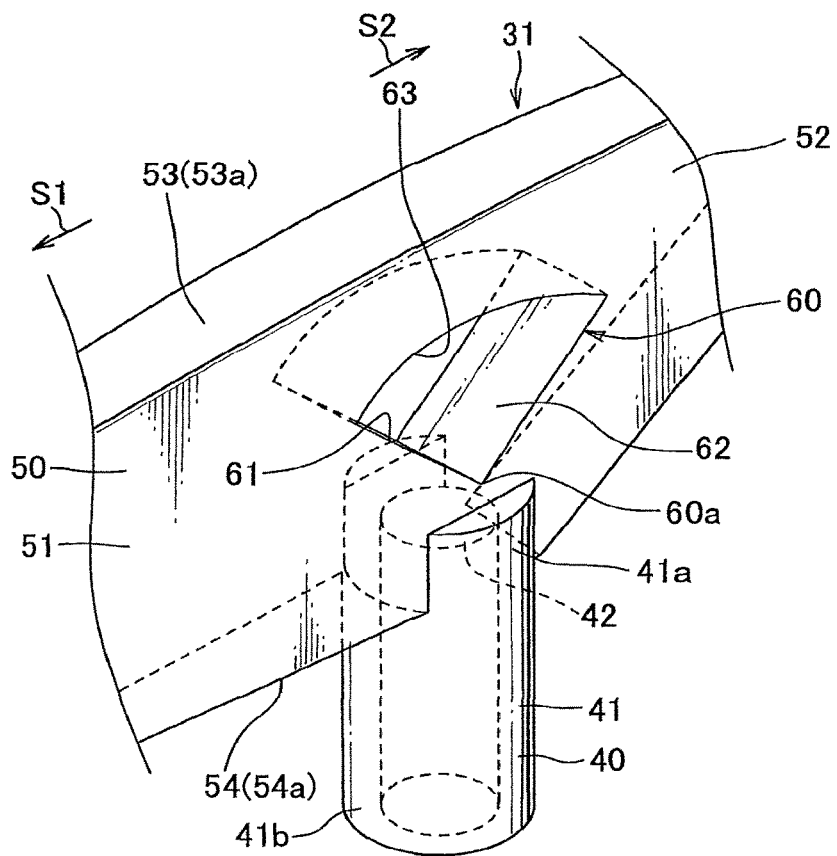
Figure 11B:
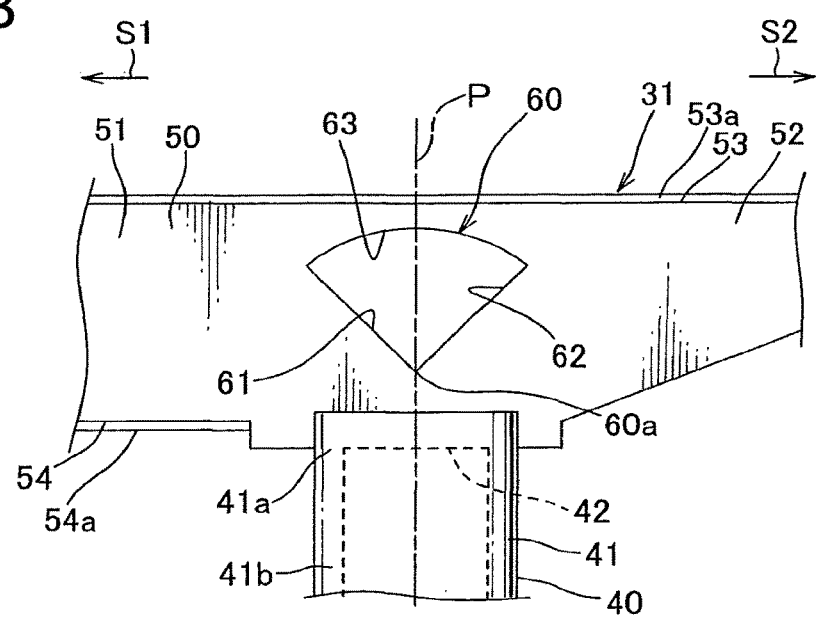
Figure 12:
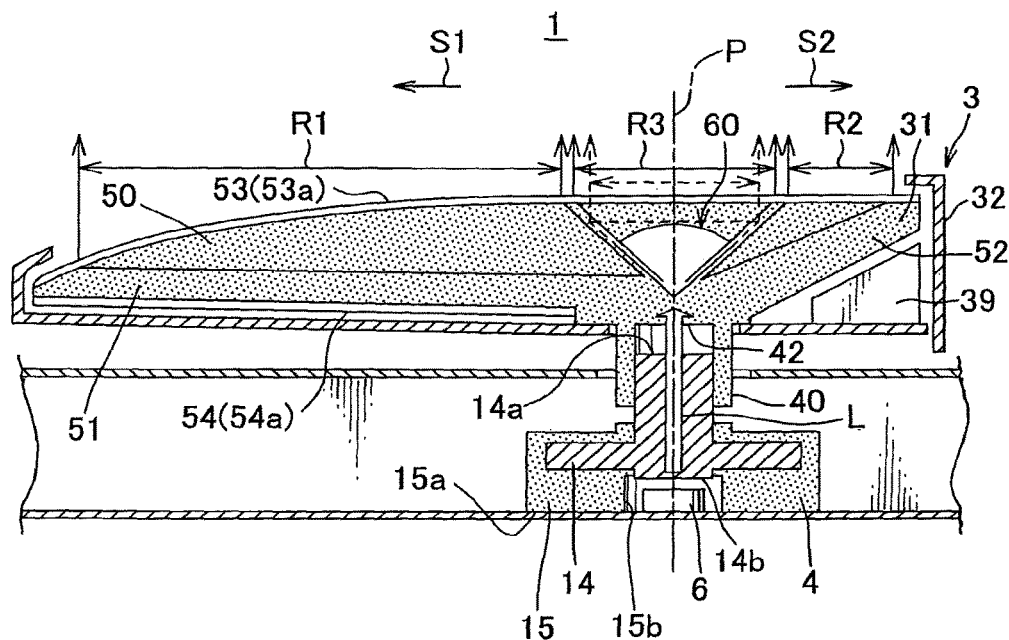
Figure 13:
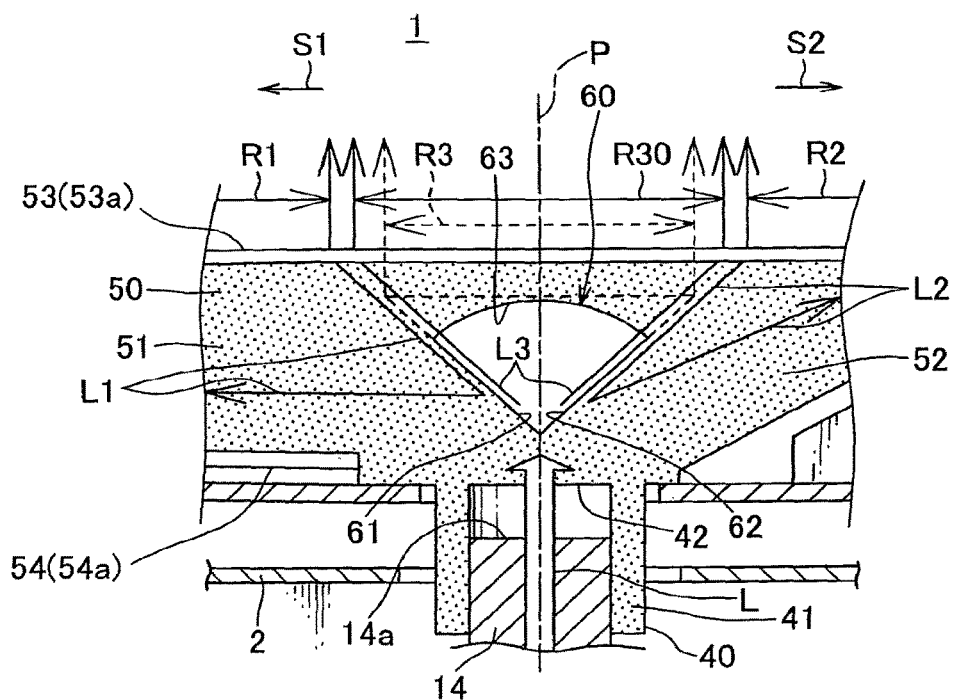
Figure 14:
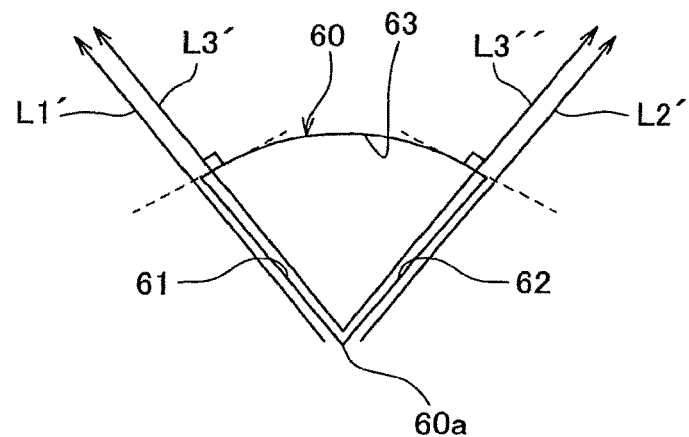
Figure 15A:
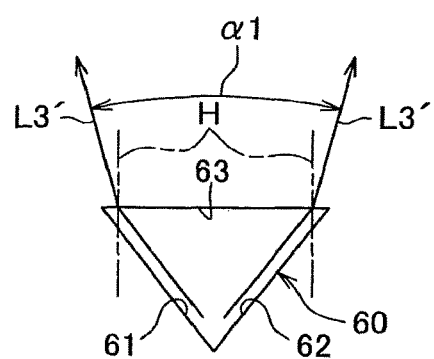
Figure 15B:
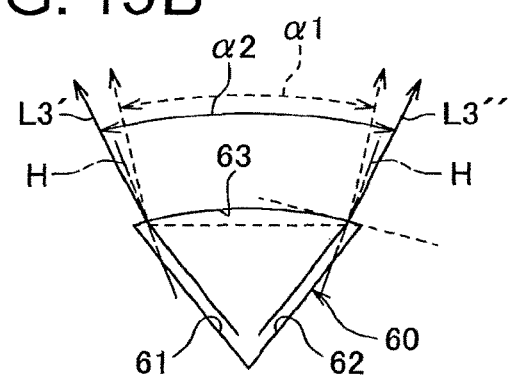
Figure 15C:
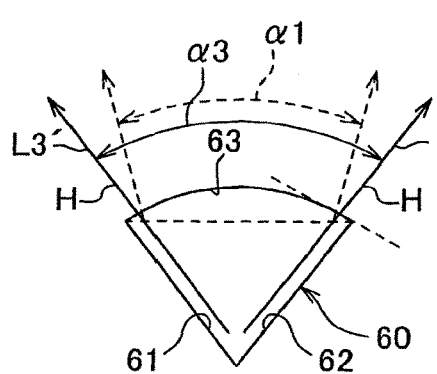
Figure 15D:
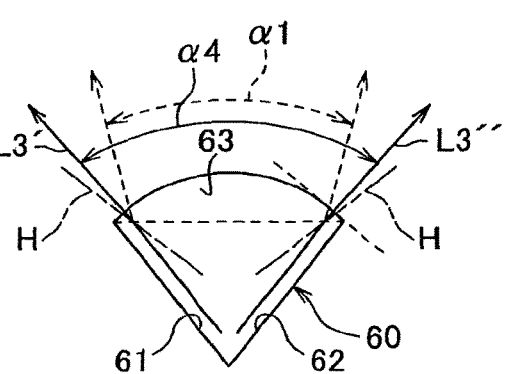
Figure 16:
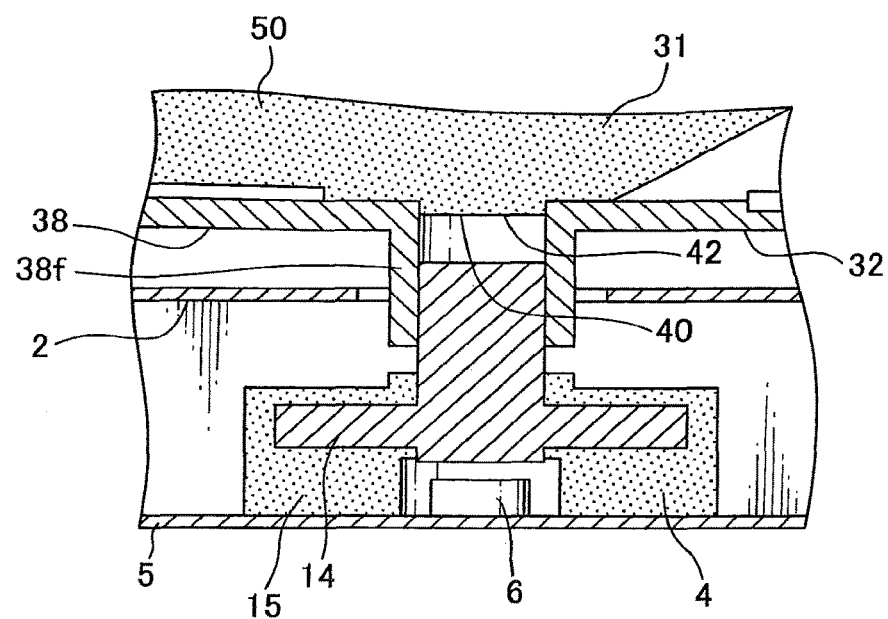
Figure 17:
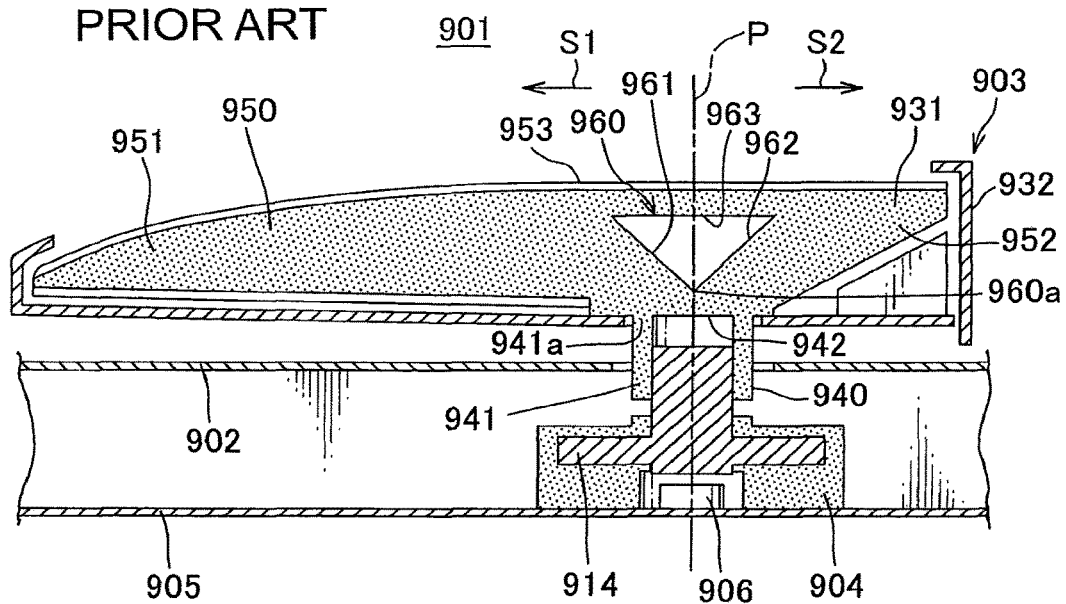
Figure 18:
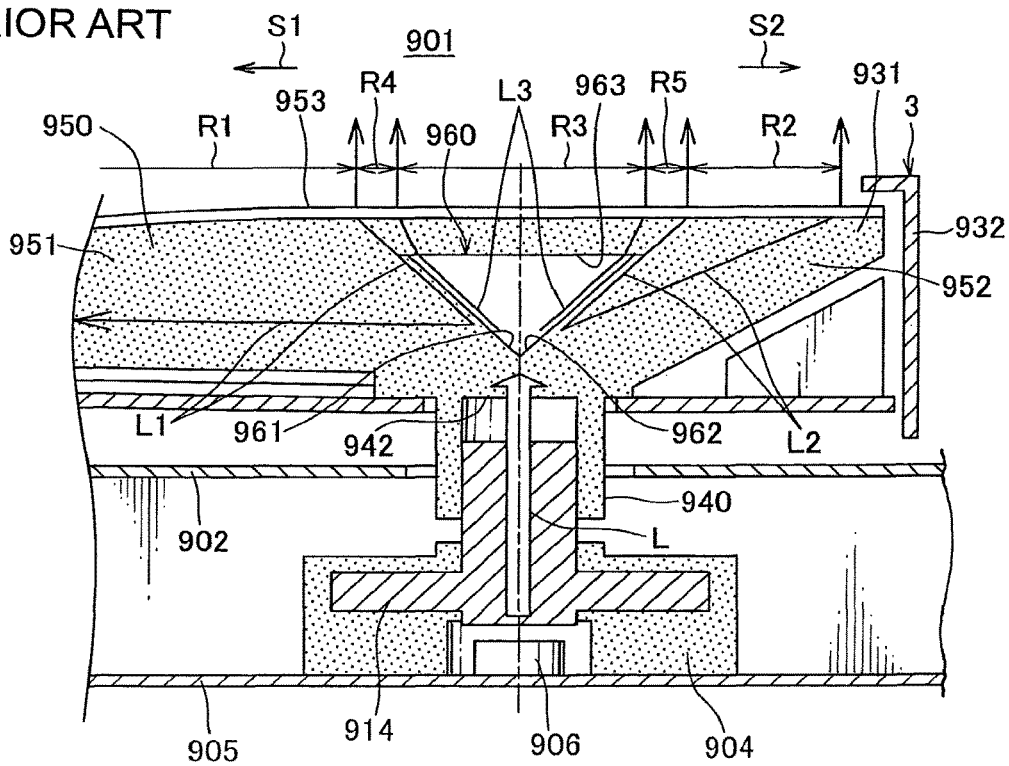
Figure 19:
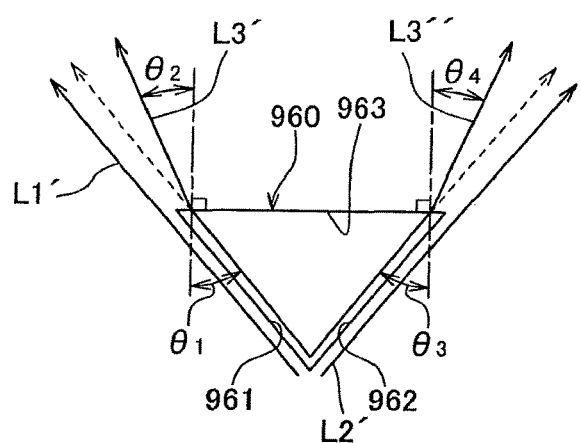
Figure 20:
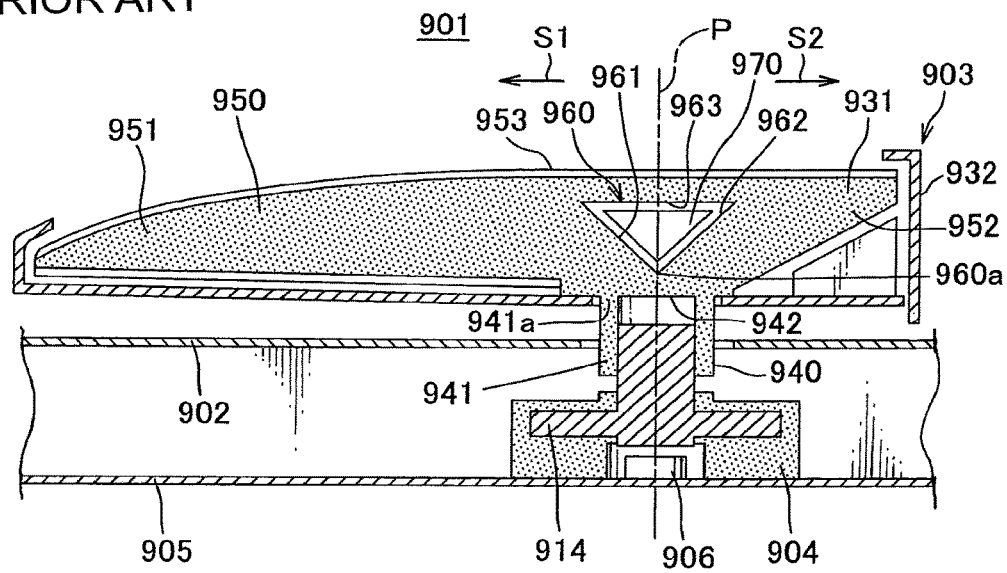

FIG. 9 is a cross sectional view of a vehicle display device as one embodiment of an indicator instrument according to the present invention;

FIG. 10 is an exploded view of a light-emitting indicator (indicator unit) included in the vehicle display device of FIG. 9;

FIG. 11A is a partial perspective view of an indicator main body of the light-emitting indicator of FIG. 10 seen from an angle;

FIG. 11B is a partial side view of an indicator part of the indicator main body seen from a widthwise direction;

FIG. 12 illustrates light which is reflected by and transmitting a hollow reflection part of the indicator main body of FIGS. 11A, 11B;

FIG. 13 shows an enlarged view of the hollow reflection part of FIG. 12;

FIG. 14 illustrates light traveling in a pointing direction reflection face and a rear end direction reflection face in the hollow reflection part of FIG. 13;

FIG. 15A illustrates a spread angle $\alpha 1$ of the light after entering a transmission face formed into a flat surface;

FIG. 15B illustrates a spread angle $\alpha 2$ of the light after entering a transmission face formed into a convexly curved surface;

FIG. 15C illustrates a spread angle $\alpha 3$ of the light after entering a transmission face formed into a convexly curved surface having a degree of swelling (i.e. curvature) larger than the transmission face of FIG. 15B;

FIG. 15D illustrates a spread angle $\alpha 4$ of the light after entering a transmission face formed into a convexly curved surface having a degree of swelling (i.e. curvature) larger than the transmission face of FIG. 15C;

FIG. 16 is a partial cross sectional view showing an arrangement of a modified example of the light-emitting indicator of FIG. 10;

FIG. 17 shows an arrangement of a conventional indicator instrument and light-emitting indicator;

FIG. 18 illustrates light which is reflected by and transmitting a hollow reflection part of an indicator main body of the light-emitting indicator of FIG. 17;

FIG. 19 illustrates light traveling near the hollow reflection part of FIG. 18;

FIG. 20 shows the light-emitting indicator of FIG. 17 provided with a light diffusing member in the hollow reflection part.

(3.6)

Figure 21:
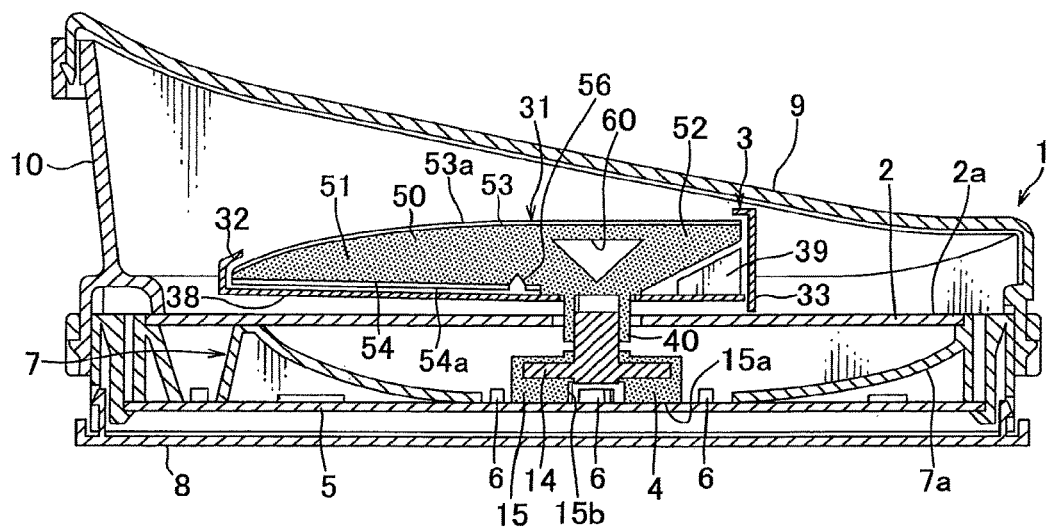
Figure 22:
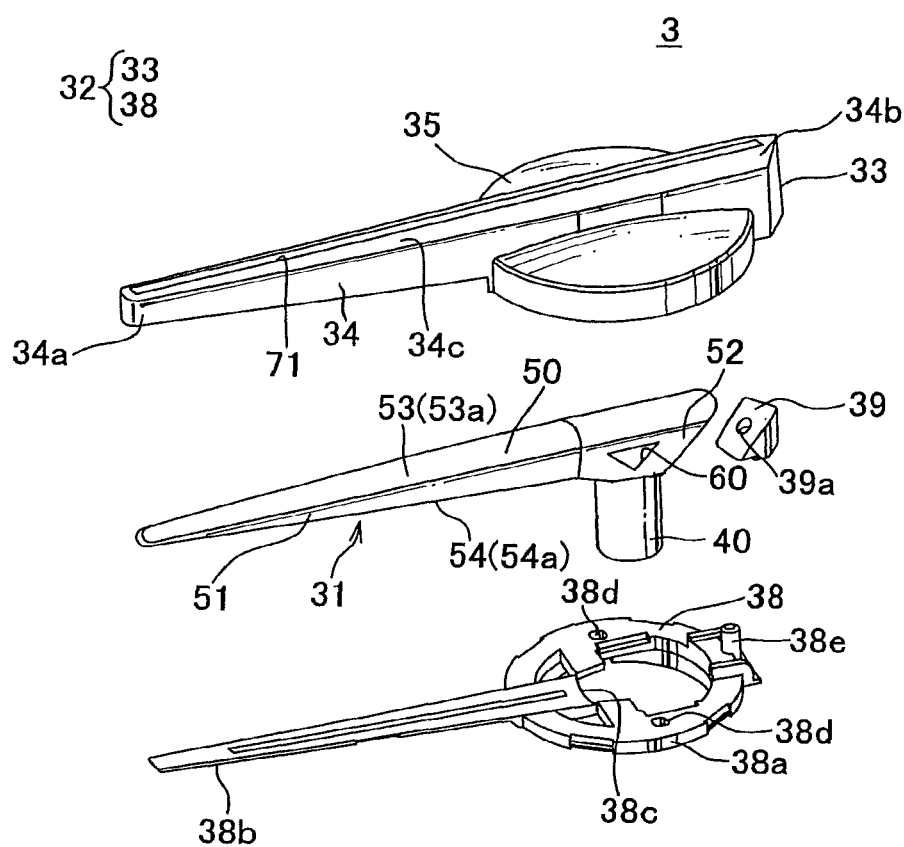
Figure 23A:
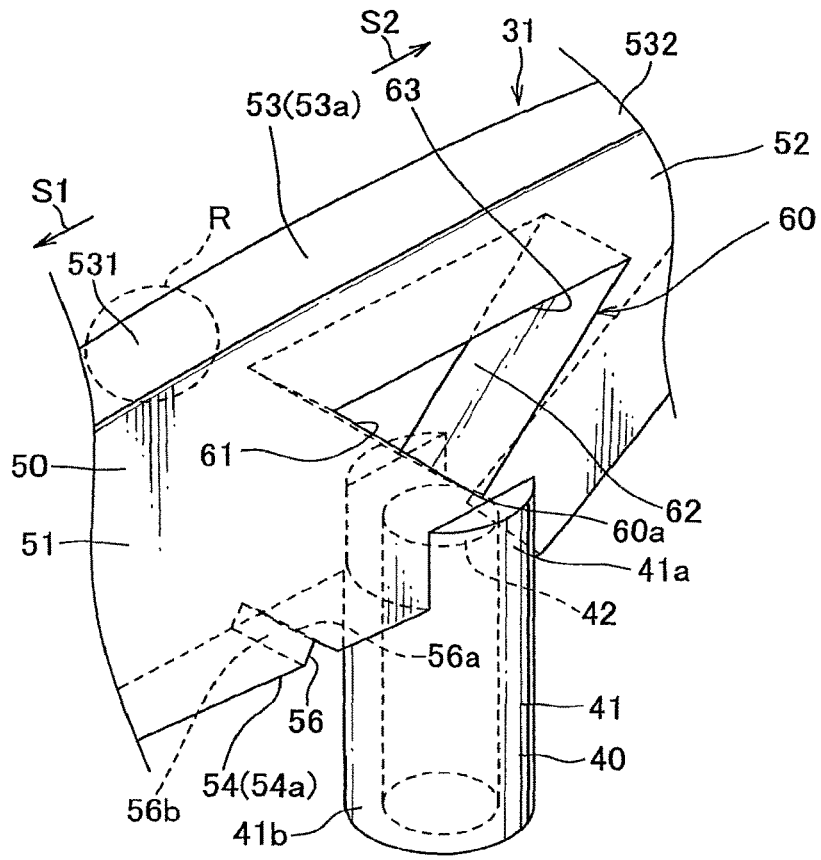
Figure 23B:
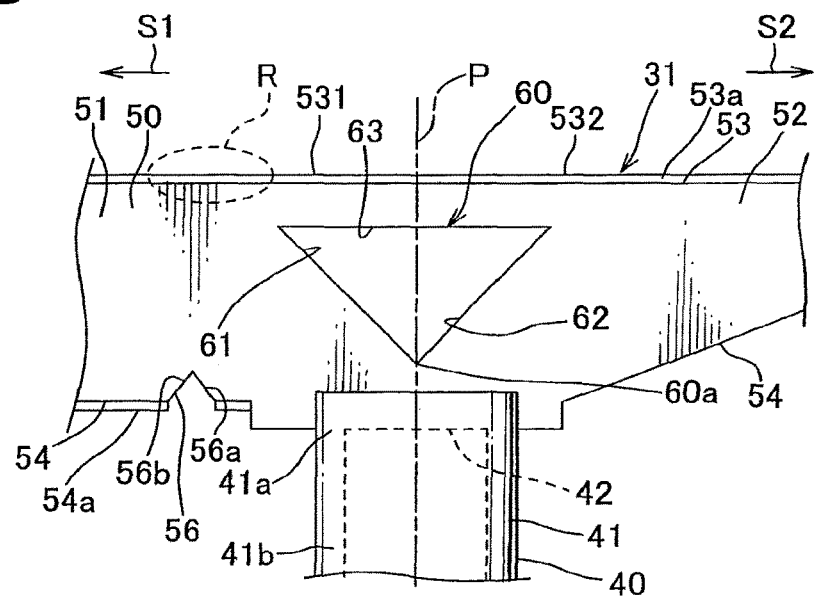
Figure 24A:
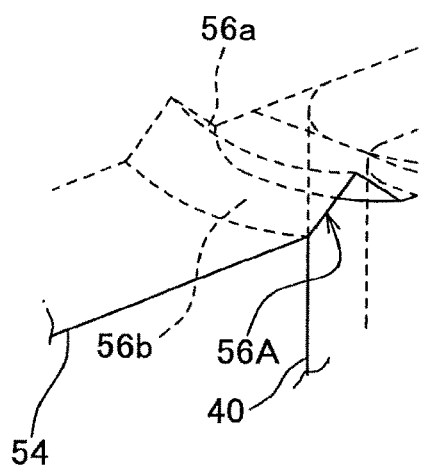
Figure 24B:
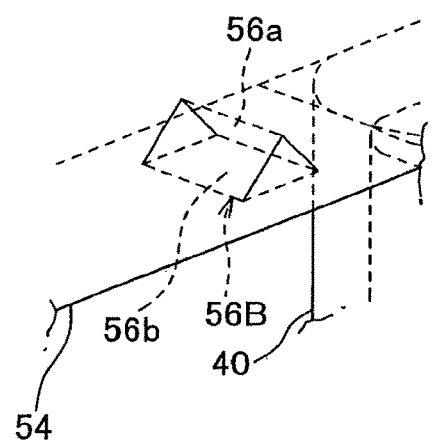
Figure 24C:
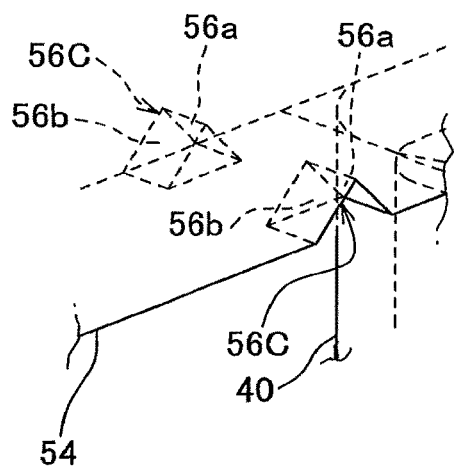
Figure 24D:
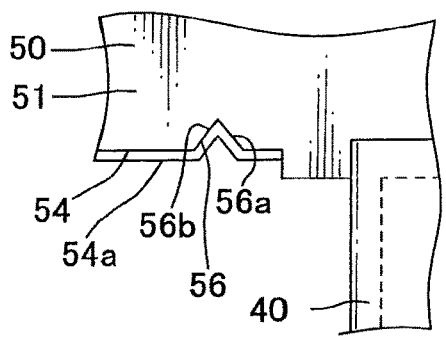
Figure 25:
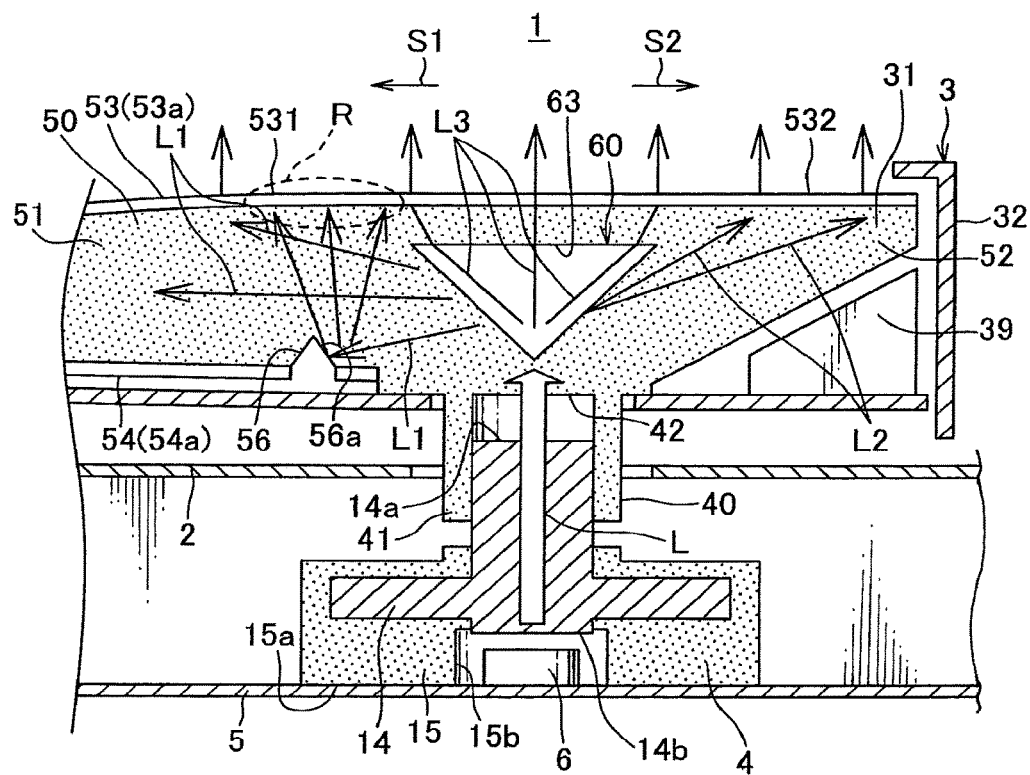
Figure 26:
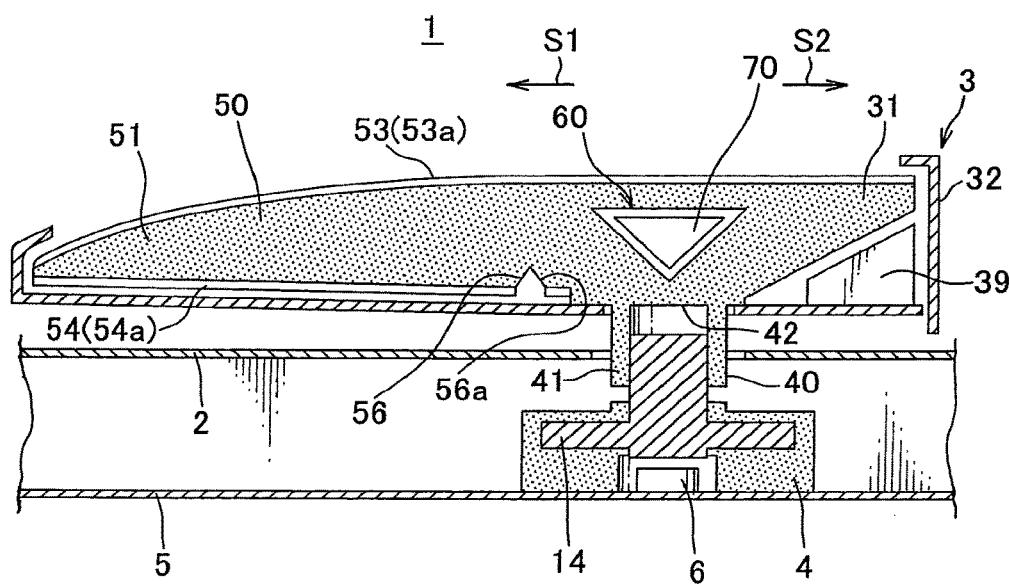
Figure 27:
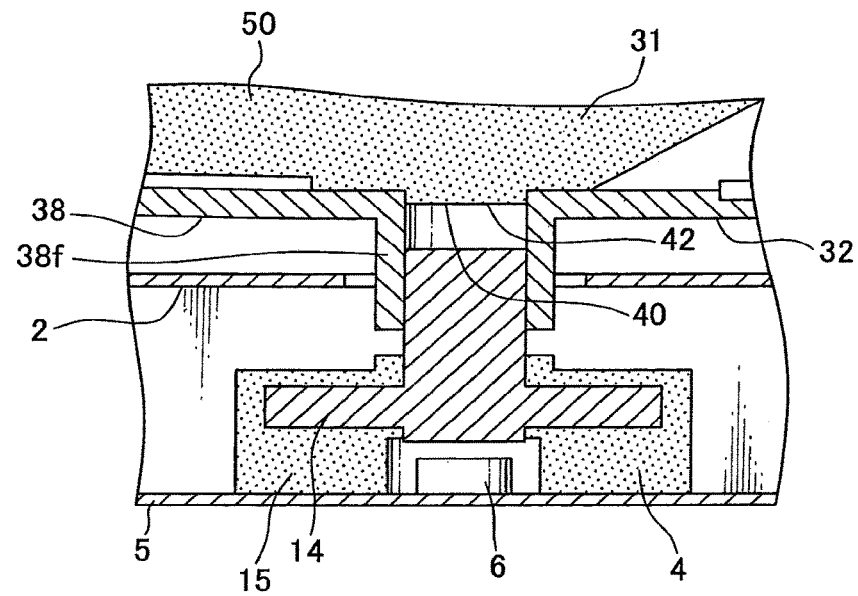
Figure 28:
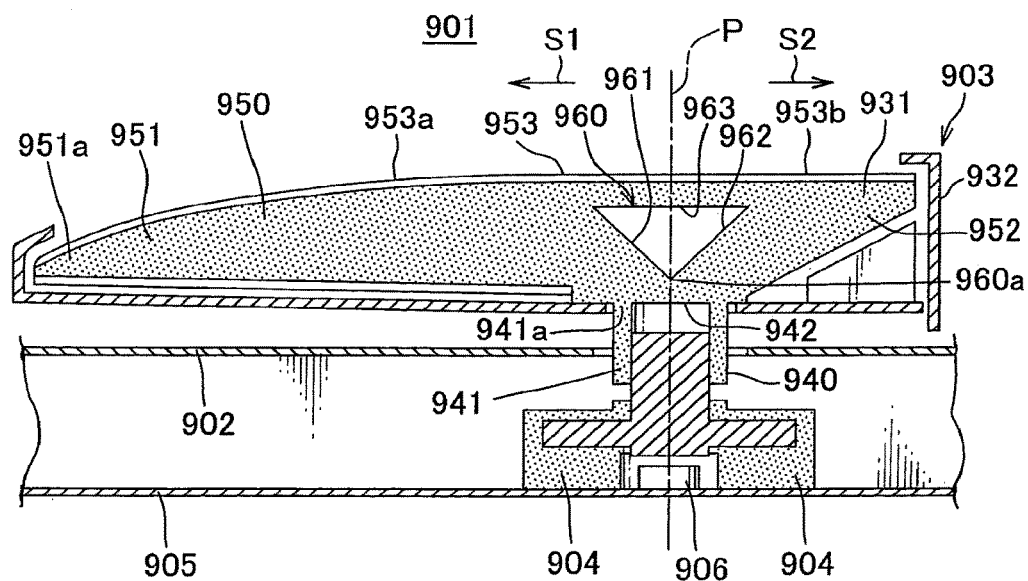
Figure 29:
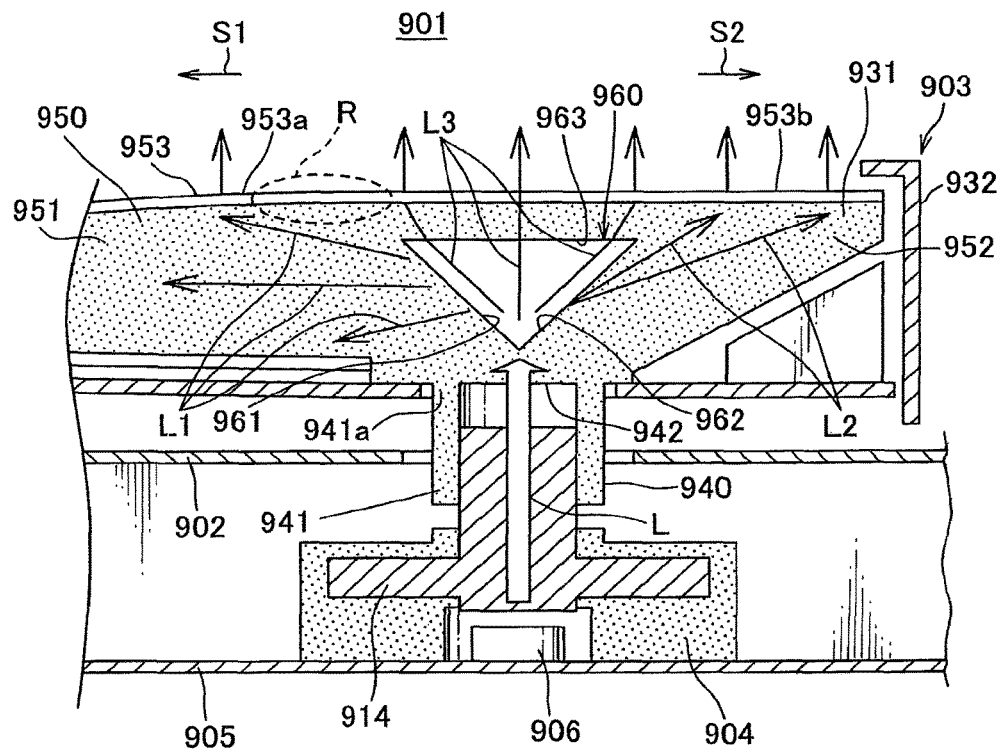
Figure 30:
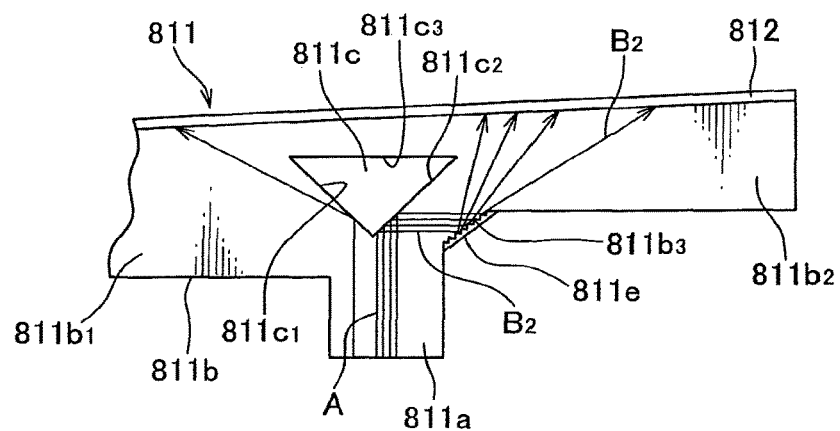

FIG. 21 is a cross sectional view of a vehicle display device as one embodiment of an indicator instrument according to the present invention;

FIG. 22 is an exploded view of a light-emitting indicator (indicator unit) included in the vehicle display device of FIG. 21;

FIG. 23A is a partial perspective view of an indicator main body of the light-emitting indicator of FIG. 22 seen from an angle;

FIG. 23B is a partial side view of an indicator part of the indicator main body seen from a widthwise direction;

FIG. 24A shows an arrangement of a first modified example of a notch portion (i.e. arc-shape) provided at the indicator main body of FIGS. 23A, 23B;

FIG. 24B shows an arrangement of a second modified example of the notch portion (i.e. only at a widthwise center);

FIG. 24C shows an arrangement of a third modified example of the notch portion (i.e. only at both widthwise ends);

FIG. 24D shows an arrangement of a fourth modified example of the notch portion (i.e. having a reflection layer);

FIG. 25 illustrates light traveling in the indicator part of the indicator main body of FIG. 23A, 23B;

FIG. 26 shows an arrangement of a modified example of the indicator main body of FIG. 23A, 23B;

FIG. 27 is a partial cross sectional view showing an arrangement of a modified example of the light-emitting indicator of FIG. 22;

FIG. 28 shows an arrangement of a conventional indicator instrument and a light-emitting indicator;

FIG. 29 illustrates light traveling in an indicator part of an indicator main body of the light-emitting indicator of FIG. 28; and FIG. 30 shows an arrangement of an indicator main body included in another conventional light-emitting indicator.

Figure 31:
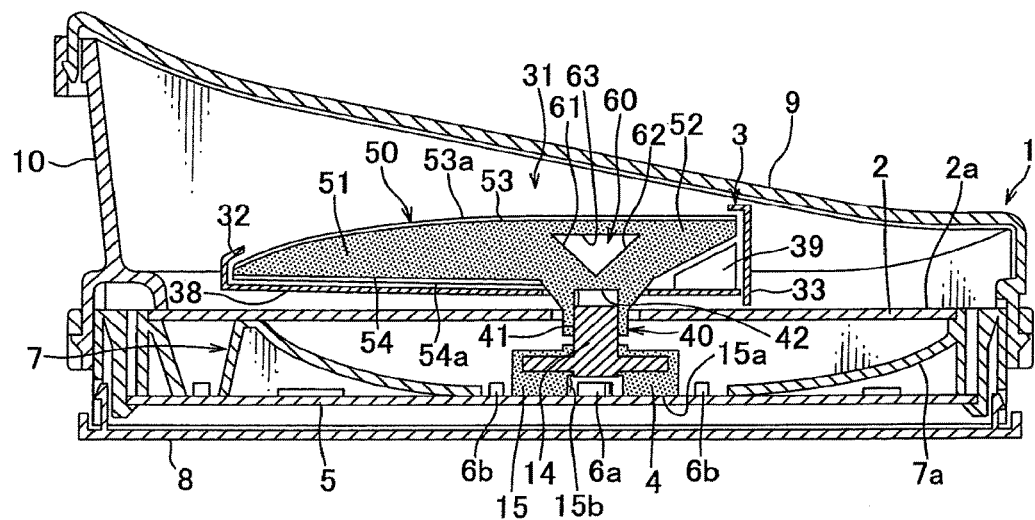
Figure 32:
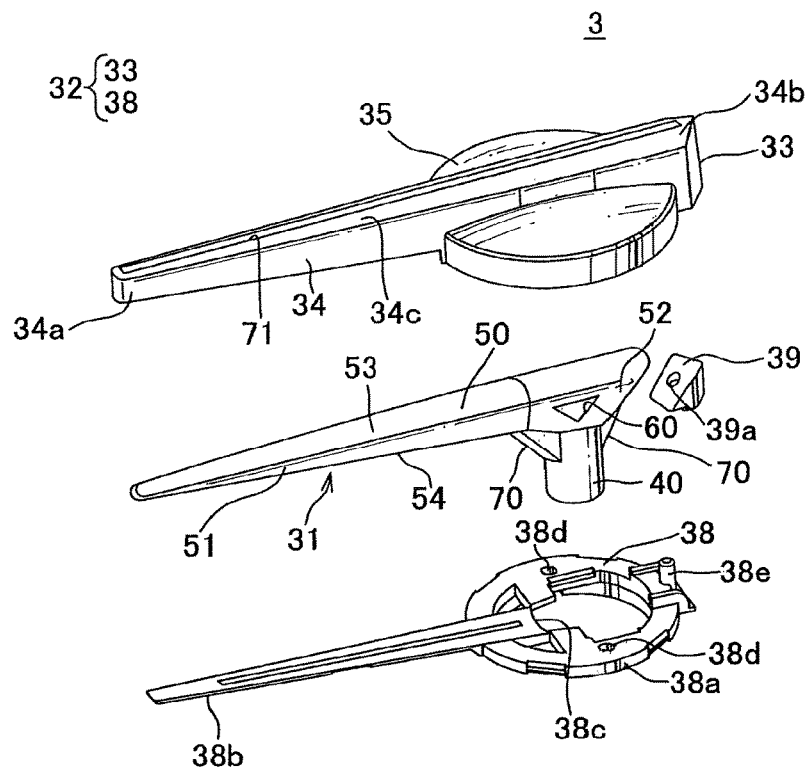
Figure 33:
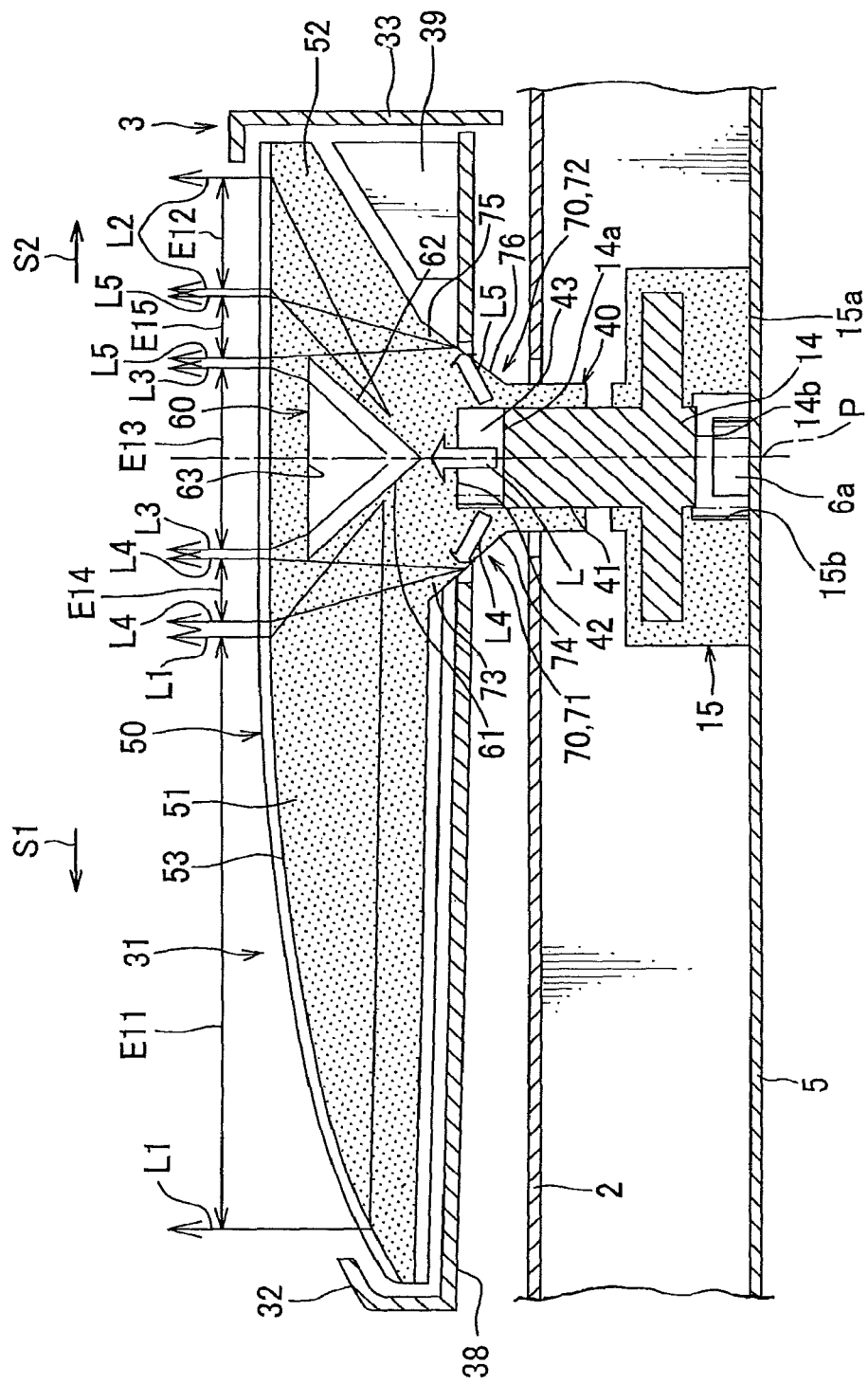
Figure 34:
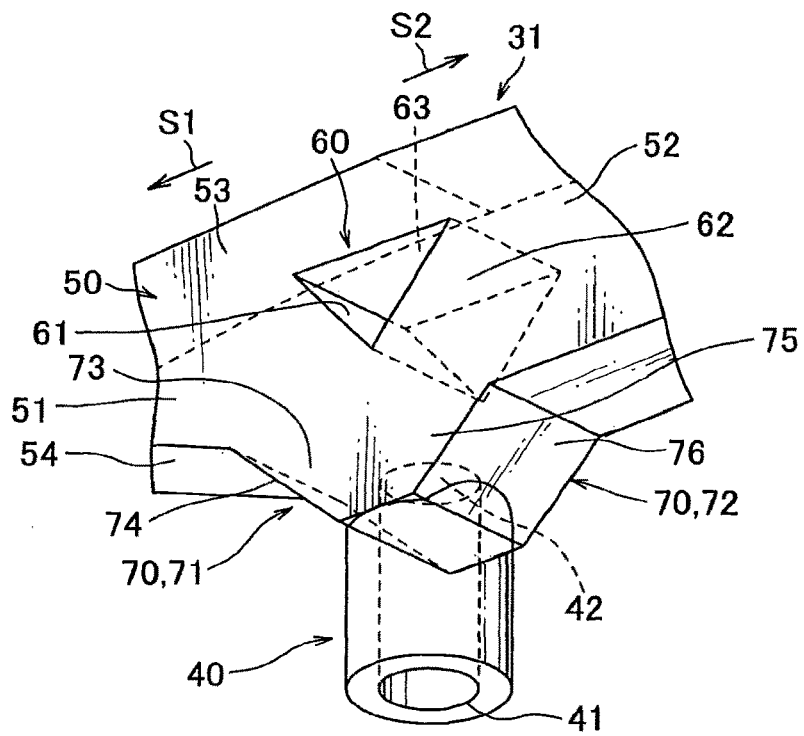
Figure 35:
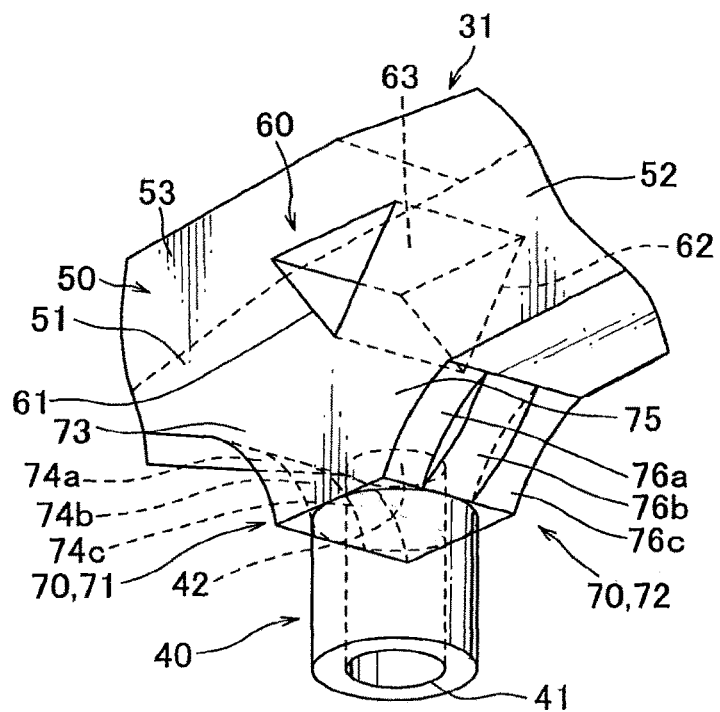
Figure 36:
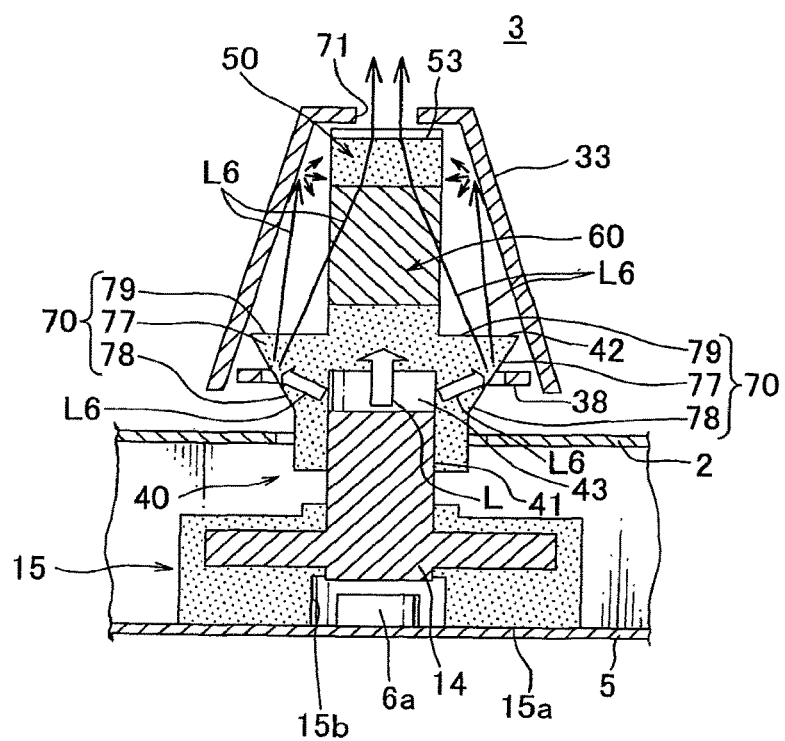
Figure 37A:
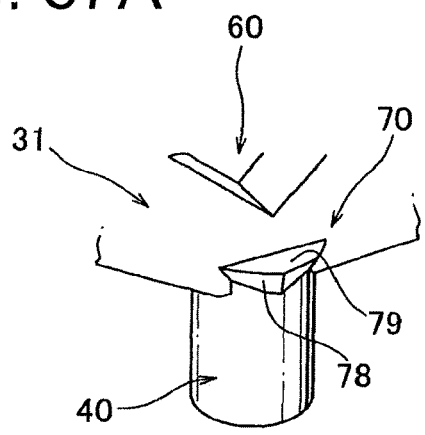
Figure 37B:
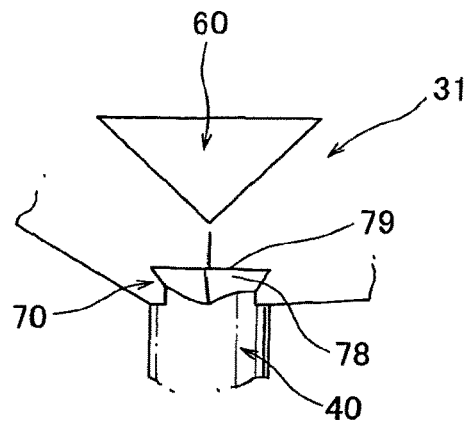
Figure 38:
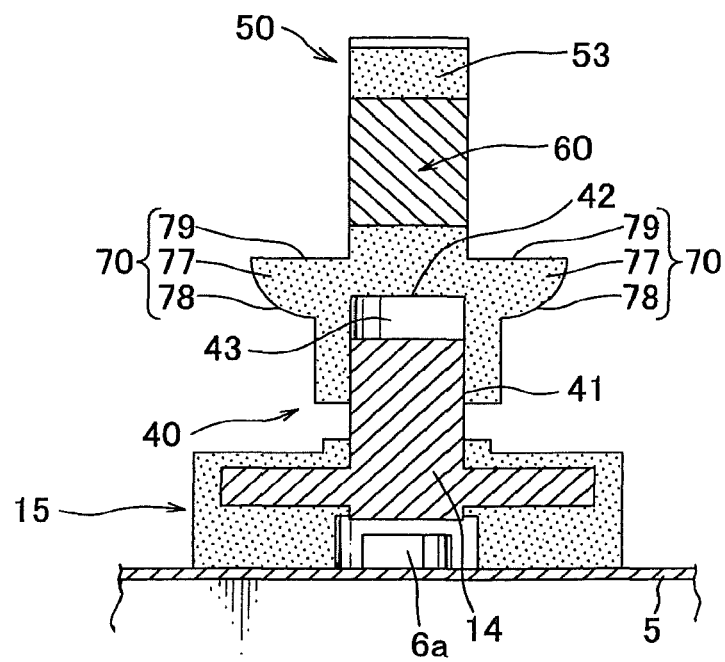
Figure 39:
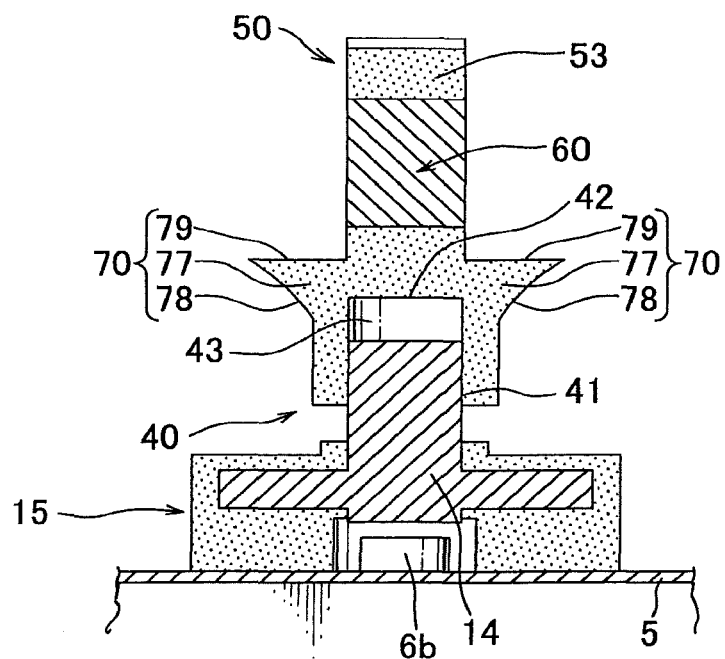
Figure 40:
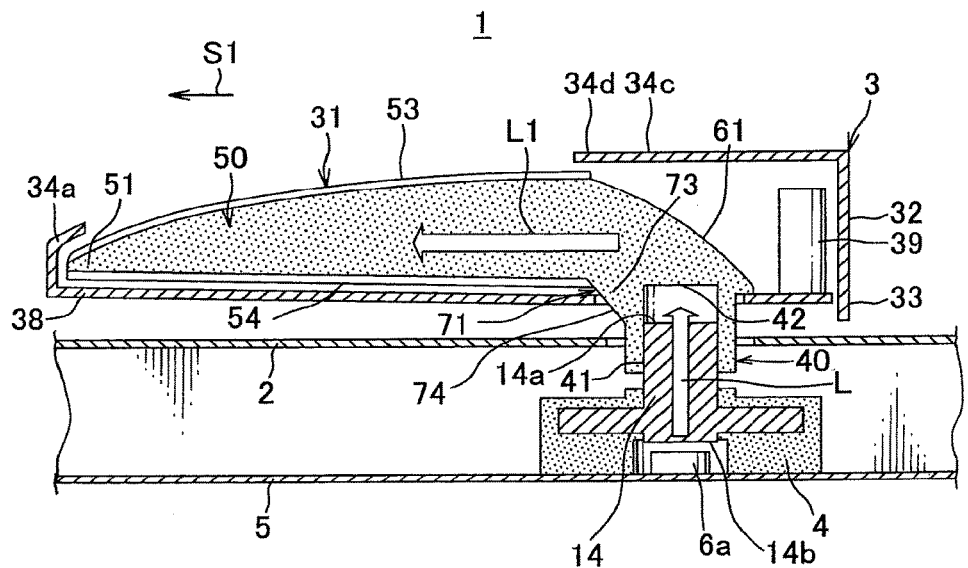
Figure 41:
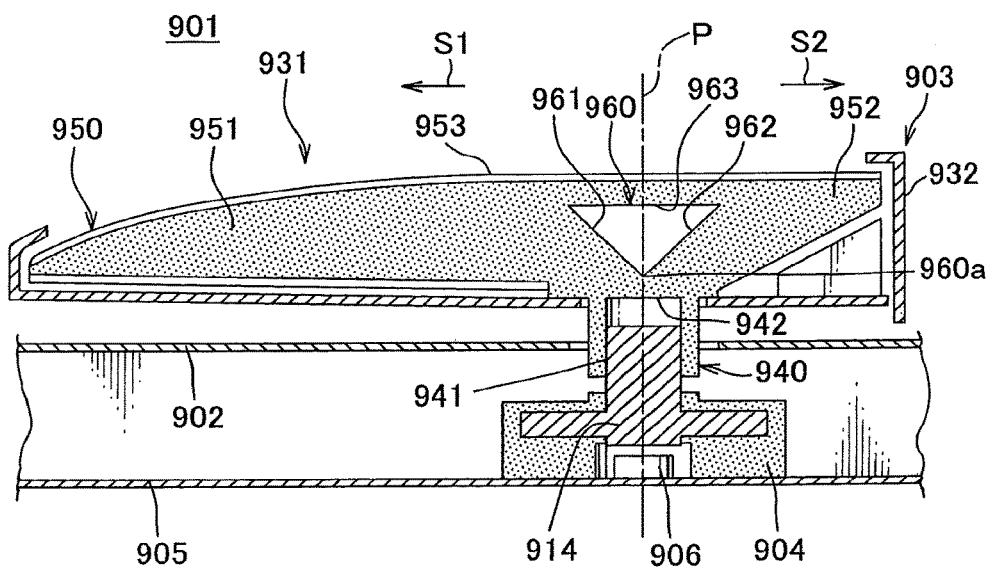
Figure 42:
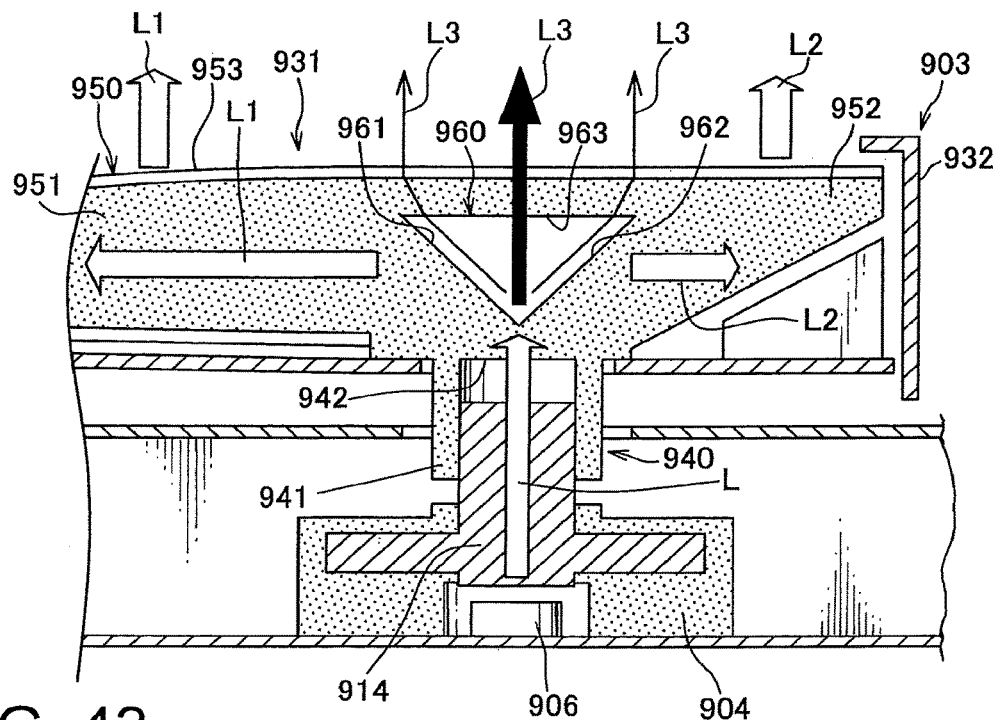
Figure 43:
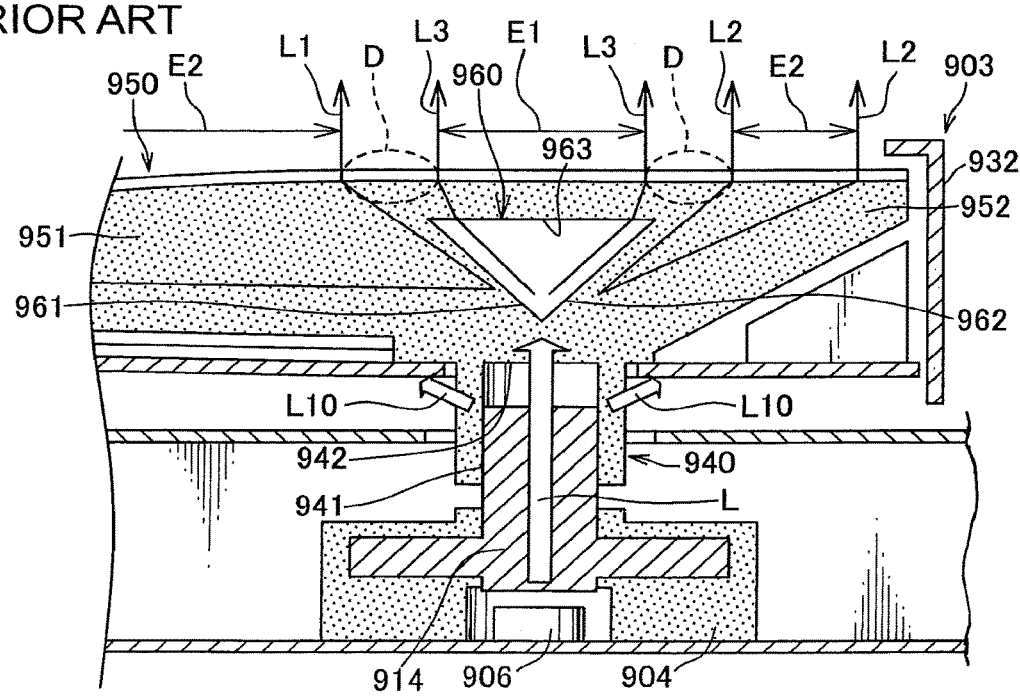

FIG. 31 is a cross sectional view of a vehicle display device as one embodiment of an indicator instrument according to the present invention;

FIG. 32 is an exploded view of a light-emitting indicator (indicator unit) included in the vehicle display device of FIG. 31;

FIG. 33 is an enlarged cross sectional view of the light-emitting indicator (indicator unit) included in the vehicle display device of FIG. 31;

FIG. 34 is a partial enlarged perspective view showing a reflection par for indicator shaft of an indicator member;

FIG. 35 is a partial enlarged perspective view showing another example of a reflection par for indicator shaft of the indicator member;

FIG. 36 is a cross sectional view which illustrates another example of a reflection par for indicator shaft projecting in a widthwise direction of the indicator member;

FIG. 37A is an enlarged perspective view of the reflection par for indicator shaft of FIG. 36;

FIG. 37B is a front view of the reflection par for indicator shaft of FIG. 36;

FIG. 38 is a cross sectional view of the reflection par for indicator shaft of FIG. 36 having a convex face;

FIG. 39 is a cross sectional view of the reflection par for indicator shaft of FIG. 36 having a concave face;

FIG. 40 is a cross sectional view illustrating another embodiment of the indicator unit;

FIG. 41 is a cross sectional view showing an arrangement of a conventional indicator instrument and light-emitting indicator;

FIG. 42 illustrates light which is reflected by and transmitting a hollow reflection part provided at an indicator main body of the light-emitting indicator of FIG. 41; and FIG. 43 illustrates a dark area formed at an upper face of the light-emitting indicator of FIG. 41 which is caused by the hollow reflection part.

REFERENCE SIGN LIST (1.7)
1 vehicle display device (indicator instrument)
3 light-emitting indicator (indicator unit)
4 drive device
6 light source
14 indicator shaft
31 indicator main body (indicator member)
32 cover member
40 base part
41 base part main body
41a upper end of base part main body (one end of base part)
42 light receiving part
50 indicator part
51 pointing part
52 rearward part
53 upper face of indicator part
54 bottom face of indicator part
60 hollow reflection part (reflection part)
61, 62, 63 partial reflection part
611, 621, 631 pointing direction reflection face
612, 622, 632 rear end direction reflection face
613, 623, 633 transmission face
61a, 62a, 63a corner formed at intersection of pointing direction reflection face and rear end direction reflection face
S1 pointing direction
S2 rear end direction (2.7)
1 vehicle display device (indicator instrument)
3 light-emitting indicator (indicator unit)
4 drive device
6 light source
14 indicator shaft
31 indicator main body (indicator member)
32 cover member
40 base part
41 base part main body
41a upper end of base part main body (one end of base part)
42 light receiving part
50 indicator part
51 pointing part
52 rearward part
53 upper face of indicator part
54 bottom face of indicator part
60 hollow reflection part (reflection part)
61 pointing direction reflection face
62 rear end direction reflection face
63 transmission face
60a corner formed at intersection of pointing direction reflection face and rear end direction reflection face
S1 pointing direction
S2 rear end direction (3.7)
1 vehicle display device (indicator instrument)
3 light-emitting indicator (indicator unit)
4 drive device
6 light source
14 indicator shaft
31 indicator main body (indicator member)
32 cover member
40 base part
41 base part main body
41a upper end of base part main body (one end of base part)
42 light receiving part
50 indicator part
51 pointing part
52 rearward part
53 upper face of indicator part
531 upper face of pointing part
532 upper face of rearward part
54 bottom face of indicator part (bottom face of pointing part)
56 notch
56a first reflection face (upward reflection face)
60 hollow reflection part
61 pointing direction reflection face
62 rear end direction reflection face
63 transmission face
60a corner formed at intersection of pointing direction reflection face and rear end direction reflection face
S1 pointing direction
S2 rear end direction (4.7)
1 vehicle display device (indicator instrument)
3 light-emitting indicator (indicator unit)
4 drive device 6a, 6b light source
14 indicator shaft
31 indicator main body (indicator member)
32 cover member
40 base part
41 shaft receiving part
42 light receiving part
50 indicator part
51 pointing part
52 rearward part
53 upper face of indicator part
54 bottom face of indicator part
60 hollow reflection part (reflection part)
61 pointing direction reflection face
62 rear end direction reflection face
70 reflection part for indicator shaft
73, 75 light guide part
74, 76 reflection face for indicator shaft
S1 pointing direction
S2 rear end direction

DESCRIPTION OF EXEMPLARY
EMBODIMENTS (1.8)
In the following, a vehicle display device as one embodiment of an indicator instrument according to the present invention is explained in reference to FIGS. 1 through 4B.

Figure 1:
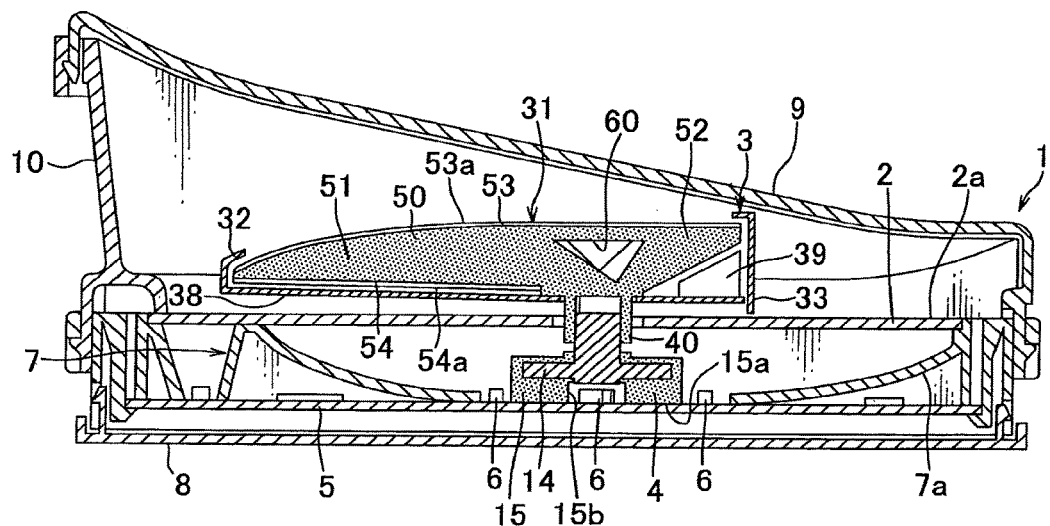
FIG. 1 is a cross sectional view of a vehicle display device as one embodiment of an indicator instrument according to the present invention.

In FIG. 1, a vehicle display device 1 is a speed meter which displays a vehicle speed, for example. The vehicle display device 1 includes a dial plate 2 having a surface 2a (i.e. a surface which is visible by a viewer) provided with indexes such as scale marks and numbers, letters or symbols, a light-emitting indicator (hereinafter called an indicator) 3 as an indicator unit positioned on the surface 2a of the dial plate 2, a drive device 4 having an indicator shaft 14 including a distal end at which the indicator 3 is attached, a circuit board 5 including a circuit pattern, an electronic component and such and including the drive device 4 fixed to the circuit board 5, a plurality of light sources 6 provided at the circuit board 5, a case 7 having a tapered portion 7a formed from a central portion of the circuit board 5 toward an edge of the dial plate 2, a back cover 8 covering a back side of the circuit board 5, and a front glass 9.

The dial plate 2 is a member formed into a substantially circular plate shape made of transparent or semi-transparent synthetic resin such as polycarbonate, for example. The surface 2a of the dial plate 2 includes a light-blocking region at which light-blocking ink is printed, and an index as a translucent design formed by removing (or not printing) the light-blocking ink along a shape of a letter and a scale and such. Each index becomes luminous and visible by being irradiated from a back side of the dial plate 2 by the later-described light source 6.

Figure 2:
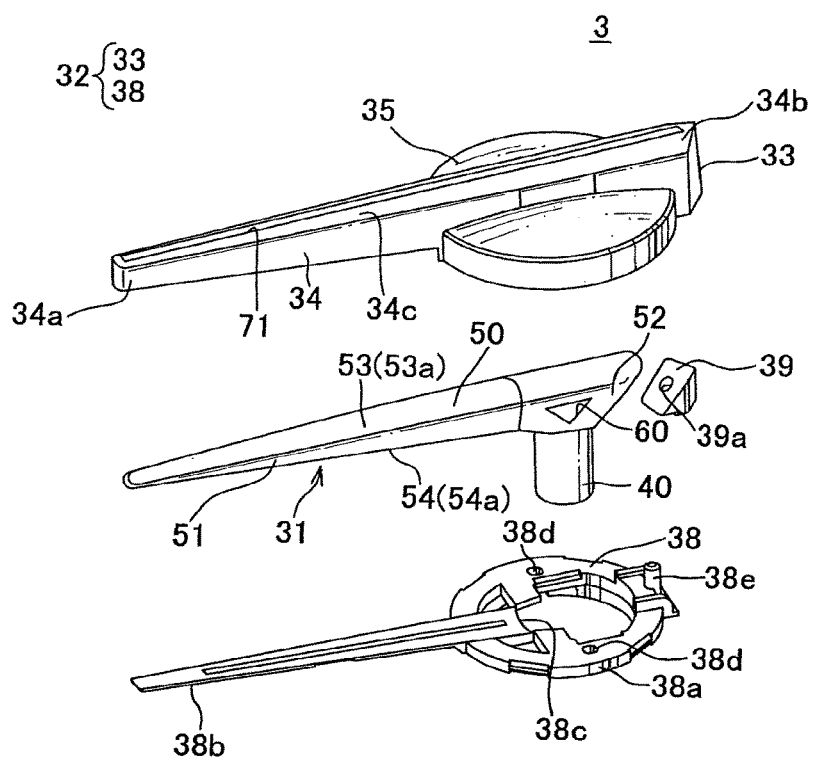
FIG. 2 is an exploded view of a light-emitting indicator (indicator unit) included in the vehicle display device of FIG. 1.

The indicator 3 is arranged adjacent to the surface 2a of the dial plate 2 and is arranged to point to the respective indexes provided at the dial plate 2, thereby displaying a measured value in cooperation with the respective indexes. As shown in FIG. 2, the indicator 3 includes an indicator main body 31 as an indicator member, a cover member 32 made of translucent synthetic resin and covering the indicator main body 31, and a balance member 39 arranged inside of the cover member 32 to adjust the balance of the indicator 3.

Figure 3A:
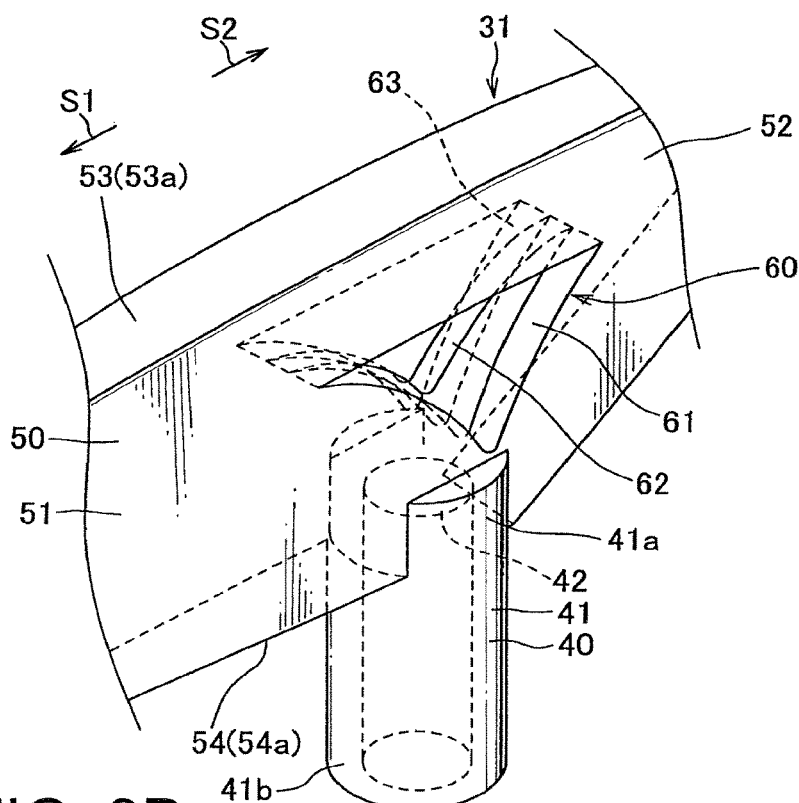
FIG. 3A is a partial perspective view of an indicator main body of the light-emitting indicator of FIG. 2 seen from an angle.
Figure 3B:
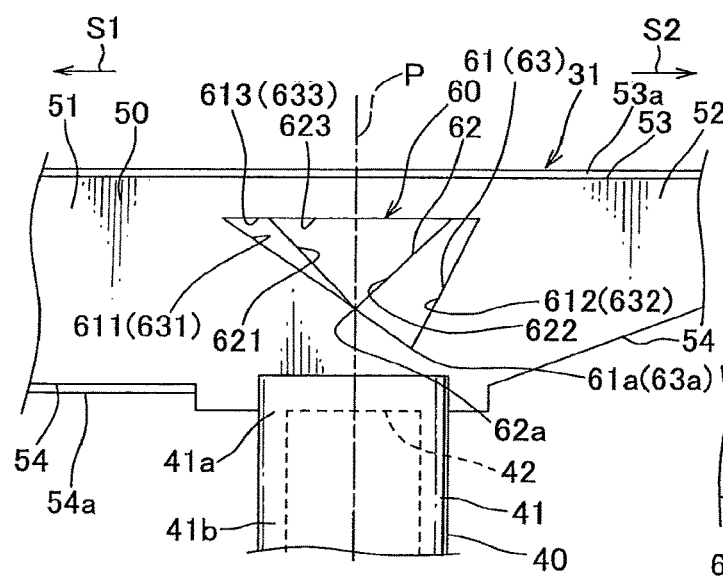
FIG. 3B is a partial side view of an indicator part of the indicator main body seen from a widthwise direction.

As shown in FIGS. 3A and 3B, the indicator main body 31 includes a base part 40 and an indicator part 50 which are integrally formed using translucent synthetic resin as translucent material such as polycarbonate resin and acrylic resin.

The base part 40 includes a circular cylindrical base part main body 41 and a light receiving part 42 arranged at an inner side of the base part main body 41 and arranged adjacent to an upper end 41a. The base part main body 41 is fixed to an indicator shaft 14 in a coaxial fashion by inserting and fitting the distal end of the indicator shaft 14 into a lower end 41b. Thus, a center of the base part main body 41 coincides with a shaft center P of the indicator shaft 14. The light receiving part 42 is formed into a flat surface having a circular shape identical to the inner side of the base part main body 41 so that when the indicator shaft 14 is fitted to the base part main body 41, the light receiving part 42 is arranged to face to an end face 14a of the distal end of the indicator shaft 14 with an interval. Of course, the shape of the light receiving part 42 is not limited to the flat surface and may be a curved surface, a shape formed by combining several faces, or any other shape which can receive the light from the light source. In addition, the light receiving part 42 may be arranged in close contact with the end face 14a of the indicator shaft 14.

The indicator part 50 is connected to an upper end 41a of the base part main body 41 (i.e. one end of the base part 40). The indicator part 50 includes a pointing part 51 extending from the upper end 41a to one direction (i.e. a pointing direction S1) which is perpendicular (or substantially perpendicular) to the shaft center P, and a rearward part 52 extending to the other direction (i.e. a rear end direction S2) which is opposite of said one direction and extending shorter than the pointing part 51, with a boundary at the shaft center P of the indicator shaft 14. In other words, the indicator part 50 extends from the upper end 41a of the base part main body 41 to each of the pointing direction S1 and the rear end direction S2. The pointing direction S1 and the rear end direction S2 match with or substantially match with a radial direction of the indicator shaft 14. The pointing direction S1 and the rear end direction S2 correspond to a longitudinal direction of the indicator part 50. Furthermore, the indicator part 50 is provided with a hollow reflection part 60 as a reflection part.

A bottom face 54, which is a surface of the indicator part 50 facing the base part 40, is provided with a reflection layer 54a which is overlapped to the bottom face 54 and colored in white or silver, for example, using a hot stamping or the like so as to reflect the light entering the bottom face 54 from inside of the indicator part 50. An upper face 53, which is a surface of the indicator part 50 at opposite side of the bottom face 54, is provided with a diffusion layer 53a which is overlapped to the upper face 53 and colored in red, for example, using a hot stamping or the like so as to diffuse the light exiting from the upper face 53. Alternatively, the reflection layer 54a and the diffusion layer 53a may be formed at the bottom face 54 and the upper face 53 by forming embossment or fine prism structure. Furthermore, in this embodiment, the reflection layer 54a is provided only at the bottom face 54 adjacent to the pointing part 51; however, a similar reflection layer 54a may be provided also to the bottom face 54 adjacent to the rearward part 52. In the following description, the term "bottom face 54" indicates the surface of the indicator part 50 adjacent to the base part 40 including the reflection layer 54a, and the term "upper face 53" indicates the surface of the indicator part 50 at the opposite side of the bottom face 54 including the diffusion layer 53a. Also, the bottom face 54 and the reflection layer 54a, as well as the upper face 53 and the diffusion layer 53a are described distinctively only when necessary. In addition, only one of the reflection layer 54*a* and the diffusion layer 53*a* may be provided.

As shown in FIGS. 3A and 3B, the hollow reflection part 60 is arranged in the indicator part 50 and arranged adjacent to the upper end 41*a* of the base part main body 41 and is arranged at a location opposed to the light receiving part 42 of the base part 40. The hollow reflection part 60 includes a first partial reflection part 61, a second partial reflection part 62 and a third partial reflection part 63. The plurality of partial reflection parts 61, 62, 63 is arranged in parallel in order of the first partial reflection part 61, the second partial reflection part 62 and the third partial reflection part 63 in the widthwise direction of the indicator part 50 (i.e. front-back direction perpendicular to a plane of paper in FIG. 3B).

The first partial reflection part 61 is formed into a substantially triangular shape and includes a pointing direction reflection face 611, a rear end direction reflection face 612 and a transmission face 613, each being formed into a substantially flat surface.

The pointing direction reflection face 611 is arranged such that one end thereof at a lower side in the drawing is located adjacent to the base part 40. The pointing direction reflection face 611 is slanted so as to gradually extend away from the base part 40 in a direction of the shaft center P of the indicator shaft 14 (i.e. an upper direction in FIG. 3B) as the pointing direction reflection face 611 extends from said one end to the pointing direction S1 (i.e. a left direction in FIG. 3B). Thus, the pointing direction reflection face 611 reflects a part L1 of light L received at the light receiving part 42 to the pointing direction S1, and transmits other part L3 of this light L toward the transmission face 613.

The rear end direction reflection face 612 has one end intersecting with and connected to the one end of the pointing direction reflection face 611 in an intersecting fashion. The rear end direction reflection face 612 is slanted so as to gradually extend away from the base part 40 in a direction of the shaft center P of the indicator shaft 14 (i.e. an upper direction in FIG. 3B) as the rear end direction reflection face 612 extends from said one end to the rear end direction S2 (i.e. a right direction in FIG. 3B). That is, the rear end direction reflection face 612 is intersecting with and connected to the pointing direction reflection face 611 in an intersecting fashion. Thus, the rear end direction reflection face 612 reflects a part L2 of the light L received at the light receiving part 42 to the rear end direction S2, and transmits other part L3 of this light L toward the transmission face 613.

The transmission face 613 is arranged such that one end thereof is connected to the other end of the pointing direction reflection face 611 located adjacent to an upper side in the drawing, and the other end of the transmission face 613 is connected to the other end of the rear end direction reflection face 612 located adjacent to the upper side in the drawing. That is, the transmission face 613 is connected to each of the pointing direction reflection face 611 and the rear end direction reflection face 612. The transmission face 613 is arranged to face the upper face 53 of the indicator part 50. The transmission face 613 and the upper face 53 of the indicator part 50 are substantially parallel to each other. Furthermore, a center of the transmission face 613 in longitudinal direction (i.e. a left-right direction in FIG. 3B) is located on the shaft center P of the indicator shaft 14. Of course, the transmission face 613 may not be parallel to the upper face 53, and the location of the transmission face 613 is not limited to the above-described embodiment.

The pointing direction reflection face 611 is formed larger (i.e. longer in a longitudinal direction of the indicator part 50) than the rear end direction reflection face 612. Thus, a corner 61*a*, which is formed at an intersection of the pointing direction reflection face 611 and the rear end direction reflection face 612, is located toward the rear end direction S2 with respect to the shaft center P of the indicator shaft 14.

In the same way as the first partial reflection part 61, the second partial reflection part 62 is formed into a substantially isosceles triangular shape with a pointing direction reflection face 621, a rear end direction reflection face 622 and a transmission face 623. The pointing direction reflection face 621 and the rear end direction reflection face 622 of the second partial reflection part 62 are formed into the same size (i.e. the same length in the longitudinal direction of the indicator part 50). When seen from the widthwise direction of the indicator part 50, the second partial reflection part 62 is smaller than the partial reflection part 61 such that the second partial reflection part 62 is entirely housed within the outer shape of the first partial reflection part 61. A corner 62*a*, which is formed at an intersection of the pointing direction reflection face 621 and the rear end direction reflection face 622, is located on the shaft center P of the indicator shaft 14.

The third partial reflection part 63 is formed into a substantially triangular shape with a pointing direction reflection face 631, a rear end direction reflection face 632 and a transmission face 633 and is formed into the same shape as the first partial reflection part 61. When seen from the widthwise direction of the indicator part 50, the third partial reflection part 63 is located so as to overlap identically with the first partial reflection part 61.

Figure 3C:
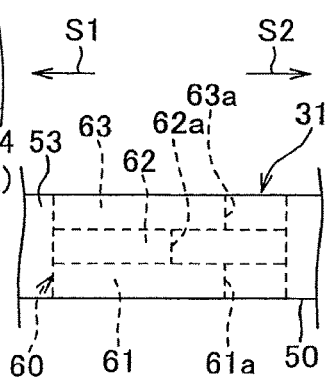
FIG. 3C is a partial perspective view of the indicator part of the indicator main body seen from top.

For these multiple partial reflection parts 61, 62, 63, the respective corners 61*a*, 62*a*, 63*a* are arranged adjacent to the light receiving part 42 of the base part 40. Also, as shown in FIG. 3C, the corner 61*a* of the first partial reflection part 61 and the corner 63*a* of the third partial reflection part 63 are displaced toward the rear end direction S2 with respect to the shaft center P but are located at the same position when seen from the widthwise direction so as to overlap each other. The corner 62*a* of the second partial reflection part 62 is positioned on the shaft center P and is displaced toward the pointing direction S1 relatively with respect to the corner 61*a* of the first partial reflection part 61 and the corner 63*a* of the third partial reflection part 63.

The hollow reflection part 60 is formed such that one section (i.e. a frontward section in the plane of paper in FIG. 3B) and the other section (i.e. a backward section in the plane of paper in FIG. 3B) are formed into the same shape, the one section and the other section being divided at a boundary plane which is a plane including a widthwise center of the indicator part 50 (i.e. a plane parallel to the plane of paper in FIG. 3B). In other words, the hollow reflection part 60 is formed to be symmetric about the widthwise center of the indicator part 50. Furthermore, the thicknesses of the multiple partial reflection parts 61, 62, 63 (i.e. the sizes in the widthwise direction of the indicator part 50) are identical to each other.

The hollow reflection part 60 and the multiple partial reflection parts 61, 62, 63 are not limited to the shape and arrangement described above. For example, i) the hollow reflection part 60 may be provided with more than three partial reflection parts, ii) all of the corners 61*a*, 62*a*, 63*a* of the respective multiple partial reflection parts 61, 62, 63 may be displaced toward the pointing direction S1 or toward the rear end direction S2, e.g. in FIG. 3C the corner 63*a* of the third partial reflection part 63 may be displaced relatively with respect to the corner 62a of the second partial reflection part 62 toward the pointing direction S1, and iii) each of the multiple partial reflection parts 61, 62, 63 may have different thickness with respect to each other. That is, the arrangement, i.e. shape, position and such, of the hollow reflection part and the multiple partial reflection parts may be determined in a suitable manner in accordance with the arrangement of the indicator main body and such, without departing from the object of the present invention.

The indicator main body 31 reflects and transmits the light received at the light receiving part 42 of the base part 40 by the hollow reflection part 60 and guides the light in the indicator part 50 to exit from the upper face 53 of the indicator part 50. By doing so, the upper face 53 of the indicator part 50 emits light, and thus the upper face 53 becomes luminous and visible through a slit 71 of the cover member 32.

As shown in FIG. 2, the cover member 32 includes an upper cover 33 and a lower cover 38 which are divided in an up-down direction.

The upper cover 33 includes a first cover portion 34 formed into a substantially rectangular tube shape which gets gradually thinner from a rear end 34b toward a distal end 34a in accordance with the outer shape of the indicator part 50 of the indicator main body 31, and a second cover portion 35 formed into a circular dish covering around the base part 40 of the indicator main body 31. The first cover portion 34 and the second cover portion 35 are arranged to open downward in the drawing, and the indicator part 50 of the indicator main body 31 is housed inside from this opening.

An upper wall portion 34c of the first cover portion 34 is provided with the slit 71 extending from the rear end 34b to the distal end 34a. When the indicator main body 31 and the cover member 32 are attached together, the upper face 53 of the indicator part 50 of the indicator main body 31 is exposed from this slit 71 in a straight line fashion throughout in the longitudinal direction of the upper face 53. In other words, the slit 71 is formed along the longitudinal direction of the indicator part 50. The length and the width of the slit 71 may be designed arbitrarily in accordance with the design of the indicator 3, for example. Furthermore, a translucent coloring member or a light diffusing member may be provided in the slit 71, for example, as long as the slit 71 is arranged to pass the light exited from the upper face of the indicator part 50 therethrough. Furthermore, an inner face of the second cover portion 35 is provided with a pair of bosses (not shown) which is formed to protrude downward in the drawing and arranged to fit to a pair of fitting holes 38d of the lower cover 38.

The lower cover 38 includes an annular plate-shaped first cover section 38a formed in accordance with the shape of the opening of the second cover portion 35 of the upper cover 33, a strip-shaped second cover section 38b radially extending from the first cover section 38a and formed in accordance with the shape of the opening at the distal end side portion of the first cover portion 34 of the upper cover 33 which houses the pointing part 51 of the indicator part 50, a penetrating part 38c provided at the first cover section 38a and arranged to pass the base part 40 of the indicator main body 31 therethrough, the pair of fitting holes 38d arranged at the first cover section 38a in accordance with the pair of bosses of the upper cover 33, and an attachment boss 38e at which the balance member 39 is attached. When attached to the upper cover 33, the lower cover 38 covers the openings of the first cover portion 34 and the second cover portion 35 to form a space for housing the indicator part 50 of the indicator main body 31 with the upper cover 33. By housing the indicator part 50 of the indicator main body 31 in this housing space, the light exited from the surface of the bottom face 54 and such of the indicator part 50 is prevented from irradiating the dial plate 2 and such.

The balance member 39 is formed to have weight which is set in view of the indicator part 50 of the indicator main body 31. The balance member 39 includes a fitting hole 39a arranged to fit to the attachment boss 38e provided at the lower cover 38 of the cover member 32. The balance member 39 is positioned by the attachment boss 38e and housed in the cover member 32.

The indicator 3 having the above-described structure may be assembled as explained below. Firstly, the base part 40 of the indicator main body 31 is passed through the penetrating part 38c of the lower cover 38 to install the indicator main body 31 to the lower cover 38 and install the balance member 39 to the lower cover 38. Then, the upper cover 33 is moved closer to the indicator main body 31 from the side of the upper face 53 of the indicator part 50 of the indicator main body 31 so as to cover the indicator main body 31, and the pair of bosses provided in the second cover of the upper cover 33 is fitted into the pair of fitting holes 38d of the lower cover 38, by which the upper cover 33 and the lower cover 38 are fixed to each other so that the indicator main body 31 is housed in the cover member 32, and the assembling is completed.

The drive device 4 is a known stepping motor. The drive device 4 includes the indicator shaft 14 formed into a substantially circular cylindrical shape and made of translucent synthetic resin such as polycarbonate resin and a main body portion 15 arranged to rotatably support the indicator shaft 14 and rotate the indicator shaft 14 on the principle of the stepping motor in accordance with measured quantity of speed obtained by a speed sensor not shown. A bottom face 15a of the main body portion 15 placed over the later-described circuit board 5 is provided with a recessed portion 15b, and an end face 14b of the indicator shaft 14 at the lower side in the drawing is exposed in this recessed portion 15b. The base part 40 of the indicator main body 31 described above is attached to the distal end of the indicator shaft 14 at the upper side in the drawing. The indicator shaft 14 is arranged to rotate the indicator main body 31 and function as the light guide member to guide the light to the base part 40.

The circuit board 5 is a known printed board provided for example with electronic components and a wiring pattern which electrically connects these electronic components and such. A surface of the circuit board 5 facing the dial plate 2 is mounted with the drive device 4 and the plurality of light sources 6.

The plurality of light sources 6 includes a LED, a bulb and such and is controlled to light up and out by a control unit not shown provided at the circuit board 5. The plurality of light sources 6 emits light to illuminate the indexes of the dial plate 2 and the indicator main body 31 of the indicator 3 and such. Furthermore, one of the plurality of light sources 6 is arranged in the recessed portion 15b of the main body portion 15 of the drive device 4 so as to face the end face 14b of the indicator shaft 14. In this manner, the indicator shaft 14 guides the light which has entered this end face 14b from the light source 6 and directs the light to exit from the end face 14a at the distal end of the indicator shaft 14.

The case 7 includes a reflection face which is a tapered face, i.e. a surface of the tapered portion 7a, so that the light emitted from the light source 6 is reflected toward the dial plate 2. In this manner, the respective indexes provided on the surface 2a of the dial plate 2 emit light. The back cover 8 is attached to the case 7 so as to cover the back of the circuit board 5. The front glass 9 is arranged to cover the dial plate 2 and the indicator 3 and such and attached to the case 7 via an end member 10 using a fixation means not shown such as a latch claw. The back cover 8 and the front glass 9 prevent dust and such from entering inside of the vehicle display device 1.

Figure 4A:
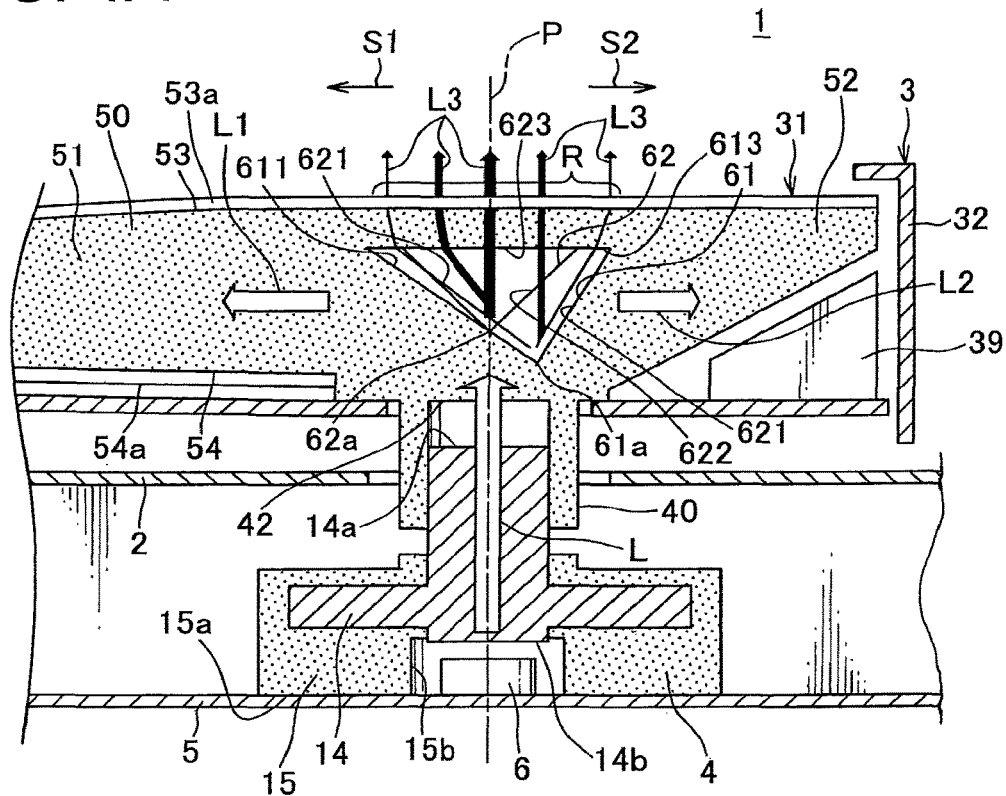
FIG. 4A illustrates light which is reflected and transmitted by a hollow reflection part of the indicator main body of FIGS. 3A to 3C.

Next, an example of operation (action) of the indicator (light-emitting indicator) 3 according to the present invention having the above-described structure is explained with reference to FIGS. 4A and 4B. In each drawing, arrows shown in the indicator main body 31 illustrate a traveling direction of the light guided to the indicator main body 31.

In this embodiment, the hollow reflection part 60 provided at the indicator part 50 of the indicator main body 31 includes the first partial reflection part 61, the second partial reflection part 62 and the third partial reflection part 63 which are formed into a substantial triangular shape, respectively, and which are arranged in parallel in order of the first partial reflection part 61, the second partial reflection part 62 and the third partial reflection part 63 in the widthwise direction of the indicator part 50. For the transmission face 613 of the first partial reflection part 61, a section of the transmission face 613 located right above the corner 61a has the highest brightness. This is the same for the second partial reflection part 62 and the third partial reflection part 63.

For these multiple partial reflection parts 61, 62, 63, the corner 61a of the first partial reflection part 61 and the corner 63a of the third partial reflection part 63 are located toward the rear end direction S2 with respect to the shaft center P of the indicator shaft 4, and, the corner 62a of the second partial reflection part 62 is displaced toward the pointing direction S1 relatively with respect to the corner 61a of the first partial reflection part 61 and the corner 63a of the third partial reflection part 63. Thus, the sections of the respective transmission faces 613, 623, 633 at which the brightness becomes highest are spread in the pointing direction S1 and the rear end direction S2. Thus, such arrangement avoids all of the corners 61a, 62a, 63a to be located distant from ends of the respective transmission faces 613, 623, 633 in the pointing direction S1, and, among the light entering the respective transmission faces 613, 623, 633, the light with the high brightness and the light with the low brightness are arranged adjacent to each other, thereby ensuring the brightness of the light L3 entering around the ends in the pointing direction S1 and the ends in the rear end direction of the respective transmission faces 613, 623, 633, as illustrated in FIG. 4A.

Figure 4B:
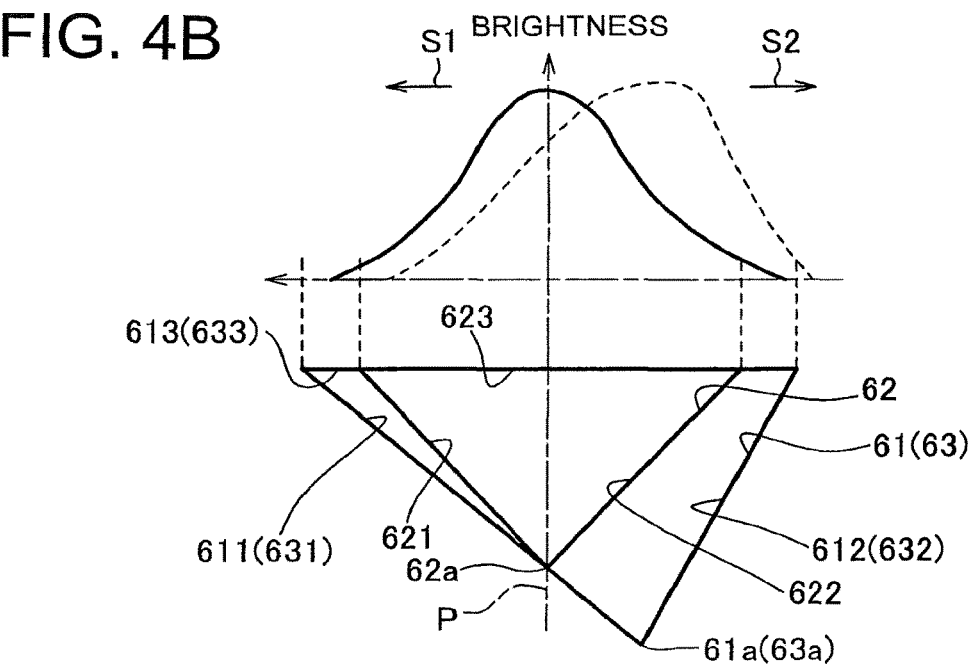
FIG. 4B shows brightness distribution at a region at an upper face of the indicator part located above the hollow reflection part.

FIG. 4B shows the brightness distribution of the light L3 which enters the respective transmission faces 613, 623, 633 seen from the widthwise direction of the above-described indicator part 50. Solid line indicates the brightness distribution of this embodiment, and dotted line indicates the brightness distribution obtained from the conventional hollow reflection part. As shown in FIG. 4B, in this embodiment, the brightness distribution is shifted entirely toward the pointing direction S1 compared to the conventional hollow reflection part, and thus the brightness of the light L3 entering the ends of the respective transmission faces in the pointing direction S1 is increased, thereby preventing the dark area D from being formed at the region R described above.

Furthermore, in this embodiment, in addition to the respective corners 61a, 62a, 63a being arranged in a displaced fashion, longitudinal centers of the respective transmission faces 613, 623, 633 are located on the shaft center P of the indicator shaft 14, and the corner 62a of partial reflection portion 62 having the substantial isosceles triangular shape located at the widthwise center of the indicator part 50 is located on the shaft center P of the indicator shaft 14. Thus, the brightness in the above-described region R varies generally symmetrically about the shaft center P from a longitudinal center to both ends of the region R.

As described above, in the present invention, the hollow reflection part 60 provided at the indicator part 50 of the indicator main body 31 includes the multiple partial reflection parts 61, 62, 63 having at least the pointing direction reflection face, the rear end direction reflection face and the corner formed at an intersection of the pointing direction reflection face and the rear end direction reflection face and is arranged at a location opposed to the base part. Also, the corners 61a, 62a, 63a of the partial reflection parts located adjacent to each other are arranged so as to be displaced in the pointing direction S1 or in the rear end direction S2. Thus, the corners 61a, 62a, 63a, which provide high brightness of the light transmitted through the pointing direction reflection face or the rear end direction reflection face, are not concentrated in one place but are spread in the pointing direction S1 or the rear end direction S2. That is, if the corners 61a, 63a of some partial reflection part 61, 63 are located toward the rear end direction S2 in order to reflect more light toward the pointing direction S1, then the corner 62a of the other partial reflection part 62 is located so as to be displaced toward the pointing direction S1. Thus, the corner 62a is located near the end in the pointing direction S1 of the region R above the hollow reflection part 60, and the corners 61a, 63a are located near the end in the rear end direction S2 of the region R above the hollow reflection part 60, thereby ensuring the brightness at near the both ends of the region R and preventing the dark area from being formed at a location above the hollow reflection part 60 inexpensively without providing the light diffusing member or the like.

Furthermore, since the hollow reflection part 60 is formed symmetrically about the widthwise center of the indicator part 50, the non-uniformity in the brightness in the widthwise direction can be prevented.

In this embodiment, the terms for indicating directions such as up, down, left, right, front and rear are used for purpose of explaining the arrangement of operation of the respective components of the vehicle display device 1, the light-emitting indicator 3 and the indicator main body 31, and thus are used in a relative manner not in an absolute manner. These terms are suitable when the vehicle display device 1, the light-emitting indicator 3, the indicator main body 31 and components thereof are in the shown position. However, when their positions are changed, then these terms should be interpreted differently in accordance with the change in the position.

Furthermore, the shape of the partial reflection part 61, 62, 63 (e.g. the size and thickness of the pointing direction reflection face, the rear end direction reflection face and the transmission face as well as the position of the corner) is not limited to the above-described configuration and may be in any shape without departing from the object of the present invention and as long as the partial reflection part includes at least the pointing direction reflection face, the rear end direction reflection face and the corner formed at an intersection of the pointing direction reflection face and the rear end direction reflection face. For example, the partial reflection tion part may have a fan-like shape formed by a flat-shaped pointing direction reflection face, a flat-shaped rear end direction reflection face and a curved transmission face which is curved so as to swell toward an upper face of the indicator part. Alternatively, in FIGS. 3A and 3B, the partial reflection part may be formed such that a portion of the indicator part 50 located above the hollow reflection part 60 is removed and the pointing direction reflection face and the rear end direction reflection face of each partial reflection part extend upward and continue to the upper face of the indicator part 50 (that is, the transmission face is omitted so the reflection part is formed by the pointing direction reflection face and the rear end direction reflection face and formed into a V-shaped reflection part which opens upward). Moreover, in this embodiment, the pointing direction reflection face, the rear end direction reflection face and the transmission face are formed into a substantially flat surface; however, the present invention is not limited to this, and these respective faces may be formed in a flat surface, a curved surface or a non-spherical surface or a surface formed by the combination these surfaces, or formed by a plurality of faces, or formed in any other shape without departing from the object of the present invention.

Figure 5:
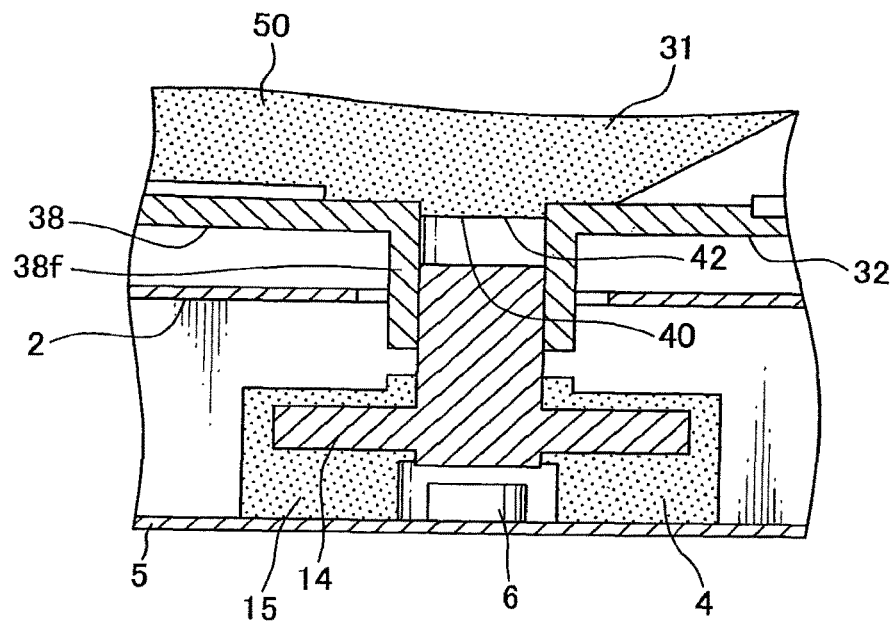
FIG. 5 is a partial cross sectional view showing an arrangement of a modified example of the light-emitting indicator of FIG. 2.
Figure 6:
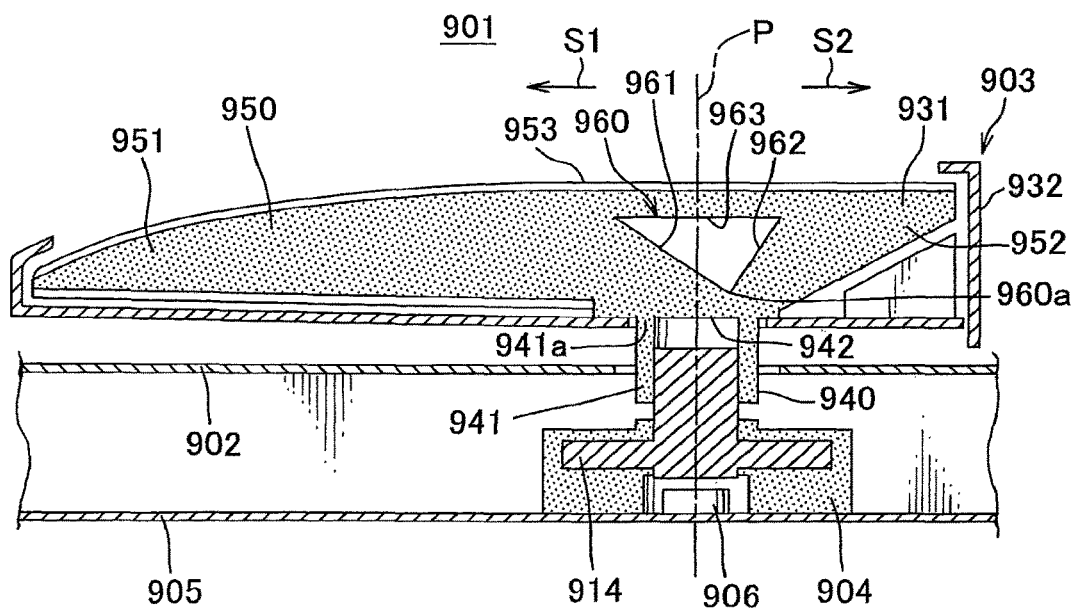
FIG. 6 shows an arrangement of a conventional indicator instrument and light-emitting indicator.
Figure 7A:
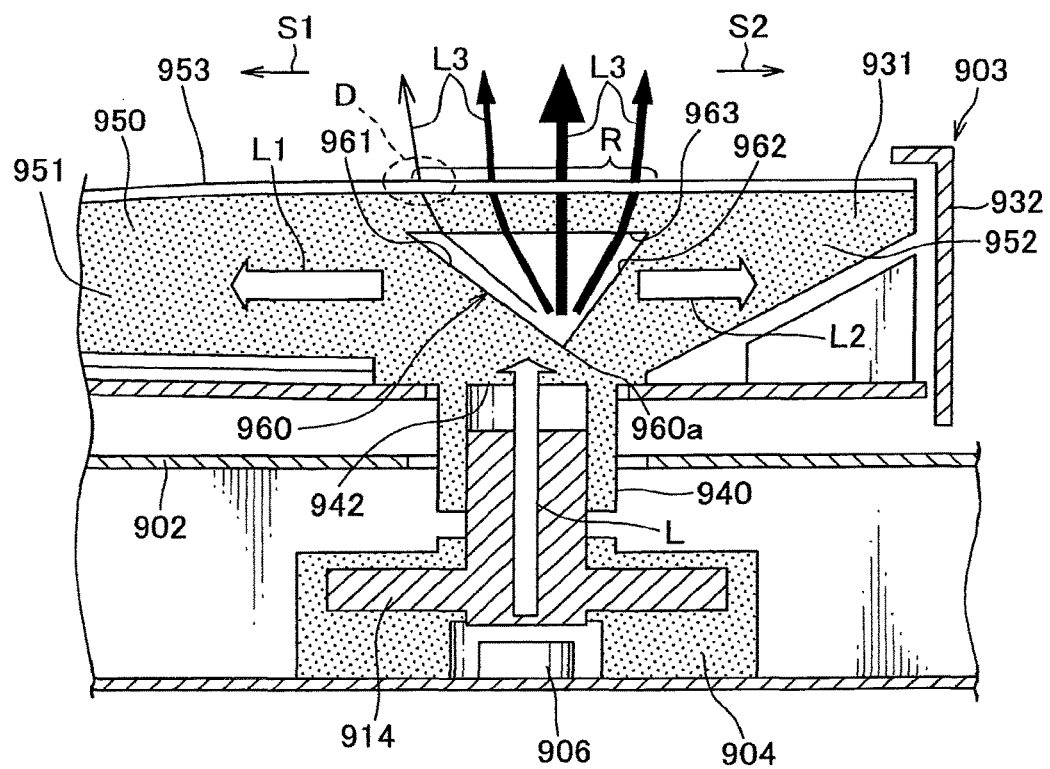
FIG. 7A illustrates light which is reflected by or transmitting a hollow reflection part of the indicator main body of FIG. 6.
Figure 7B:
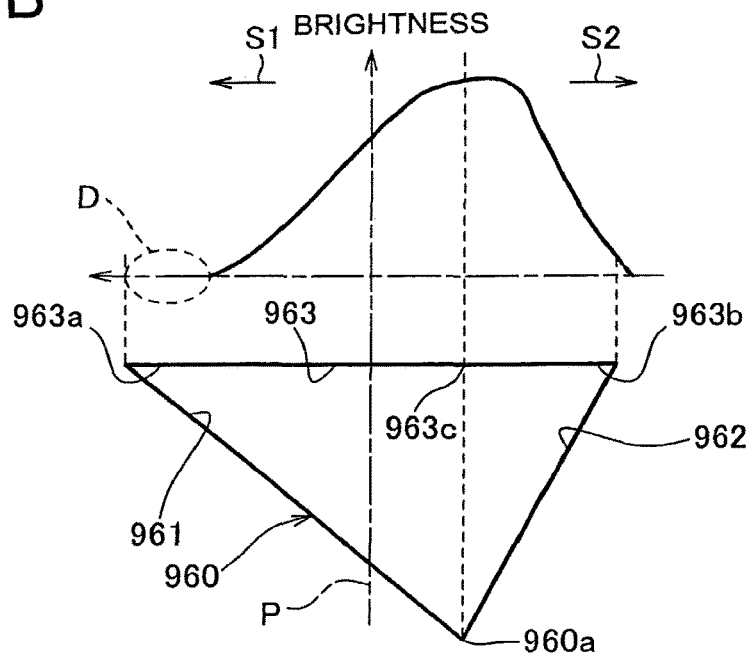
FIG. 7B shows brightness distribution at a region at an upper face of the indicator part located above the hollow reflection part.
Figure 8:
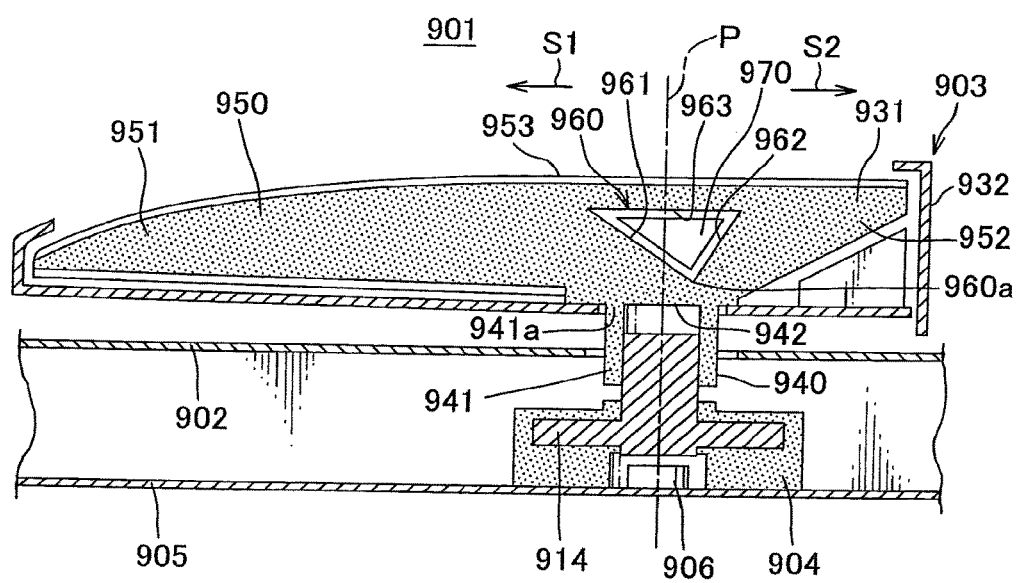
FIG. 8 shows the light-emitting indicator of FIG. 6 provided with a light diffusing member in the hollow reflection part.

Furthermore, in this embodiment, the base part 40 is constituted of the base part main body 41 attached to the indicator shaft 14 and the light receiving part 42 which receives the light from the light source 6 guided by the indicator shaft 14; however, the present invention is not limited to this. For example, as shown in FIG. 5, the lower cover 38 may be provided with a circular cylindrical shaft receiving part 38f attached to the indicator shaft 14 instead of the base part main body 41, so that the base part 40 of the indicator main body 31 is constituted of the light receiving part 42 alone. As such, the base part of the indicator main body (indicator member) may have any structure as long as the base part includes at least the light receiving part which receives the light from the light source.

Moreover, although this embodiment is described in relation to the vehicle display device as the speed meter, the present invention is not limited to this. For example, the present invention may be applied to an indicator device other than the speed meter such as an engine revolution counter and a fuel level meter, or alternatively, the present invention may be applied for example to an industrial indicator device other than the vehicle display device such as an indicator used for measurement of gas pressure or temperature in a factory. As such, the present invention may be used in any application and any device without departing from the object of the present invention.

The embodiment described above is only representative embodiment of the present invention, and the present invention is not limited to the embodiment. That is, the present invention can be modified in various ways and implemented without departing from the gist of the present invention.

(2.8)

In the following, a vehicle display device as one embodiment of an indicator instrument according to the present invention is explained in reference to FIGS. 9 through 14.

In FIG. 9, a vehicle display device 1 is a speed meter which displays a vehicle speed, for example. The vehicle display device 1 includes a dial plate 2 having a surface 2a (i.e. a surface which is visible by a viewer) provided with indexes such as scale marks and numbers, letters or symbols, a light-emitting indicator (hereinafter called an indicator) 3 as an indicator unit positioned on the surface 2a of the dial plate 2, a drive device 4 having an indicator shaft 14 including a distal end at which the indicator 3 is attached, a circuit board 5 including a circuit pattern, an electronic component and such and including the drive device 4 fixed at the circuit board 5, a plurality of light sources 6 provided at the circuit board 5, a case 7 having a tapered portion 7a formed from a central portion of the circuit board 5 toward an edge of the dial plate 2, a back cover 8 covering a back side of the circuit board 5, and a front glass 9.

The dial plate 2 is a member formed into a substantially circular plate shape made of transparent or semi-transparent synthetic resin such as polycarbonate, for example. The surface 2a of the dial plate 2 includes a light-blocking region not shown at which light-blocking ink is printed, and an index not shown as a translucent design formed by removing (or not printing) the light-blocking ink along a shape of a letter, a scale and such. Each index becomes luminous and visible by being irradiated from a back side of the dial plate 2 by the later-described light source 6.

The indicator 3 is arranged adjacent to the surface 2a of the dial plate 2 and is arranged to point to the respective indexes provided at the dial plate 2, thereby displaying a measured value in cooperation with the respective indexes. As shown in FIG. 2, the indicator 3 includes an indicator main body 31 as an indicator member, a cover member 32 made of translucent synthetic resin and covering the indicator main body 31, and a balance member 39 arranged inside of the cover member 32 to adjust the balance of the indicator 3.

As shown in FIGS. 11A and 11B, the indicator main body 31 includes a base part 40 and an indicator part 50 which are integrally formed using translucent synthetic resin as translucent material such as polycarbonate resin and acrylic resin.

The base part 40 includes a circular cylindrical base part main body 41 and a light receiving part 42 arranged at an inner side of the base part main body 41 and arranged adjacent to an upper end 41a. The base part main body 41 is fixed to an indicator shaft 14 in a coaxial fashion by inserting and fitting the distal end of the indicator shaft 14 into a lower end 41b. Thus, a center of the base part main body 41 coincides with a shaft center P of the indicator shaft 14. The light receiving part 42 is formed into a flat surface having a circular shape identical to the inner side of the base part main body 41 so that when the indicator shaft 14 is fitted to the base part main body 41, the light receiving part 42 is arranged to face to an end face 14a of the distal end of the indicator shaft 14 with an interval. Of course, the shape of the light receiving part 42 is not limited to the flat surface and may be a curved surface, a shape formed by combining several faces, or any other shape which can receive the light from the light source. In addition, the light receiving part 42 may be arranged in close contact with the end face 14a of the indicator shaft 14.

The indicator part 50 is formed continuous with an upper end 41a of the base part main body 41 (i.e. one end of the base part 40). The indicator part 50 includes a pointing part 51 extending from the upper end 41a to one direction (i.e. a pointing direction S1) which is perpendicular (or substantially perpendicular) to the shaft center P, and a rearward part 52 extending to the other direction (i.e. a rear end direction S2) which is opposite of said one direction and extending shorter than the pointing part 51, with a boundary at the shaft center P of the indicator shaft 14. In other words, the indicator part 50 extends from the upper end 41a of the base part main body 41 to each of the pointing direction S1 and the rear end direction S2. The pointing direction S1 and the rear end direction S2 match with (or substantially match with) a radial direction of the indicator shaft 14. The pointing direction S1 and the rear end direction S2 correspond to a longitudinal direction of the indicator part 50.

Furthermore, the indicator part 50 is provided with a hollow reflection part 60 as a reflection part.

A bottom face 54, which is a surface of the indicator part 50 facing the base part 40, is provided with a reflection layer 54*a* which is overlapped to the bottom face 54 and colored in white or silver, for example, using a hot stamping or the like so as to reflect the light entering the bottom face 54 from inside of the indicator part 50. An upper face 53, which is a surface of the indicator part 50 at opposite side of the bottom face 54, is provided with a diffusion layer 53*a* which is overlapped to the upper face 53 and colored in red, for example, using a hot stamping or the like so as to diffuse the light exiting from the upper face 53. Alternatively, the reflection layer 54*a* and the diffusion layer 53*a* may be formed at the bottom face 54 and the upper face 53 by forming embossment or fine prism structure. Furthermore, in this embodiment, the reflection layer 54*a* is provided only at the bottom face 54 and arranged adjacent to the pointing part 51; however, a similar reflection layer 54*a* may be provided also at the bottom face 54 and arranged adjacent to the rearward part 52. In the following description, the term "bottom face 54" indicates the surface of the indicator part 50 adjacent to the base part 40 including the reflection layer 54*a*, and the term "upper face 53" indicates the surface of the indicator part 50 at the opposite side of the bottom face 54 including the diffusion layer 53*a*. Also, the bottom face 54 and the reflection layer 54*a*, as well as the upper face 53 and the diffusion layer 53*a* are described distinctively only when necessary. In addition, only one of the reflection layer 54*a* and the diffusion layer 53*a* may be provided.

As shown in FIGS. 11A and 11B, the hollow reflection part 60 is arranged in the indicator part 50 and arranged adjacent to the upper end 41*a* of the base part main body 41 and is arranged at a location opposed to the light receiving part 42 of the base part 40. The hollow reflection part 60 includes a pointing direction reflection face 61, a rear end direction reflection face 62 and a transmission face 63 and is formed into a substantially fan-like shape penetrating through the indicator part 50 in the widthwise direction (i.e. a front-back direction perpendicular to a plane of paper in FIG. 11B).

As shown in FIGS. 11A and 11B, the pointing direction reflection face 61 is formed into a substantially flat surface. The pointing direction reflection face 61 is arranged such that one end thereof at a lower side in the drawing is located adjacent to the base part 40 and is slanted so as to gradually extend away from the base part 40 in a direction of the shaft center P of the indicator shaft 14 (i.e. an upper direction in FIG. 11B) as the pointing direction reflection face 61 extends from said one end to the pointing direction S1 (i.e. a left direction in FIG. 11B). Thus, the pointing direction reflection face 61 reflects a part L1 of light L received at the light receiving part 42 to the pointing direction S1, and transmits other part L3 of this light L toward the transmission face 63.

The rear end direction reflection face 62 is formed into a substantially flat surface. The rear end direction reflection face 62 has one end connected to the one end of the pointing direction reflection face 61 and is slanted so as to gradually extend away from the base part 40 in a direction of the shaft center P of the indicator shaft 14 (i.e. an upper direction in FIG. 11B) as the rear end direction reflection face 62 extends from said one end to the rear end direction S2 (i.e. a right direction in FIG. 11B). That is, the rear end direction reflection face 62 is connected to the pointing direction reflection face 61 in an intersecting fashion. Thus, the rear end direction reflection face 62 reflects a part L2 of the light L received at the light receiving part 42 to the rear end direction S2, and transmits other part L3 of this light L toward the transmission face 63. Furthermore, a corner 60*a*, which is formed at an intersection of the pointing direction reflection face 61 and the rear end direction reflection face 62, is located on the shaft center P of the indicator shaft 14 and arranged toward the light receiving part 42 of the base part 40. Or course, the position of the corner 60*a* is not limited on the shaft center P of the indicator shaft 14 and may be displaced from the shaft center P toward the pointing direction S1 or the rear end direction S2.

The transmission face 63 is arranged to face the upper face 53 of the indicator part 50 and is formed into a curved surface so that a cross-section of the transmission face 63 along the longitudinal direction of the indicator part 50 (i.e. the pointing direction S1) is formed into a smooth curved line which is convex in a direction away from the corner 60*a*. That is, the transmission face 63 is formed into a concave lens shape. The transmission face 63 has one end connected to the upper other end of the pointing direction reflection face 61 so as to intersect to the pointing direction reflection face 61 and has the other end connected to the upper other end of the rear end direction reflection face 62 so as to intersect with the rear end direction reflection face 62. In other words, the transmission face 63 is formed into a convexly curved surface which is convex toward the upper face 53 of the indicator part 50 from the one end of the transmission face 63 connected to the pointing direction reflection face 61 to the other end of the transmission face 63 connected to the rear end direction reflection face 62. A longitudinal center of the indicator part 50 of the transmission face 63 is positioned on the shaft center P of the indicator shaft 14. Of course, the shape of the transmission face 63 is not limited to the concave lens shape, and the arrangement of the transmission face 63 is not limited to the above-described arrangement.

The indicator main body 31 reflects and transmits the light received at the light receiving part 42 of the base part 40 by the hollow reflection part 60 and guides the light in the indicator part 50 to exit from the upper face 53 of the indicator part 50. By doing so, the upper face 53 of the indicator part 50 emits light, and thus the upper face 53 becomes luminous and visible through a slit 71 of the cover member 32.

As shown in FIG. 10, the cover member 32 includes an upper cover 33 and a lower cover 38 which are divided in an up-down direction.

The upper cover 33 includes a first cover portion 34 formed into a substantially rectangular tube shape which gets gradually thinner from a rear end 34*b* toward a distal end 34*a* in accordance with the outer shape of the indicator part 50 of the indicator main body 31, and a second cover portion 35 formed into a circular dish covering around the base part 40 of the indicator main body 31. The first cover portion 34 and the second cover portion 35 are arranged to open downward in the drawing, and the indicator part 50 of the indicator main body 31 is housed inside from this opening.

An upper wall portion 34*c* of the first cover portion 34 is provided with the slit 71 extending from the rear end 34*b* to the distal end 34*a*. When the indicator main body 31 and the cover member 32 are attached together, the upper face 53 of the indicator part 50 of the indicator main body 31 is exposed from this slit 71 in a straight line fashion throughout in the longitudinal direction of the upper face 53. In other words, the slit 71 is formed along the longitudinal direction of the indicator part 50. The length and the width of the slit 71 may be designed arbitrarily in accordance with the design of the indicator 3, for example. Furthermore, a translucent coloring member or a light diffusing member may be provided in the slit 71, for example, as long as the slit 71 is arranged to pass the light exited from the upper face of the indicator part 50 therethrough. Furthermore, an inner face of the second cover portion 35 is provided with a pair of bosses (not shown) which is formed to protrude downward in the drawing and arranged to fit to a pair of fitting holes 38d of the lower cover 38.

The lower cover 38 includes an annular plate-shaped first cover section 38a formed in accordance with the shape of the opening of the second cover portion 35 of the upper cover 33, a strip-shaped second cover section 38b radially extending from the first cover section 38a and formed in accordance with the shape of the opening at the distal end side portion of the first cover portion 34 of the upper cover 33 which houses the pointing part 51 of the indicator part 50, a penetrating part 38c provided at the first cover section 38a and arranged to pass the base part 40 of the indicator main body 31 therethrough, the pair of fitting holes 38d arranged at the first cover section 38a in accordance with the pair of bosses of the upper cover 33, and an attachment boss 38e at which the balance member 39 is attached. When attached to the upper cover 33, the lower cover 38 covers the openings of the first cover portion 34 and the second cover portion 35 to form a space for housing the indicator part 50 of the indicator main body 31 with the upper cover 33. By housing the indicator part 50 of the indicator main body 31 in this housing space, the light exited from the surface of the bottom face 54 and such of the indicator part 50 is prevented from irradiating the dial plate 2 and such.

The balance member 39 is formed to have weight which is set in view of the indicator part 50 of the indicator main body 31. The balance member 39 includes a fitting hole 39a arranged to fit to the attachment boss 38e provided at the lower cover 38 of the cover member 32. The balance member 39 is positioned by the attachment boss 38e and housed in the cover member 32.

The indicator 3 having the above-described structure may be assembled as explained below. Firstly, the base part 40 of the indicator main body 31 is passed through the penetrating part 38c of the lower cover 38 to install the indicator main body 31 to the lower cover 38 and install the balance member 39 to the lower cover 38. Then, the upper cover 33 is moved closer to the indicator main body 31 from the side of the upper face 53 of the indicator part 50 of the indicator main body 31 so as to cover the indicator main body 31, and the pair of boss provided in the second cover of the upper cover 33 is fitted into the pair of fitting holes 38d of the lower cover 38, by which the upper cover 33 and the lower cover 38 are fixed to each other so that the indicator main body 31 is housed in the cover member 32, and the assembling is completed.

The drive device 4 is a known stepping motor. The drive device 4 includes the indicator shaft 14 formed into a substantially circular cylindrical shape and made of translucent synthetic resin such as polycarbonate resin and a main body portion 15 arranged to rotatably support the indicator shaft 14 and rotate the indicator shaft 14 on the principle of the stepping motor in accordance with measured quantity of speed obtained by a speed sensor not shown. A bottom face 15a of the main body portion 15 placed over the later-described circuit board 5 is provided with a recessed portion 15b, and an end face 14b of the indicator shaft 14 at the lower side in the drawing is exposed in this recessed portion 15b. The base part 40 of the indicator main body 31 described above is attached to the distal end of the indicator shaft 14 at the upper side in the drawing. The indicator shaft 14 is arranged to rotate the indicator main body 31 and function as the light guide member to guide the light to the base part 40.

The circuit board 5 is a known printed board provided for example with electronic components and a wiring pattern which electrically connects these electronic components and such. A surface of the circuit board 5 facing the dial plate 2 is mounted with the drive device 4 and the plurality of light sources 6.

The plurality of light sources 6 includes a LED, a bulb and such and is controlled to light up and out by a control unit not shown provided at the circuit board 5. The plurality of light sources 6 emits light to illuminate the indexes of the dial plate 2 and the indicator main body 31 of the indicator 3 and such. Furthermore, one of the plurality of light sources 6 is arranged in the recessed portion 15b of the main body portion 15 of the drive device 4 so as to face the end face 14b of the indicator shaft 14. In this manner, the indicator shaft 14 guides the light which has entered this end face 14b from the light source 6 and directs the light to exit from the end face 14a at the distal end of the indicator shaft 14.

The case 7 includes a reflection face which is a tapered face, i.e. a surface of the tapered portion 7a, so that the light emitted from the light source 6 is reflected toward the dial plate 2. In this manner, the respective indexes provided on the surface 2a of the dial plate 2 emit light. The back cover 8 is attached to the case 7 so as to cover the back of the circuit board 5. The front glass 9 is arranged to cover the dial plate 2 and the indicator 3 and such and attached to the case 7 via an end member 10 using a fixation means not shown such as a latch claw. The back cover 8 and the front glass 9 prevent dust and such from entering inside of the vehicle display device 1.

Next, an example of operation (action) of the indicator (light-emitting indicator) 3 according to the present invention having the above-described structure is explained with reference to FIGS. 11 to 14. In each drawing, arrows shown in the indicator main body 31 illustrate a traveling direction of the light guided to the indicator main body 31.

As shown in FIGS. 12 and 13, in this embodiment, the hollow reflection part 60 provided at the indicator part 50 of the indicator main body 31 is formed into a substantially fan-like shape formed by the pointing direction reflection face 61, the rear end direction 62 reflection face 62 and the transmission face 63.

The pointing direction reflection face 61 reflects a part L1 of light L received at the light receiving part 42 to the pointing direction S1 (i.e. the left direction in FIG. 13), and transmits other part L3 of this light L toward the transmission face 63. The rear end direction reflection face 62 reflects a part L2 of light L received at the light receiving part 42 to the rear end direction S2 (i.e. the right direction in FIG. 13), and transmits other part L3 of this light L toward the transmission face 63. The light L1 travels in the pointing part 51 toward the pointing direction S1 and exits from the section R1 of the upper face 53 located adjacent to the pointing part 51. The light L2 travels in the rearward part 52 toward the rear end direction S2 and exits from the section R2 of the upper face 53 of the indicator part 50 located adjacent to the rearward part 52. The light L3 enters the transmission face 63 and then exits from the section R3 of the upper face 53 above the hollow reflection part 60. In this manner, the entire upper face 53 of the indicator part 50 becomes luminous.

As illustrated in FIG. 14, in the vicinity of the hollow reflection part 60, a part L1' and a part L2' of the light L travel directly from the light receiving part 42 to the upper face 53, or are firstly reflected on the pointing direction reflection face 61 or the rear end direction reflection face 62 and travel in the indicator part 50 toward the upper face 53. Furthermore, a light component L3' adjacent to the pointing direction reflection face 61 and a light component L3" adjacent to the rear end direction reflection face 62 included in the light L3 travel through the hollow reflection part 60 and enter the transmission face 63 and then travel in the indicator part 50 toward the upper face 53.

Furthermore, as described above, the transmission face 63 is formed into the convexly curved surface which is convex toward the upper face 53 of the indicator part 50 from the one end of the transmission face 63 connected to the pointing direction reflection face 61 to the other end of the transmission face 63 connected to the rear end direction reflection face 62. Thus, the incidence angle of the light component L3', L3" with respect to the transmission face 63 is adjusted, such that the light component L3', L3" is refracted so that the spread angle of the light L3 including the light components L3', L3" which has entered the transmission face 63 is increased compared to said spread angle in the case of the transmission face 63 formed into a flat surface. Therefore, the spread angle of the light L3 can be adjusted in a suitable fashion by adjusting the shape of the transmission face 63. In addition, light components other than the light components L3', L3" included in the light L3 refract in a similar fashion. FIG. 14 exemplarily shows the light component L3', L3" entering the transmission face 63 in an orthogonal fashion (i.e. the incidence angle is 0 degree); however the present invention is not limited to this, and as long as the incidence angle of each light component of the light L3 is smaller than in the case of the transmission face 63 formed in a flat surface, the same effect as described above is obtained.

FIG. 15A shows the spread angle α 1 for the transmission face 63 formed into a flat surface. FIGS. 15B to 15D shows the spread angles α 2 to α 4 for the respective transmission faces 63 formed into convexly curved surfaces having degrees of swelling (i.e. curvatures) increasing in order. In the drawing, a dashed-dotted line indicates a normal line H at a point on the transmission face 63 at which the light component L3', L3" has entered. In FIG. 15B, the normal lines H are slated inward compared to the pointing direction reflection face 61 and the rear end direction reflection face 62. In FIG. 15C, the normal lines H are parallel to the pointing direction reflection face 61 and the rear end direction reflection face 62, respectively. In FIG. 15D, the normal lines H are slated outward compared to the pointing direction reflection face 61 and the rear end direction reflection face 62. In FIGS. 15B to 15D, dotted lines which indicate the flat-shaped transmission face 63 and the light components L3', L3" of FIG. 15A are shown for comparison. In FIGS. 15A to 15D, the respective spread angles have a relationship of α 1<α 2<α 3<α 4.

Therefore, the optimization of the spread angle of the light L3 by adjusting the shape of the transmission face 63 can prevent the decrease in the amount of light which exits from the section (i.e. the section between the section R1 and the section R3) located at the extension of the pointing direction reflection face 61 at the upper surface 53 of the indicator part 50. Furthermore, similarly, the decrease in the amount of light which exits from the section (i.e. the section between the section R2 and the section R3) located at the extension of the rear end direction reflection face 62 at the upper surface 53 of the indicator part 50 can be prevented as well. In FIG. 12 and FIG. 13, there are spaces between the section R1 and the section R3 and between the section R2 and the section R3 for the sake of explanation; however, these spaces do not exist in a practical sense, and the dark area is not formed at the upper face 53 of the indicator part 50.

As described above, according to the present invention, the hollow reflection part 60 provided at the indicator part 50 of the indicator main body 31 includes the pointing direction reflection face 61, the rear end direction reflection face 62 and the transmission face 63, and this transmission face 63 is formed into the convexly curved surface which is convex toward the upper face of the indicator part 50 from the one end of the transmission face 63 connected to the pointing direction reflection face 61 to the other end of the transmission face 63 connected to the rear end direction reflection face 62. Thus, the incidence angle of the light L3 with respect to the transmission face 63 which had transmitted through each of the pointing direction reflection face 61 and the rear end direction reflection face 62 is adjusted, such that the light L3 is refracted so that the spread angle of the light L3 which has entered the transmission face 63 is increased compared to the spread angle in the case of the transmission face 63 formed into the flat surface. Therefore, the optimization of the spread angle of the light L3 by adjusting the shape of the transmission face 63 can prevent the dark area from being formed around the section located at the extensions of the pointing direction reflection face 61 and the rear end direction reflection face 61 at the upper surface 53 of the indicator part 50. Thus, the non-uniformity in the brightness at the upper face 53 of the indicator part 50 can be prevented at low cost without providing the light diffusing member or the like.

Furthermore, since the cross-section of the transmission face 63 along the pointing direction S1 is formed into the smooth curved line which is convex toward the upper face 53 of the indicator part 50, the transmission face 63 is formed into the concave lens-like shape, thereby allowing the entered light to spread uniformly in the longitudinal direction of the indicator part 50. Thus, the non-uniformity in the brightness at the upper face 53 of the indicator part 50 can be prevented even more.

In this embodiment, the terms for indicating directions such as up, down, left, right, front and rear are used for purpose of explaining the arrangement of operation of the respective components of the vehicle display device 1, the light-emitting indicator 3 and the indicator main body 31, and thus are used in a relative manner not in an absolute manner. These terms are suitable when the vehicle display device 1, the light-emitting indicator 3, the indicator main body 31 and components thereof are in the shown position. However, when their positions are changed, then these terms should be interpreted differently in accordance with the change in the position.

Furthermore, the shape of the hollow reflection part 60 is not limited to the fan-like shape as described above and may be in any shape without departing from the object of the present invention and as long as it is formed in a hollow shape in the indicator part. Also, the shapes of the pointing direction reflection face 61, the rear end direction reflection face 62 and the transmission face 63 are not limited to the above-described configuration. Especially, the transmission face 63 may be in any shape without departing from the object of the present invention and as long as the transmission face 63 is formed into the curved surface which is convex toward the upper face 53 of the indicator part 50 from the one end of the transmission face 63 connected to the pointing direction reflection face 61 to the other end of the transmission face 63 connected to the rear end direction reflection face 62. Herein, the term "convexly curved surface" includes a smoothly curved surface, as well as the combination of a flat surface, a curved surface and a non-spherical surface formed into a substantially curved surface. Furthermore, the pointing direction reflection face 61 and the rear end direction reflection face 62 are formed into a substantially flat surface; however, the present invention is not limited to this, and these respective faces may be formed in a flat surface, a curved surface or a non-spherical surface or a surface formed by the combination these surfaces, or formed by a plurality of faces, or formed in any other shape without departing from the object of the present invention.

Furthermore, in this embodiment, the base part 40 is constituted of the base part main body 41 attached to the indicator shaft 14 and the light receiving part 42 which receives the light from the light source 6 guided by the indicator shaft 14; however, the present invention is not limited to this. For example, as shown in FIG. 16, the lower cover 38 may be provided with a circular cylindrical shaft receiving part 38f attached to the indicator shaft 14 instead of the base part main body 41, so that the base part 40 of the indicator main body 31 is constituted of the light receiving part 42 alone. As such, the base part of the indicator main body (indicator member) may have any structure as long as the base part includes at least the light receiving part which receives the light from the light source.

Moreover, although this embodiment is described in relation to the vehicle display device as the speed meter, the present invention is not limited to this. For example, the present invention may be applied to an indicator device other than the speed meter such as an engine revolution counter and a fuel level meter, or alternatively, the present invention may be applied for example to an industrial indicator device other than the vehicle display device such as an indicator used for measurement of gas pressure or temperature in a factory. As such, the present invention may be used in any application and any device without departing from the object of the present invention.

The embodiment described above is only representative embodiment of the present invention, and the present invention is not limited to the embodiment. That is, the present invention can be modified in various ways and implemented without departing from the gist of the present invention.

(3.8)

In the following, a vehicle display device as one embodiment of an indicator instrument according to the present invention is explained in reference to FIGS. 21 through 26.

In FIG. 21, a vehicle display device 1 is a speed meter which displays a vehicle speed, for example. The vehicle display device 1 includes a dial plate 2 having a surface 2a (i.e. a surface which is visible by a viewer) provided with indexes such as scale marks and numbers, letters or symbols, a light-emitting indicator (hereinafter called an indicator) 3 as an indicator unit positioned on the surface 2a of the dial plate 2, a drive device 4 having an indicator shaft 14 including a distal end at which the indicator 3 is attached, a circuit board 5 including a circuit pattern, an electronic component and such and including the drive device 4 fixed at the circuit board 5, a plurality of light sources 6 provided at the circuit board 5, a case 7 having a tapered portion 7a formed from a central portion of the circuit board 5 toward an edge of the dial plate 2, a back cover 8 covering a back side of the circuit board 5, and a front glass 9.

The dial plate 2 is a member formed into a substantially circular plate shape made of transparent or semi-transparent synthetic resin such as polycarbonate, for example. The surface 2a of the dial plate 2 includes a light-blocking region at which light-blocking ink is printed, and an index as a translucent design formed by removing (or not printing) the light-blocking ink along a shape of a letter and a scale and such. Each index becomes luminous and visible by being irradiated from a back side of the dial plate 2 by the later-described light source 6.

The indicator 3 is arranged adjacent to the surface 2a of the dial plate 2 and is arranged to point to the respective indexes provided at the dial plate 2, thereby displaying a measured value in cooperation with the respective indexes. As shown in FIG. 22, the indicator 3 includes an indicator main body 31 as an indicator member, a cover member 32 made of translucent synthetic resin and covering the indicator main body 31, and a balance member 39 arranged inside of the cover member 32 to adjust the balance of the indicator 3.

As shown in FIGS. 23A and 23B, the indicator main body 31 includes a base part 40 and an indicator part 50 which are integrally formed using translucent synthetic resin as translucent material such as polycarbonate resin and acrylic resin.

The base part 40 includes a circular cylindrical base part main body 41 and a light receiving part 42 arranged at an inner side of the base part main body 41 and arranged adjacent to an upper end 41a. The base part main body 41 is fixed to an indicator shaft 14 in a coaxial fashion by inserting and fitting the distal end of the indicator shaft 14 into a lower end 41b. Thus, a center of the base part main body 41 coincides with a shaft center P of the indicator shaft 14. The light receiving part 42 is formed into a flat surface having a circular shape identical to the inner side of the base part main body 41 so that when the indicator shaft 14 is fitted to the base part main body 41, the light receiving part 42 is arranged to face an end face 14a of the distal end of the indicator shaft 14 with an interval. Of course, the shape of the light receiving part 42 is not limited to the flat surface and may be a curved surface, a shape formed by combining several faces, or any other shape which can receive the light from the light source. In addition, the light receiving part 42 may be arranged in close contact with the end face 14a of the indicator shaft 14.

The indicator part 50 is formed continuous with an upper end 41a of the base part main body 41 (i.e. one end of the base part 40). The indicator part 50 includes a pointing part 51 extending from the upper end 41a to one direction (i.e. a pointing direction S1) which is perpendicular (or substantially perpendicular) to the shaft center P, and a rearward part 52 extending to the other direction (i.e. a rear end direction S2) which is opposite of said one direction and extending shorter than the pointing part 51, with a boundary at the shaft center P of the indicator shaft 14. In other words, the indicator part 50 extends from the upper end 41a of the base part main body 41 to each of the pointing direction S1 and the rear end direction S2. The pointing direction S1 and the rear end direction S2 match with (or substantially match with) a radial direction of the indicator shaft 14. The pointing direction S1 and the rear end direction S2 correspond to a longitudinal direction of the indicator part 50. Furthermore, the indicator part 50 is provided with a hollow reflection part 60 as a reflection part.

A bottom face 54, which is a surface of the indicator part 50 facing the base part 40, is provided with a reflection layer 54a which is overlapped to the bottom face 54 and colored in white or silver, for example, using a hot stamping or the like so as to reflect the light entering the bottom face 54 from inside of the indicator part 50. An upper face 53, which is a surface of the indicator part 50 at opposite side of the bottom face 54, is provided with a diffusion layer 53a which is overlapped to the upper face 53 and colored in red, for example, using a hot stamping or the like so as to diffuse the light exiting from the upper face 53. Alternatively, the reflection layer 54a and the diffusion layer 53a may be formed at the bottom face 54 and the upper face 53 by forming embossment or fine prism structure. Furthermore, in this embodiment, the reflection layer 54a is provided only at the bottom face 54 and arranged adjacent to the pointing part 51; however, a similar reflection layer 54a may be provided also at the bottom face 54 and arranged adjacent to the rearward part 52. In the following description, the term "bottom face 54" indicates the surface of the indicator part 50 adjacent to the base part 40 including the reflection layer 54a, and the term "upper face 53" indicates the surface of the indicator part 50 at the opposite side of the bottom face 54 including the diffusion layer 53a. Also, the bottom face 54 and the reflection layer 54a, as well as the upper face 53 and the diffusion layer 53a are described distinctively only when necessary. In addition, only one of the reflection layer 54a and the diffusion layer 53a may be provided. Furthermore, the upper face 53 for the indicator part 50 can be divided into an upper face 531 of the pointing part 51 and an upper face 532 of the rearward part 52 with a boundary at the shaft center P of the indicator shaft 14. In addition, the bottom face 54 of the indicator part 50 corresponds to a bottom face of the pointing part 51.

As shown in FIGS. 23A and 23B, the hollow reflection part 60 is arranged in the indicator part 50 and arranged adjacent to the upper end 41a of the base part main body 41 and is arranged at a location opposed to the light receiving part 42 of the base part 40. The hollow reflection part 60 includes a pointing direction reflection face 61, a rear end direction reflection face 62 and a transmission face 63 and is formed into a substantially isosceles triangular shape which penetrates through the indicator part 50 in the widthwise direction (i.e. a front-back direction perpendicular to a plane of paper in FIG. 23B).

The pointing direction reflection face 61 is formed into a flat surface. The pointing direction reflection face 61 is arranged such that one end thereof at a lower side in the drawing is located adjacent to the base part 40 and is slanted so as to gradually extend away from the base part 40 in a direction of the shaft center P of the indicator shaft 14 (i.e. an upper direction in FIG. 23B) as the pointing direction reflection face 61 extends from said one end to the pointing direction S1 (i.e. a left direction in FIG. 23B). Thus, the pointing direction reflection face 61 reflects a part L1 of light L received at the light receiving part 42 to the pointing direction S1, and transmits other part L3 of this light L toward the transmission face 63.

The rear end direction reflection face 62 is formed into a flat surface. The rear end direction reflection face 62 has one end connected to the one end of the pointing direction reflection face 61 and is slanted so as to gradually extend away from the base part 40 in a direction of the shaft center P of the indicator shaft 14 (i.e. an upper direction in FIG. 23B) as the rear end direction reflection face 62 extends from said one end to the rear end direction S2 (i.e. a right direction in FIG. 23B). That is, the rear end direction reflection face 62 is intersecting with and connected to the pointing direction reflection face 61. Thus, the rear end direction reflection face 62 reflects a part L2 of the light L received at the light receiving part 42 to the rear end direction S2, and transmits other part L3 of this light L toward the transmission face 63. Furthermore, a corner 60a, which is formed at an intersection of the pointing direction reflection face 61 and the rear end direction reflection face 62, is located on the shaft center P of the indicator shaft 14 and arranged toward the light receiving part 42 of the base part 40. Or course, the position of the corner 60a is not limited on the shaft center P of the indicator shaft 14 and may be displaced from the shaft center P toward the pointing direction S1 or the rear end direction S2.

The transmission face 63 is formed into a flat surface and is arranged substantially parallel to the upper face 53 of the indicator part 50 so as to face the upper face 53. The transmission face 63 has one end connected to the other end of the pointing direction reflection face 61 at the upper side in the drawing so as to intersect with the pointing direction reflection face 61 and has the other end connected to the other end of the rear end direction reflection face 62 at the upper side in the drawing so as to intersect with the rear end direction reflection face 62. The transmission face 63 is arranged such that a center of the transmission face 63 in the longitudinal direction of the indicator part 50 is positioned on the shaft center P of the indicator shaft 14. Of course, the transmission face 63 does not have to be substantially parallel to the upper face 53, and also the arrangement of the transmission face 63 is not limited only to the above-described arrangement.

There is provided a notch 56 arranged at the bottom face 54 of the indicator part 50 (i.e. a bottom face of the pointing part 51) facing the base part 40. The notch 56 is formed by cutting out the bottom face 54 so that a cross-sectional shape along the longitudinal direction of the indicator part 50 of the notch 56 is formed into a wedge-like shape having a distal end pointing to an upper face 531 of the pointing part 51. Of course, the cross-sectional shape of the notch 56 may be other than the wedge-like shape such as a trapezoid and a semi-circular shape. Furthermore, the notch 56 is arranged linearly at the bottom face 54 throughout the widthwise direction of the indicator part 50. Also, the notch 56 is arranged right below a section R of the upper face 531 of the pointing part 51 located adjacent to the hollow reflection part 60. The notch 56 includes a first reflection face 56a arranged toward the rear end direction S2 and a second reflection face 56b arranged toward the pointing direction S1. Size and angle of the first reflection face 56a are arranged so that the first reflection face 56a reflects a part of the light L1 reflected by the pointing direction reflection face 61 toward the section R. The first reflection face 56a corresponds to an upward reflection face described in claims.

In this embodiment, the notch 56 is formed by cutting out the bottom face 54 of the indicator part 50 into the wedge-like shape linearly throughout the widthwise direction of the indicator part 50; however the present invention is not limited to this. For example, a wedge-shaped notch 56A having an arc shape which is convex toward the pointing direction S1 as shown in FIG. 24A, a wedge-shaped notch 56B arranged at a widthwise central portion of the indicator part 50 as shown in FIG. 24B, or a pair of wedge-like notches 56C arranged at both widthwise ends of the indicator part 50 as shown in FIG. 24C, or any other shape or position may be applied as long as the notch 56 has a reflection face which reflects the part of the light L1 reflected by the pointing direction reflection face 61 toward the section R1.

The indicator main body 31 reflects and transmits the light received at the light receiving part 42 of the base part 40 by the hollow reflection part 60 and guides the light in the indicator part 50 to exit from the upper face 53 of the indicator part 50. By doing so, the upper face 53 of the indicator part 50 emits light, and thus the upper face 53 becomes luminous and visible through a slit 71 of the cover member 32.

As shown in FIG. 22, the cover member 32 includes an upper cover 33 and a lower cover 38 which are divided in an up-down direction.

The upper cover 33 includes a first cover portion 34 formed into a substantially rectangular tube shape which gets gradually thinner from a rear end 34b toward a distal end 34a in accordance with the outer shape of the indicator part 50 of the indicator main body 31, and a second cover portion 35 formed into a circular dish covering around the base part 40 of the indicator main body 31. The first cover portion 34 and the second cover portion 35 are arranged to open downward in the drawing, and the indicator part 50 of the indicator main body 31 is housed inside from this opening.

An upper wall portion 34c of the first cover portion 34 is provided with the slit 71 extending from the rear end 34b to the distal end 34a. When the indicator main body 31 and the cover member 32 are attached together, the upper face 53 of the indicator part 50 of the indicator main body 31 is exposed from this slit 71 in a straight line fashion throughout in the longitudinal direction of the upper face 53. In other words, the slit 71 is formed along the longitudinal direction of the indicator part 50. The length and the width of the slit 71 may be designed arbitrarily in accordance with the design of the indicator 3, for example. Furthermore, for example, a translucent coloring member or a light diffusing member may be provided in the slit 71, as long as the slit 71 is arranged to pass the light exited from the upper face of the indicator part 50 therethrough. Furthermore, an inner face of the second cover portion 35 is provided with a pair of bosses (not shown) which is formed to protrude downward in the drawing and arranged to fit to a pair of fitting holes 38d of the lower cover 38.

The lower cover 38 includes an annular plate-shaped first cover section 38a formed in accordance with the shape of the opening of the second cover portion 35 of the upper cover 33, a strip-shaped second cover section 38b radially extending from the first cover section 38a and formed in accordance with the shape of the opening at the distal end side portion of the first cover portion 34 of the upper cover 33 which houses the pointing part 51 of the indicator part 50, a penetrating part 38c provided at the first cover section 38a and arranged to pass the base part 40 of the indicator main body 31 therethrough, the pair of fitting holes 38d arranged at the first cover section 38a in accordance with the pair of bosses of the upper cover 33, and an attachment boss 38e at which the balance member 39 is attached. When attached to the upper cover 33, the lower cover 38 covers the openings of the first cover portion 34 and the second cover portion 35 to form a space for housing the indicator part 50 of the indicator main body 31 with the upper cover 33. By housing the indicator part 50 of the indicator main body 31 in this housing space, the light exited from the surface of the bottom face 54 and such of the indicator part 50 is prevented from irradiating the dial plate 2 and such.

The balance member 39 is formed to have weight which is set in view of the indicator part 50 of the indicator main body 31. The balance member 39 includes a fitting hole 39a arranged to fit to the attachment boss 38e provided at the lower cover 38 of the cover member 32. The balance member 39 is positioned by the attachment boss 38e and housed in the cover member 32.

The indicator 3 having the above-described structure may be assembled as explained below. Firstly, the base part 40 of the indicator main body 31 is passed through the penetrating part 38c of the lower cover 38 to install the indicator main body 31 to the lower cover 38 and install the balance member 39 to the lower cover 38. Then, the upper cover 33 is moved closer to the indicator main body 31 from the side of the upper face 53 of the indicator part 50 of the indicator main body 31 so as to cover the indicator main body 31, and the pair of boss provided in the second cover of the upper cover 33 is fitted into the pair of fitting holes 38d of the lower cover 38, by which the upper cover 33 and the lower cover 38 are fixed to each other so that the indicator main body 31 is housed in the cover member 32, and the assembling is completed.

The drive device 4 is a known stepping motor. The drive device 4 includes the indicator shaft 14 formed into a substantially circular cylindrical shape and made of translucent synthetic resin such as polycarbonate resin and a main body portion 15 arranged to rotatably support the indicator shaft 14 and rotate the indicator shaft 14 on the principle of the stepping motor in accordance with measured quantity of speed obtained by a speed sensor not shown. A bottom face 15a of the main body portion 15 placed over the later-described circuit board 5 is provided with a recessed portion 15b, and an end face 14b of the indicator shaft 14 at the lower side in the drawing is exposed in this recessed portion 15b. The base part 40 of the indicator main body 31 described above is attached to the distal end of the indicator shaft 14 at the upper side in the drawing. The indicator shaft 14 is arranged to rotate the indicator main body 31 and function as the light guide member to guide the light to the base part 40.

The circuit board 5 is a known printed board provided for example with electronic components and a wiring pattern which electrically connects these electronic components and such. A surface of the circuit board 5 facing the dial plate 2 is mounted with the drive device 4 and the plurality of light sources 6.

The plurality of light sources 6 includes a LED, a bulb and such and is controlled to light up and out by a control unit not shown provided at the circuit board 5. The plurality of light sources 6 emits light to illuminate the indexes of the dial plate 2 and the indicator main body 31 of the indicator 3 and such. Furthermore, one of the plurality of light sources 6 is arranged in the recessed portion 15b of the main body portion 15 of the drive device 4 so as to face the end face 14b of the indicator shaft 14. In this manner, the indicator shaft 14 guides the light which has entered this end face 14b from the light source 6 and directs the light to exit from the end face 14a at the distal end of the indicator shaft 14.

The case 7 includes a reflection face which is a tapered face, i.e. a surface of the tapered portion 7a, so that the light emitted from the light source 6 is reflected toward the dial plate 2. In this manner, the respective indexes provided on the surface 2a of the dial plate 2 emit light. The back cover 8 is attached to the case 7 so as to cover the back of the circuit board 5. The front glass 9 is arranged to cover the dial plate 2 and the indicator 3 and such and attached to the case 7 via an end member 10 using a fixation means not shown such as a latch claw. The back cover 8 and the front glass 9 prevent dust and such from entering inside of the vehicle display device 1.

Next, an example of operation (action) of the indicator (light-emitting indicator) 3 according to the present invention having the above-described structure is explained with reference to FIG. 25. In each drawing, arrows shown in the indicator main body 31 illustrate a traveling direction of the light guided to the indicator main body 31.

In this embodiment, the indicator main body 31 includes the hollow reflection part 60 constituted of the pointing direction reflection face 61, the rear end direction 62 reflection face 62 and the transmission face 63. Furthermore, the indicator main body 31 includes the notch 56 formed by cutting out the bottom face 54 of the indicator part 50 into the wedge-like shape linearly throughout the widthwise direction of the indicator part 50. Since the notch 56 has a notched shape, a section of the pointing part 51 toward the pointing direction S1 than the notch 56 does not become thin, so there is no effect on the size of the pointing part 51. Size and angle of the first reflection face 56a of the notch 56 are arranged so that the first reflection face 56a reflects a part of the light L1 reflected by the pointing direction reflection face 61 toward the section R of the upper face 531 of the pointing part 51 located adjacent to the hollow reflection part 60.

As shown in FIG. 25, the pointing direction reflection face 61 reflects a part L1 of light L received at the light receiving part 42 to the pointing direction S1 (i.e. the left direction in FIG. 25), and transmits other part L3 of this light L toward the transmission face 63. The rear end direction reflection face 62 reflects a part L2 of light L received at the light receiving part 42 to the rear end direction S2 (i.e. the right direction in FIG. 25), and transmits other part L3 of this light L toward the transmission face 63. The light L1 travels in the pointing part 51 toward the pointing direction S1 and exits from the upper face 531 of the pointing part 51, and the light L2 travels in the rearward part 52 toward the rear end direction S2 and exits from the upper face 532 of the rearward part 52.

When the part of the light L1 enters the first reflection face 56a of the notch 56, it is reflected toward the section R and exits from the section R. Thus, the amount of light exiting from the section R of the upper face 53 of the indicator part 50 can be increased, thereby preventing the dark area from being formed at the section R.

As described above, according to the present invention, the indicator main body 31 includes the notch 56 arranged at the bottom face of the indicator part 50 (i.e. the bottom face of the pointing part 51) facing the base part 40 and having the first reflection face 56a which reflects the light reflected by the pointing direction reflection face 61 toward the section R of the upper face 531 of the pointing part 51 at opposite side of the bottom face 54, the section R being located adjacent to the hollow reflection part 60. Thus, without causing the pointing part 51 to be thin by forming the notch 56 into a notched shape, the amount of light exiting from the section R can be increased by the first reflection face 56a of the notch 56 which reflects the part of the light L reflected by the pointing direction reflection face 61 toward the upper face 531 of the pointing part 51. Thus, the formation of the dark area at the section R can be prevented, thereby preventing the non-uniformity in the brightness at the upper face 53 of the indicator part 50 even more.

In the embodiment described above, there is a space inside of the hollow reflection part 60; however, the present invention is not limited to this. As shown in FIG. 26, a light diffusing component 70 formed into the same shape as the hollow reflection part 60 by using synthetic resin containing a diffusing agent for transmitting and scattering the light may be provided inside of the hollow reflection part 60. By doing so, the light L3 transmitted through the pointing direction reflection face 61 and the rear end direction reflection face 62 can be scattered, further preventing the non-uniformity in the brightness at the upper face 53 of the indicator part 50.

In this embodiment, the terms for indicating directions such as up, down, left, right, front and rear are used for purpose of explaining the arrangement of operation of the respective components of the vehicle display device 1, the light-emitting indicator 3 and the indicator main body 31, and thus are used in a relative manner not in an absolute manner. These terms are suitable when the vehicle display device 1, the light-emitting indicator 3, the indicator main body 31 and components thereof are in the shown position. However, when their positions are changed, then these terms should be interpreted differently in accordance with the change in the position.

Furthermore, the shape of the hollow reflection part 60 is not limited to the above-described configuration. For example, the hollow reflection part may be formed into a fan-like shape formed by a flat-shaped pointing direction reflection face, a flat-shaped rear end direction reflection face and a curved transmission face which is curved so as to swell toward an upper face of the indicator part, or may be formed into a polygonal shape other than a triangle, or any other shape without departing from the object of the present invention, as long as the hollow reflection part includes the pointing direction reflection face, the rear end reflection face and the transmission face and is formed into a hollow at the indicator part. Moreover, the shapes of the pointing direction reflection face 61, the rear end direction reflection face 62 and the transmission face 63 is not limited to the above-described configuration and the each face may be formed in a flat surface, a curved surface or a non-spherical surface or a surface formed by the combination these surfaces, or formed by a plurality of faces, or formed in any other shape without departing from the object of the present invention.

Similarly, the first reflection face 56a of the notch 56 may be formed in a flat surface, a curved surface or a non-spherical surface or a surface formed by the combination these surfaces, or formed by a plurality of faces. Also, the number of the notch 56 is not limited to one. For example, a plurality of notches 56 may be provided so that the plurality of notches 56 is arranged in parallel along the pointing direction S1.

Furthermore, in this embodiment, the base part 40 is constituted of the base part main body 41 attached to the indicator shaft 14 and the light receiving part 42 which receives the light from the light source 6 guided by the indicator shaft 14; however, the present invention is not limited to this. For example, as shown in FIG. 5, the lower cover 38 may be provided with a circular cylindrical shaft receiving part 38f attached to the indicator shaft 14 instead of the base part main body 41, so that the base part 40 of the indicator main body 31 is constituted of the light receiving part 42 alone. As such, the base part of the indicator main body (indicator member) may have any structure as long as the base part includes at least the light receiving part which receives the light from the light source.

Moreover, although this embodiment is described in relation to the vehicle display device as the speed meter, the present invention is not limited to this. For example, the present invention may be applied to an indicator device other than the speed meter such as an engine revolution counter and a fuel level meter, or alternatively, the present invention may be applied for example to an industrial indicator device other than the vehicle display device such as an indicator used for measurement of gas pressure or temperature in a factory. As such, the present invention may be used in any application and any device without departing from the object of the present invention.

The embodiment described above is only representative embodiment of the present invention, and the present invention is not limited to the embodiment. That is, the present invention can be modified in various ways and implemented without departing from the gist of the present invention.

(4.8)

In the following, a vehicle display device as one embodiment of an indicator instrument according to the present invention is explained in reference to FIGS. 31 through 40.

In FIG. 31, a vehicle display device 1 is a speed meter which displays a vehicle speed, for example. The vehicle display device 1 includes a dial plate 2 having a surface 2a (i.e. a surface which is visible by a viewer) provided with indexes such as scale marks and numbers, letters or symbols, a light-emitting indicator (hereinafter called an indicator) 3 as an indicator unit positioned on the surface 2a of the dial plate 2, a drive device 4 having an indicator shaft 14 including a distal end at which the indicator 3 is attached, a circuit board 5 including a circuit pattern, an electronic component and such and including the drive device 4 fixed at the circuit board 5, a plurality of light sources 6a, 6b provided at the circuit board 5, a case 7 having a tapered portion 7a formed from a central portion of the circuit board 5 toward an edge of the dial plate 2, a back cover 8 covering a back side of the circuit board 5, and a front glass 9.

The dial plate 2 is a member formed into a substantially circular plate shape made of transparent or semi-transparent synthetic resin such as polycarbonate, for example. The surface 2a of the dial plate 2 includes a light-blocking region at which light-blocking ink is printed, and an index as a translucent design formed by removing (or not printing) the light-blocking ink along a shape of a letter and a scale and such. Each index becomes luminous and visible by being irradiated from a back side of the dial plate 2 by the later-described light source 6b.

The indicator 3 is arranged adjacent to the surface 2a of the dial plate 2 and is arranged to point to the respective indexes provided at the dial plate 2, thereby displaying a measured value in cooperation with the respective indexes. As shown in FIG. 32, the indicator 3 includes an indicator main body 31 as an indicator member, a cover member 32 made of translucent synthetic resin and covering the indicator main body 31, and a balance member 39 arranged inside of the cover member 32 to adjust the balance of the indicator 3.

As shown in FIGS. 31 to 33, the indicator main body 31 includes a base part 40, an indicator part 50, a hollow reflection part 60 and an reflection part for indicator shaft 70 which are integrally formed using translucent synthetic resin as translucent material such as polycarbonate resin and acrylic resin. In this embodiment, the base part 40 and the indicator part 50 are described as being formed integrally; however, the base part 40 and the indicator part 50 may be formed into separate pieces.

The base part 40 includes a shaft receiving part 41 arranged to be fixed at an end of the indicator shaft 14 and a light receiving part 42 arranged to receive light guided in the indicator shaft 14 fixed at the shaft receiving part 41. In this embodiment, the base part 40 is formed into a hollow circular cylindrical shape; however, the present invention is not limited to this. For example, the outer shape of the base part 40 may be formed into a substantially rectangular cylinder.

The shaft receiving part 41 is arranged at the base part 40 and is fixed to the indicator shaft 14 by inserting and fitting the distal end of the indicator shaft 14 into the shaft receiving part 41. Thus, the base part 40 fixed to the distal end of the indicator shaft 14 rotates in accordance with the rotational movement of the indicator shaft 14 and is a rotation center of the indicator main body 31. That is, a center of the base part main body 41 coincides with a shaft center P of the indicator shaft 14.

The light receiving part 42 is formed into a flat surface having a circular shape identical to shaft receiving part 41. When the indicator shaft 14 is fitted to the shaft receiving part 41, the light receiving part 42 is arranged to face an end face 14a of the distal end of the indicator shaft 14 with an interval. In this embodiment, by forming a space 43 inside of the shaft receiving part 41 between the light receiving part 42 and the end face 14a of the indicator shaft 14, the light exited from the end face 14a of the indicator shaft 14 is diffused in the space 43. However, alternatively, the light receiving part 42 may be in close contact with the end face 14a of the indicator shaft 14. In addition, the shape of the light receiving part 42 may be different from the shaft receiving part 41 or may be the shape other than flat surface.

The indicator part 50 is formed continuous with one end of the base part 40 at which the light receiving part 42 is formed. As shown in FIG. 33, the indicator part 50 according to this embodiment includes a pointing part 51 extending from the base part 40 to a pointing direction S1 of the indicator main body 31, and a rearward part 52 extending from the base part 40 to a rear end direction S2 opposite of said pointing direction S1 and extending shorter than the pointing part 51, with a boundary at the shaft center P of the indicator shaft 14. In other words, an upper face 53 of the indicator part 50 corresponds to an upper surface of both of the pointing part 51 and the rearward part 52 and is a light-emitting face which is viewed by a driver and such.

The upper face 53 of the indicator part 50 is provided with a diffusion layer 53a so as to diffuse light exiting from the upper face 53 to outside of the indicator main body 31. The diffusion layer 53a may be formed by using a coloring process such as hot stamping, printing, painting, two-color formation or the like, or by forming embossment or fine prism structure at a surface. Furthermore, a bottom face 54 of the indicator part 50 at opposite side of the upper face 53 is provided with a reflection layer 54a arranged to reflect light which had entered to the bottom face 54 from the indicator part 50. The reflection layer 54a is formed in a similar manner as the diffusion layer 53a. At least one of the diffusion layer 53a and the reflection layer 54a may be omitted from the indicator main body 31.

As shown in FIGS. 31 and 33, the hollow reflection part 60 is arranged in the indicator part 50 and arranged adjacent to the light receiving part 42 of the base part 40 and is arranged at a location opposed to the light receiving part 42. The hollow reflection part 60 includes a pointing direction reflection face 61, a rear end direction reflection face 62 and a transmission face 63 and is formed into a substantially inverse triangular shape which penetrates through the indicator part 50 in the widthwise direction of the indicator part 50. In addition, the shape of the hollow reflection part 60 is not limited to the inverse triangular shape of this embodiment, and may be other shapes having the pointing direction reflection face 61 and the rear end direction reflection face 62, for example.

The pointing direction reflection face 61 is arranged such that one end thereof at a lower side in the drawing is located adjacent to the base part 40 and is slanted so as to gradually extend away from the base part 40 in a direction of the shaft center P of the indicator shaft 14 (i.e. an upper direction in FIG. 33) as the pointing direction reflection face 61 extends from said one end to the pointing direction S1 (i.e. a left direction in FIG. 33). Thus, the pointing direction reflection face 61 reflects a part L1 of light L received at the light receiving part 42 to the pointing direction S1, and transmits other part L3 of this light L toward the transmission face 63.

The rear end direction reflection face 62 has one end connected to the one end of the pointing direction reflection face 61 in an intersecting fashion and is slanted so as to gradually extend away from the base part 40 in a direction of the shaft center P of the indicator shaft 14 (i.e. an upper direction in FIG. 33) as the rear end direction reflection face 62 extends from said one end to the rear end direction S2 (i.e. a right direction in FIG. 33). That is, the rear end direction reflection face 62 is connected to the pointing direction reflection face 61 in an intersecting fashion. Thus, the rear end direction reflection face 62 reflects a part L2 of the light L received at the light receiving part 42 to the rear end direction S2, and transmits other part L3 of this light L toward the transmission face 63.

The transmission face 63 has one end connected to the other end of the pointing direction reflection face 61 at the upper side in the drawing and the other end connected to the other end of the rear end direction reflection face 62 at the upper side in the drawing. That is, the transmission face 63 is connected to each of the pointing direction reflection face 61 and the rear end direction reflection face 62. The transmission face 63 is arranged to face the upper face 53 of the indicator part 50. In this embodiment, the transmission face 63 and the upper face 53 of the indicator part 50 are substantially parallel to each other. However, alternatively, the transmission face 63 and the upper face 53 of the indicator part 50 may be arranged other than the parallel form. Furthermore, in this embodiment, a center of the transmission face 63 in the longitudinal direction (i.e. the left-right direction in FIG. 33) is positioned on the shaft center P of the indicator shaft 14. However, the center of the transmission face 63 in the longitudinal direction may be displaced from the shaft center P of the indicator shaft 14.

As shown in FIGS. 33, 34, the reflection part for indicator shaft 70 includes a first reflection part for indicator shaft 71 arranged at the base part 40 and arranged adjacent to the pointing direction S1 and a second reflection part for indicator shaft 72 arranged at the base part 40 and arranged adjacent to the rear end direction S2.

Furthermore, in this embodiment, the reflection part for indicator shaft 70 includes both of the first reflection part for indicator shaft 71 and the second reflection part for indicator shaft 72. However, the present invention is not limited to this. For example, in the arrangement in which the dark area is formed only at the upper face 53 adjacent to the pointing direction S1 near the hollow reflection part 60, the first reflection part for indicator shaft 71 alone may be provided at the indicator main body 31, or, alternatively, in the arrangement in which the dark area is formed only at the upper face 53 adjacent to the rear end direction S2 near the hollow reflection part 60, the second reflection part for indicator shaft 72 alone may be provided at the indicator main body 31, or various other arrangements are possible.

The first reflection part for indicator shaft 71 is formed continuous from the base part 40 adjacent to the pointing direction S1 to the pointing part 51 so that light L4 traveling from the indicator shaft 14 to the outside of the base part 40 is reflected toward the upper face 53 of the pointing part 51 adjacent to the pointing direction reflection face 61. Here, the light L4 traveling from the indicator shaft 14 to the outside of the base part 40 means the light traveling in a direction of leaking from the indicator shaft 14 to the outside of the base part 40.

The first reflection part for indicator shaft 71 includes a light guide part 73 formed continuous from the base part 40 to the pointing part 51 and guides the light L4 traveling to the outside of the base part 40 from the indicator shaft 14, and an reflection face for indicator shaft 74 reflecting the light guided in the light guide part 73 toward the upper face 53 of the pointing part 51 adjacent to the pointing direction reflection face 61.

The light guide part 73 is formed as a slanted part formed from a surface near a central portion of the base part 40 located at the side of the pointing direction S1 to the bottom face 54 of the pointing part 51 adjacent to the base part 40. The reflection face for indicator shaft 74 corresponds to a surface of the light guide part 73. In this embodiment, the reflection face for indicator shaft 74 may be formed into a flat surface; however, alternatively the reflection face for indicator shaft 74 may be formed into a curved surface, a spherical surface and such. Furthermore, by providing a reflection layer at the reflection face for indicator shaft 74, the amount of light reflected toward the upper face 53 of the pointing part 51 adjacent to the pointing direction reflection face 61 can be increased. In addition, it is not necessary to direct all of the light reflected by the first reflection part for indicator shaft 71 toward the dark area, and depending on the degree of the non-uniformity in the brightness at the upper face of the indicator, the first reflection part for indicator shaft 71 may be formed such that a part of the light from the reflection part for indicator shaft 70 is directed to enter the pointing direction reflection face 61 of the hollow reflection part 60 and be reflected toward the direction of the distal end of the pointing part 51.

The second reflection part for indicator shaft 72 is formed continuous from the base part 40 to the rearward part 52 so that light L4 traveling from the indicator shaft 14 to the outside of the base part 40 is reflected toward the upper face 53 of the rearward part 52 adjacent to the rear end direction reflection face 62. The second reflection part for indicator shaft 72 is arranged in a similar manner as the first reflection part for indicator shaft 71, and includes a light guide part 75 and an reflection face for indicator shaft 76.

The light guide part 75 is formed as a slanted part formed from a surface near a central portion of the base part 40 located at the side of the rearward direction S2 to the bottom face 54 of the rearward part 52 adjacent to the base part 40. The reflection face for indicator shaft 76 corresponds to a surface of the light guide part 75. In this embodiment, the reflection face for indicator shaft 76 is formed into a flat surface; however, alternatively the reflection face for indicator shaft 76 may be formed into a curved surface, a spherical surface and such. Furthermore, by providing a reflection layer at the reflection face for indicator shaft 76, the amount of light reflected toward the upper face 53 of the rearward part 52 adjacent to the rear end direction reflection face 62 can be increased. In addition, it is not necessary to direct all of the light reflected by the second reflection part for indicator shaft 72 toward the dark area, and depending on the degree of the non-uniformity in the brightness at the upper face of the indicator, the second reflection part for indicator shaft 72 may be formed such that a part of the light from the second reflection part for indicator shaft 72 is directed to enter the rear end direction reflection face 62 of the hollow reflection part 60 and be reflected toward the direction of the distal end of the rearward part 52.

The above-described indicator main body 31 reflects and transmits the light received at the light receiving part 42 of the base part 40 from the indicator shaft 14 by the hollow reflection part 60 and guides the light in the indicator part 50 to exit from the upper face 53 of the indicator part 50. By doing so, the light exited from the upper face 53 becomes luminous and visible to a driver and such.

As shown in FIG. 32, the cover member 32 includes an upper cover 33 and a lower cover 38 which are divided in an up-down direction.

The upper cover 33 includes a first cover portion 34 formed into a substantially rectangular tube shape which gets gradually thinner from a rear end 34b toward a distal end 34a in accordance with the outer shape of the indicator part 50 of the indicator main body 31, and a second cover portion 35 formed into a circular dish covering around the base part 40 of the indicator main body 31. The first cover portion 34 and the second cover portion 35 are arranged to open downward in the drawing, and the indicator part 50 of the indicator main body 31 is housed inside from this opening.

An upper wall portion 34c of the first cover portion 34 is provided with the slit 71 extending from the rear end 34b to the distal end 34a. When the indicator main body 31 and the cover member 32 are attached together, the upper face 53 of the indicator part 50 of the indicator main body 31 is exposed from this slit 71 in a straight line fashion. In other words, the slit 71 is formed along the longitudinal direction of the indicator part 50. The length and the width of the slit 71 may be designed arbitrarily in accordance with the design of the indicator 3, for example. Furthermore, an inner face of the second cover portion 35 is provided with a pair of bosses (not shown) which is formed to protrude downward in the drawing and arranged to fit to a pair of fitting holes 38d of the lower cover 38.

The lower cover 38 includes an annular plate-shaped first cover section 38a formed in accordance with the shape of the opening of the second cover portion 35 of the upper cover 33, a strip-shaped second cover section 38b radially extending from the first cover section 38a and formed in accordance with the shape of the opening at the distal end side portion of the first cover portion 34 of the upper cover 33 which houses the pointing part 51 of the indicator part 50, a penetrating part 38c provided at the first cover section 38a and arranged to pass the base part 40 of the indicator main body 31 therethrough, the pair of fitting holes 38d arranged at the first cover section 38a in accordance with the pair of bosses of the upper cover 33, and an attachment boss 38e at which the balance member 39 is attached. When attached to the upper cover 33, the lower cover 38 covers the openings of the first cover portion 34 and the second cover portion 35 to form a space for housing the indicator part 50 of the indicator main body 31 with the upper cover 33. By housing the indicator part 50 of the indicator main body 31 in this housing space, the light exited from the surface of the bottom face 54 and such of the indicator part 50 is prevented from irradiating the dial plate 2 and such.

The balance member 39 is formed to have weight which is set in view of the indicator part 50 of the indicator main body 31. The balance member 39 includes a fitting hole 39a arranged to fit to the attachment boss 38e provided at the lower cover 38 of the cover member 32. The balance member 39 is positioned by the attachment boss 38e and housed in the cover member 32.

The indicator 3 having the above-described structure may be assembled as explained below. Firstly, the base part 40 of the indicator main body 31 is passed through the penetrating part 38c of the lower cover 38 to install the indicator main body 31 to the lower cover 38 and install the balance member 39 to the lower cover 38. Then, the upper cover 33 is moved closer to the indicator main body 31 from the side of the upper face 53 of the indicator part 50 of the indicator main body 31 so as to cover the indicator main body 31, and the pair of boss provided in the second cover of the upper cover 33 is fitted into the pair of fitting holes 38d of the lower cover 38, by which the upper cover 33 and the lower cover 38 are fixed to each other so that the indicator main body 31 is housed in the cover member 32, and the assembling is completed.

The drive device 4 is a known stepping motor. As shown in FIG. 33, the drive device 4 includes the indicator shaft 14 formed into a substantially circular cylindrical shape and made of translucent synthetic resin such as polycarbonate resin and a main body portion 15 arranged to rotatably support the indicator shaft 14 and rotate the indicator shaft 14 on the principle of the stepping motor in accordance with measured quantity of speed obtained by a speed sensor not shown. A bottom face 15a of the main body portion 15 placed over the later-described circuit board 5 is provided with a recessed portion 15b, and an end face 14b of the indicator shaft 14 at the lower side in the drawing is exposed in this recessed portion 15b. The base part 40 of the indicator main body 31 described above is fixed to the distal end of the indicator shaft 14 at the upper side in the drawing. The indicator shaft 14 is arranged to rotate the indicator main body 31 and function as the light guide member to guide the light to the base part 40.

The circuit board 5 is a known printed board provided for example with electronic components and a wiring pattern which electrically connects these electronic components and such. A surface of the circuit board 5 facing the dial plate 2 is mounted with the drive device 4 and the plurality of light sources 6.

The plurality of light sources 6a, 6b includes a LED and such and is controlled to light up and out by a control unit not shown provided at the circuit board 5. The light source 6a for illuminating the indicator emits light which is guided in the indicator shaft 14 of the drive device 4. The light source 6a is arranged in the recessed portion 15b of the main body portion 15 of the drive device 4 so as to face the end face 14b of the indicator shaft 14. In this manner, the indicator shaft 14 guides the light which has entered to this end face 14b from the light source 6 and directs the light to exit from the end face 14a at the distal end of the indicator shaft 14. Furthermore, the plurality of light sources 6b emits light to illuminate the indexes of the dial plate 2 and the indicator main body 31 of the indicator 3 and such.

The case 7 includes a reflection face which is a tapered face, i.e. a surface of the tapered portion 7a, so that the light emitted from the light source 6b is reflected toward the dial plate 2. In this manner, the respective indexes provided on the surface 2a of the dial plate 2 emit light. The back cover 8 is attached to the case 7 so as to cover the back of the circuit board 5. The front glass 9 is arranged to cover the dial plate 2 and the indicator 3 and such and attached to the case 7 via an end member 10 using a fixation means not shown such as a latch claw. The back cover 8 and the front glass 9 prevent dust and such from entering inside of the vehicle display device 1.

Next, an example of operation of the indicator (light-emitting indicator) 3 according to the present invention having the above-described structure is explained with reference to FIGS. 33, 34.

When the light source 6a is lighted up by the vehicle display device 1, the light emitted by the light source 6a is guided in the indicator shaft 14, and a part of the light which corresponds to the light L is directed out to the space 43 inside of the base part 40 of the indicator 3. Then, such partial light L is received at the light receiving part 42 and guided in the indicator part 50. The light L1 which is guided toward the pointing direction reflection face 61 of the hollow reflection part 60 is reflected by the pointing direction reflection face 61 toward the distal end of the pointing part 51 and guided in the pointing part 51, thereby allowing a light exit region E11 located at the upper face 53 of the indicator part 50 of the pointing part 51 to be luminous in an uniform fashion.

Among the above-described light L which is received in the indicator part 50, light L2 which is guided toward the rear end direction reflection face 62 of the hollow reflection part 60 is reflected by the rear end direction reflection face 62 toward the rear end of the rearward part 52 and guided in the rearward part 52, thereby allowing a light exit region E12 located at the upper face 53 of the indicator part 50 of the rearward part 52 to be luminous in an uniform fashion.

Among the above-described light L which is received in the indicator part 50, light L3 which has transmitted through the pointing direction reflection face 61 and the rear end direction reflection face 62 of the hollow reflection part 60 transmits through the transmission face 63 of the hollow reflection part 60, thereby allowing a light exit region E13 located at the upper face 53 of the indicator part 50 facing the hollow reflection part 60 to be luminous in an uniform fashion.

Light L4 which travels from the indicator shaft 14 toward an outside of the light receiving part 42 in the pointing direction S1 is guided in the light guide part 73 of the first reflection part for indicator shaft 71 and allows a light exit region E14 at the upper face 53 of the pointing part 51 located adjacent to the pointing direction reflection face 61 to be luminous by the reflection face for indicator shaft 74. In other words, the light L4 traveling to the outside of the light receiving part 42 is allowed to exit from the light exit region E14 located between the light exit regions E11 and E13 at which the light from the light receiving part 42 and the pointing direction reflection face 61 hardly exit.

Light L5 which travels from the indicator shaft 14 toward an outside of the light receiving part 42 in the rear end direction S2 is guided in the light guide part 75 of the second reflection part for indicator shaft 72 and allows a light exit region E15 at the upper face 53 of the rearward part 52 located adjacent to the rear end direction reflection face 62 to be luminous by the reflection face for indicator shaft 76. In other words, the light L5 traveling to the outside of the light receiving part 42 is allowed to exit from the light exit region E15 located between the light exit regions E13 and E12 at which the light from the light receiving part 42 and the pointing direction reflection face 61 hardly exit.

Thus, all of the continuous light exit regions E11 to E15 at the upper face 53 of the indicator main body 31 can emit light with the uniform brightness, and thus the upper face 53 of the indicator main body 31 can be luminous without producing non-uniformity in the brightness. The light which exited from the upper face 53 of the indicator main body 31 exits from the slit 71 of the cover member 32 toward a driver and such. In this manner, the driver and such visibly recognizes that the slit 71 of the cover member 32 is uniformly emitting the light.

According to the indicator main body (i.e. indicator member) 31 of the present invention, there is provided the reflection part for indicator shaft 70 which is formed continuously from the base part 40 to the pointing part 51 and which is arranged to reflect the light L4, which is traveling toward the outside of the base part 40 from the indicator shaft 14 fixed to the shaft receiving part 41 of the base part 40, toward the upper face of the pointing part 50 adjacent to the pointing direction reflection face 61. Thus, the light leaking from the base part 40 to the outside of the indicator main body 31 can be reduced, and also, that light L4 can be guided to the upper face of the pointing part 51 adjacent to the end of the pointing direction reflection face 61, thereby preventing the dark area from being formed at the upper face 53 of the pointing part 51. Therefore, the non-uniformity in brightness at the upper face (light emitting face) 53 of the indicator main body 31 can be prevented. Furthermore, there is no need to provide at the pointing direction reflection face 61 the light diffusing component for preventing the formation of the dark area at the upper face 53 of the pointing part 51, thereby reducing the number of components and reducing the cost of the indicator main body 31.

According to the above-described indicator main body 31, the reflection part for indicator shaft 70 is constituted of the light guide part 73 and the reflection face for indicator shaft 74. Thus, the light traveling from the indicator shaft 14 toward the outside of the pointing part 51 can be guided to the pointing part 51 and the reflection face for indicator shaft 74 by the light guide part 73, thereby further reducing the light leaking from the base part 40 to the outside of the indicator main body 31.

According to the indicator main body described above, there is provided the reflection part for indicator shaft 70 which is formed continuously from the base part 40 to the rearward part 52 and which is arranged to reflect the light L5, which is traveling toward the outside of the base part 40 at the side of the rear end direction S2 from the indicator shaft 14 fixed to the shaft receiving part 41 of the base part 40, toward the upper face of the rearward part 52 adjacent to the rear end direction reflection face 62. Thus, the light leaking from the base part 40 to the outside of the indicator main body 31 can be reduced, and also, that light can be guided to the rearward part 52 adjacent to the end of the rear end direction reflection face 62, thereby preventing the dark area from being formed at the upper face 53 of the rearward part 52. Therefore, the non-uniformity in brightness at the upper face 53 of the indicator main body 31 from the distal end of the pointing part 51 to the rear end of the rearward part 52 can be prevented. Thus, the upper face 53 of the indicator main body 31 can be luminous with uniform brightness.

Furthermore, for the above-described indicator main body 31, the reflection face for indicator shaft 74 of the first reflection part for indicator shaft 71 may be provided with a plurality of partial reflection faces 74a, 74b, 74c which are aligned along the widthwise direction of the pointing part 51, as shown in FIG. 35. An example of the plurality of partial reflection faces 74a, 74b, 74c includes a combination of convex surface and concave surface and a combination of reflection faces having different reflection angles. Similarly, the reflection face for indicator shaft 76 of the second reflection part for indicator shaft 72 may be provided with a plurality of partial reflection faces 76a, 76b, 76c. By employing such arrangement, reflection faces having various shapes can be combined. As a result, the light traveling from the indicator shaft 14 toward outside of the base part can be reflected toward the upper face of the pointing part 51 adjacent to the pointing direction reflection face 61 even more reliably.

Furthermore, as shown in FIGS. 36, 37A, 37B the reflection part for indicator shaft 70 of the indicator main body 31 may be provided with a reflection face for slit 78 projecting from the base part 40 in the widthwise direction of the indicator main body 31, so that light L6 which exited from the indicator shaft 14 toward an inner face of the upper cover (cover member) 33 is reflected toward the slit 71 of the upper cover 33 adjacent the pointing direction reflection face 61. In addition, such reflection part for indicator shaft 70 may be provided with at least one of or none of the above-described first reflection part for indicator shaft 71 and the second reflection part for indicator shaft 72.

For example, the reflection part for indicator shaft 70 may be provided with a light guide part 77, the reflection face for slit 78 and an exit face 79. The light guide part 77 is formed into a tapered shaped slanted part projecting from the surface of the central portion of the base part 40 toward the inner face of the upper cover 33. The reflection face for slit 78 is a slanted face of the light guide part 77 which reflects the light toward a portion at the upper face 53 of the indicator main body 31 at which the non-uniformity in brightness is produced. As shown in FIGS. 37A, 37B, the reflection face for slit 78 may be formed by combining a plurality of reflection faces having different directionalities. This plurality of reflection faces can change or adjust the direction of reflection of the light traveling from the indicator shaft 14 toward the outside of the base part 40, by changing the combination of the slant angle and the direction of reflection of the respective reflection faces, for example. Therefore, even if the location at which the non-uniformity in brightness is changed due to the different shape, arrangement or the like for each kind of indicator 3, the reflection face for slit 78 can guide said light which is traveling to outside toward the portion corresponding to the slit 71 at which the brightness is non-uniformity in brightness is produced. Thus, there is no need to provide a supplemental component for compensating the brightness at a portion with the low brightness at the slit 71. Furthermore, the lighting quality can be improved.

The exit face 79 is arranged to allow the light L6 which is reflected on the reflection face for slit 78 to travel toward the slit 71. The light L6 exited from the exit face 79 once again enters the indicator main body 31 from the hollow reflection part 60 and is guided in the indicator main body 31 and exits toward the slit 71, or is reflected on the inner face of the upper cover 33 toward the slit 71. By employing such reflection part 70 for indicator shaft, the brightness of the slit 71 adjacent to the pointing direction reflection face 61 can be prevented from being dark, thus the entire slit 71 can emit light with uniform brightness in a more reliable fashion.

Furthermore, the size and shape of the reflection part for indicator shaft 70 can be adjusted by the degree and the range of the dark area formed at the upper face 53 of the indicator main body 31. For example, the light traveling from the indicator shaft 14 toward the outside of the base part 40 can be reflected toward a desired location of the slit 71 by forming the reflection part for indicator shaft 70 into a convex surface as shown in the cross-sectional view of FIG. 38, or by forming the reflection part for indicator shaft 70 into a concave surface as shown in the cross-sectional view of FIG. 39. Moreover, the cross-sectional shape of the reflection face for slit 78 of the reflection part for indicator shaft 70 in the widthwise direction of the indicator main body 31 may be a straight line, a non-spherical surface and such.

As described above, by combining the first reflection part for indicator shaft 71 and the second reflection part for indicator shaft 72 as well as the reflection part for indicator shaft 70 projecting in the widthwise direction of the indicator main body 31, the light traveling from the indicator shaft 14 toward the outside of the base part 40 can be effectively utilized even more, thereby preventing the dark area being formed at the slit 71.

Furthermore, in the above-described embodiment, the first reflection part for indicator shaft 71 and the second reflection part for indicator shaft 72 are provided to both sides, i.e. the pointing direction S1 side and the rear end direction S2 side, of the base part 40 of the indicator main body 31. However, in the present invention, the present invention may be applied to the indicator main body 31 having only the pointing part 51 extending from one end of the base part 40 to the pointing direction S1 and in which the above-described rearward part 52 is omitted, as shown in FIG. 40.

The indicator main body 31 of the indicator 3 shown in FIG. 40 includes the base part 40, the indicator part 50, the hollow reflection part 60 and the first reflection part for indicator shaft 71 which are integrally formed using translucent synthetic resin as translucent material such as polycarbonate resin and acrylic resin. The indicator main body 31 is arranged to receive the light L which is guided in the indicator shaft 14 at the light receiving part 42 of the base part 40 into the indicator part 50, and reflect the received light by the pointing direction reflection face 61 toward the distal end of the pointing part 51, and thus the pointing part 51 becomes luminous due to the light guided in the pointing part 51. The first reflection part for indicator shaft 71 is arranged in the same fashion as the above-described embodiment. Even with this arrangement, the light traveling from the indicator shaft 14 toward the outside of the base part 40 is reflected by the first reflection part for indicator shaft 71 toward the upper face 53 of the pointing part 51 adjacent to the end of the pointing direction reflection face 61.

Therefore, the indicator shown in FIG. 40 can reduce the light leaking from the base part 40 to the outside of the indicator main body 31, and can guide said light to the upper face of the pointing part 51 adjacent to the end of the pointing direction reflection face 61, thereby preventing the dark area from being formed at the upper face 53 of the pointing part 51. Thus, the non-uniformity in brightness at the upper face (light emitting face) 53 can be prevented and improving the lighting quality.

For the arrangement of the indicator 3 having only the pointing part 51 as shown in FIG. 40, the above-described reflection face for slit 78 alone can be added. In this case, the light which is reflected at the reflection face for slit 78 is directed to exit from the slit 71 adjacent to the upper end of the pointing direction reflection face 61, thereby obtaining the effect by the above-described reflection face for slit 78. Furthermore, the indicator 3 shown in FIG. 40 may be provided with both of the first reflection part for indicator shaft 71 and the reflection face for slit 78.

Moreover, although this embodiment is described in relation to the vehicle display device as the speed meter, the present invention is not limited to this. For example, the present invention may be applied to an indicator device other than the speed meter such as an engine revolution counter and a fuel level meter, or alternatively, the present invention may be applied for example to an industrial indicator device other than the vehicle display device such as an indicator used for measurement of gas pressure or temperature in a factory. As such, the present invention may be used in any application and any device without departing from the object of the present invention.

The embodiment described above is only representative embodiment of the present invention, and the present invention is not limited to the embodiment. That is, the present invention can be modified in various ways and implemented without departing from the gist of the present invention.

The invention claimed is:

1. An indicator member made of translucent material and having
   a base part arranged to receive light from a light source,
   an indicator part extending from one end of the base part to each of a pointing direction and a rear end direction opposite of the pointing direction, and
   a hollow reflection part provided in the indicator part and arranged at a location opposed to the base part so as to reflect the light received at the base part toward the pointing direction and the rear end direction,
   wherein the hollow reflection part includes
      a pointing direction reflection face arranged to reflect a part of the light received at the base part toward the pointing direction and transmit another part of the light,
      a rear end direction reflection face connected to the pointing direction reflection face in an intersecting fashion and arranged to reflect a part of the light received at the base part toward the rear end direction and transmit another part of the light, and
      a transmission face connected to each of the pointing direction reflection face and the rear end direction reflection face in an intersecting fashion and arranged to face an upper face of the indicator part, and
   wherein the transmission face is formed into a convexly curved surface which is convex toward the upper face of the indicator part from one end connected to the pointing direction reflection face to another end connected to the rear end direction reflection face.

2. An indicator unit comprising,
   the indicator member described in claim 1, and
   a cover member arranged to cover the indicator part of the indicator member and having
   a slit through which the light from an upper face of the indicator part facing an opposite direction of the base part is passed.

3. An indicator instrument comprising,
   the indicator unit described in claim 2,
   a drive device arranged to rotate an indicator shaft to which the indicator unit is attached in accordance with measured quantity, and
   a light source which emits light to be received at an indicator member of the indicator unit.

* * * * *